United States Patent
Yamaguchi et al.

(10) Patent No.: US 7,477,841 B2
(45) Date of Patent: Jan. 13, 2009

(54) SERVICE PROVISION SYSTEM AND AUTOMATIC PHOTOGRAPHY SYSTEM

(75) Inventors: Hiroshi Yamaguchi, Tokyo (JP); Jun Enomoto, Kanagawa-ken (JP); Mamoru Shinohara, Kanagawa-ken (JP); Yoichi Nakamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/946,623

(22) Filed: Sep. 22, 2004

(65) Prior Publication Data

US 2006/0056832 A1 Mar. 16, 2006

(30) Foreign Application Priority Data

Sep. 22, 2003 (JP) .............................. 2003-330261
Sep. 25, 2003 (JP) .............................. 2003-333380
Sep. 30, 2003 (JP) .............................. 2003-340638

(51) Int. Cl.
*G03B 17/00* (2006.01)
*G03B 19/00* (2006.01)
*G03B 29/00* (2006.01)
*H04N 5/232* (2006.01)

(52) U.S. Cl. ...................... 396/56; 396/429; 348/211.2
(58) Field of Classification Search .................. 396/56, 396/57, 59, 429, 211.2; 348/61; 700/90
See application file for complete search history.

(56) References Cited

U.S. PATENT DOCUMENTS

| 6,189,783 | B1 | 2/2001 | Motomiya et al. |
| 6,628,899 | B1 | 9/2003 | Kito |
| 7,147,149 | B2 * | 12/2006 | Giraldin et al. ............. 235/380 |
| 2002/0001468 | A1 * | 1/2002 | Kaku ......................... 396/310 |

* cited by examiner

*Primary Examiner*—Rochelle-Ann J Blackman
(74) *Attorney, Agent, or Firm*—Sughrue Mion, PLLC

(57) ABSTRACT

In a system for providing a service to members of a group, a more complex form of the group can be flexibly and appropriately dealt with, and the service that is more convenient for the group can be provided. A group management database stores a group property, thereby a quantity of prints printed by a laboratory and information provided by a terminal can be determined based on the group property and the number of the members, for example. Furthermore, the group can be changed. In addition, security of image search can be set for the group by using the terminal. One of the members in charge of payment is registered for the group so that the member can collectively pay for the group.

22 Claims, 40 Drawing Sheets

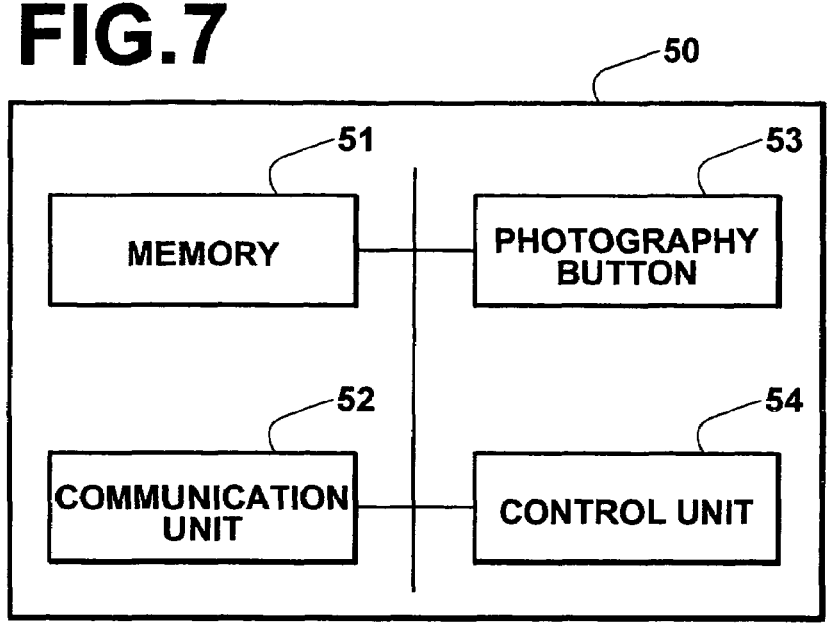
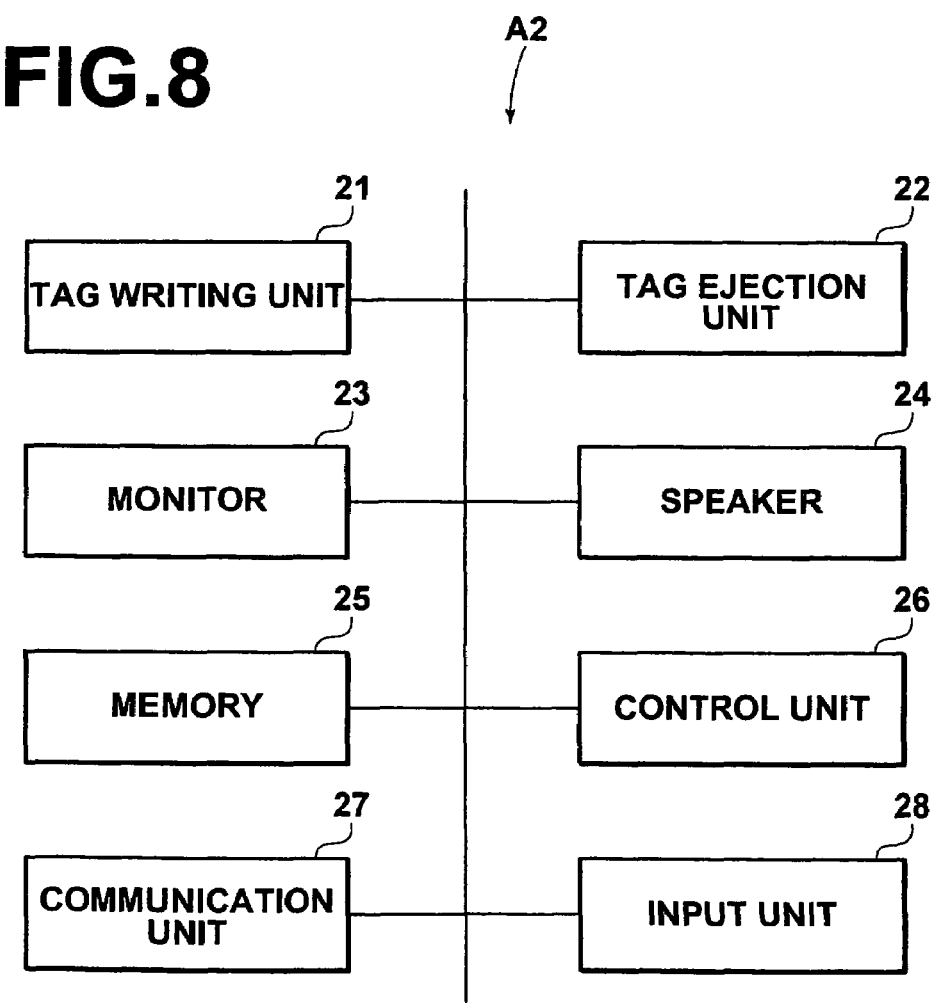

FIG.12

| IMAGE ID | TIME AND DATE OF PHOTOGRAPHY | TAG ID OF SUBJECT |
|---|---|---|
| P001 | 2003/9/4 10:45 | 1,2,3 |
| P002 | 2003/9/4 10:50 | 2,3 |
| P003 | 2003/9/4 11:35 | 4,5 |
| P004 | 2003/9/4 11:40 | 6,7,8 |
| P005 | 2003/9/4 13:05 | 6,8 |
| P006 | 2003/9/4 13:15 | 6,7,8 |
| P007 | 2003/9/5 13:20 | 9,10 |
| P008 | 2003/9/5 13:25 | 7,9,10 |
| P009 | 2003/9/5 13:35 | 7,9,10 |
| P010 | 2003/9/5 14:00 | 4 |
| P011 | 2003/9/5 17:30 | 4,5,6,7,8 |

FIG.13

| TAG ID | NAME | AGE | GENDER | CATEGORY OF PROVISION INFORMATION |
|---|---|---|---|---|
| 1 | ICHIRO FUJI | 40 | M | ALL |
| 2 | HANAKO FUJI | 35 | F | RESTAURANT |
| 3 | TARO FUJI | 7 | M | NONE |
| 4 | AKIRA MIYADAI | 18 | M | ATTRACTION |
| 5 | KAORI ODAWARA | 18 | F | NONE |
| 6 | NOBUO ASHIGARA | 21 | M | NONE |
| 7 | SHIGERU ASAKA | 22 | M | NONE |
| 8 | MIZUHO ASAKA | 19 | F | ALL |
| 9 | JUNKO HAKONE | 23 | F | NONE |
| 10 | KAZUMI ATAMI | 23 | F | NONE |

FIG.14

| GROUP ID | STARTING TIME AND DATE | TAG ID FOR PAYMENT | NUMBER OF MEMBERS |
|---|---|---|---|
| G1 | FAMILY | 1 | 3 |
| G2 | COUPLE | | 2 |
| G3 | FRIENDS | | 3 |
| G4 | BUS TOUR PARTICIPANTS | | 5 |
| G5 | COUPLE | | 2 |
| G6 | FRIENDS | | 2 |

FIG.15

| TAG ID | GROUP ID | STARTING TIME AND DATE | ENDING TIME AND DATE |
|---|---|---|---|
| 1 | G1 | 2003/9/4 10:30 | 9999/12/31 23:59 |
| 2 | G1 | 2003/9/4 10:30 | 9999/12/31 23:59 |
| 3 | G1 | 2003/9/4 10:30 | 9999/12/31 23:59 |
| 4 | G2 | 2003/9/4 11:30 | 9999/12/31 23:59 |
| 4 | G4 | 2003/9/4 10:10 | 9999/12/31 23:59 |
| 5 | G2 | 2003/9/4 11:30 | 9999/12/31 23:59 |
| 5 | G4 | 2003/9/4 10:10 | 9999/12/31 23:59 |
| 6 | G3 | 2003/9/4 11:00 | 9999/12/31 23:59 |
| 6 | G4 | 2003/9/4 10:10 | 9999/12/31 23:59 |
| 6 | G5 | 2003/9/4 13:00 | 9999/12/31 23:59 |
| 7 | G3 | 2003/9/4 11:00 | 9999/12/31 23:59 |
| 7 | G4 | 2003/9/4 10:10 | 9999/12/31 23:59 |
| 7 | G6 | 2003/9/4 13:30 | 9999/12/31 23:59 |
| 8 | G3 | 2003/9/4 11:00 | 2003/9/4 13:00 |
| 8 | G4 | 2003/9/4 10:10 | 9999/12/31 23:59 |
| 8 | G5 | 2003/9/4 13:00 | 9999/12/31 23:59 |
| 9 | G6 | 2003/9/4 12:00 | 9999/12/31 23:59 |
| 10 | G6 | 2003/9/4 12:00 | 9999/12/31 23:59 |

FIG.16

| TAG ID FOR PAYMENT | GROUP ID OF SEARCH PROHIBITION |
|---|---|
| 5 | G4 |

FIG.17

| INFORMATION CATEGORY | INFORMATION ID | GENDER | AGE | NUMBER OF MEMBERS | GROUP PROPERTY |
|---|---|---|---|---|---|
| RESTAURANT | RESTAURANT A, COUNTER SEATS, VACANCY | | ≥18 | ≥2 | FRIENDS, COUPLE |
| RESTAURANT | RESTAURANT A, 4-SEAT TABLE, VACANCY | | ≥18 | 3~4 | FRIENDS, COUPLE |
| RESTAURANT | RESTAURANT B, 4-SEAT TABLE, VACANCY | | | 3~4 | FAMILY |
| ATTRACTION | TWIST COASTER | | ≥12 | | |
| REST ROOMS | NEXT TO BIG WHEEL VACANCY | F | | | |

FIG.18

| TAG ID | GROUP ID | TIME AND DATE OF TRANSACTION | STORE CODE | PRODUCT/SERVICE CODE | QUANTITY | PRICE/CHARGE |
|---|---|---|---|---|---|---|
| 1 | G1 | 2003/9/4 12:55 | REATAURANT B | ROAST MEAT SET | 1 | 1200 |
| 2 | G1 | 2003/9/4 12:55 | REATAURANT B | SEAFOOD PASTA | 1 | 1100 |
| 3 | G1 | 2003/9/4 12:55 | REATAURANT B | KID'S LUNCH | 1 | 850 |

FIG.26

| CUSTOMER ID | GROUP ID | RELATED GROUP ID | NAME OF CUSTOMER | ADDRESS | OTHER INFORMATION |
|---|---|---|---|---|---|
| 100 | 001 | — | TARO | TOKYO | · · |
| 110 | 001 | — | HANAKO | TOKYO | · · |
| 120 | 001 | — | ICHIRO | TOKYO | · · |
| 200 | 002 | 003 | SHINICHI | KANAGAWA | · · |
| 210 | 002 | 003 | REIKO | TOKYO | · · |
| 300 | 003 | 002 | KENTARO | CHIBA | · · |
| 310 | 003 | 002 | HIKARU | CHIBA | · · |
| ⋮ | ⋮ | ⋮ | ⋮ | ⋮ | ⋮ |

| TIME AND DATE | LOCATION ID | GROUP ID | CUSTOMER ID | IMAGE ID |
|---|---|---|---|---|
| 12/24 10:30 | A | 001 | 100, 110, 120 | A001 |
| 12/24 10:45 | A | 002 | 200, 210 | A002 |
| 12/24 16:50 | A | 002, 003 | 200, 210, 300, 310 | A003 |
| 12/24 10:00 | B | 002 | 200, 210 | B001 |
| 12/24 11:00 | B | 001 | 100, 110 | B002 |
| 12/24 13:00 | B | 003 | 300, 310 | B003 |
| 12/24 14:30 | C | 001 | 100, 110, 120 | C001 |
| 12/24 11:30 | C | 002 | 200, 210 | C002 |
| ⋮ | ⋮ | ⋮ | ⋮ | ⋮ |

| CUSTOMER ID | 00123 | 00124 | 00125 | 00126 | 00127 |
|---|---|---|---|---|---|

| DATE OF VISIT | NAME | ADDRESS | AGE | GENDER | HEIGHT | NUMBER OF MEMBERS | PREGNANCY | PAST DISEASE | OTHER INFORMATION |
|---|---|---|---|---|---|---|---|---|---|

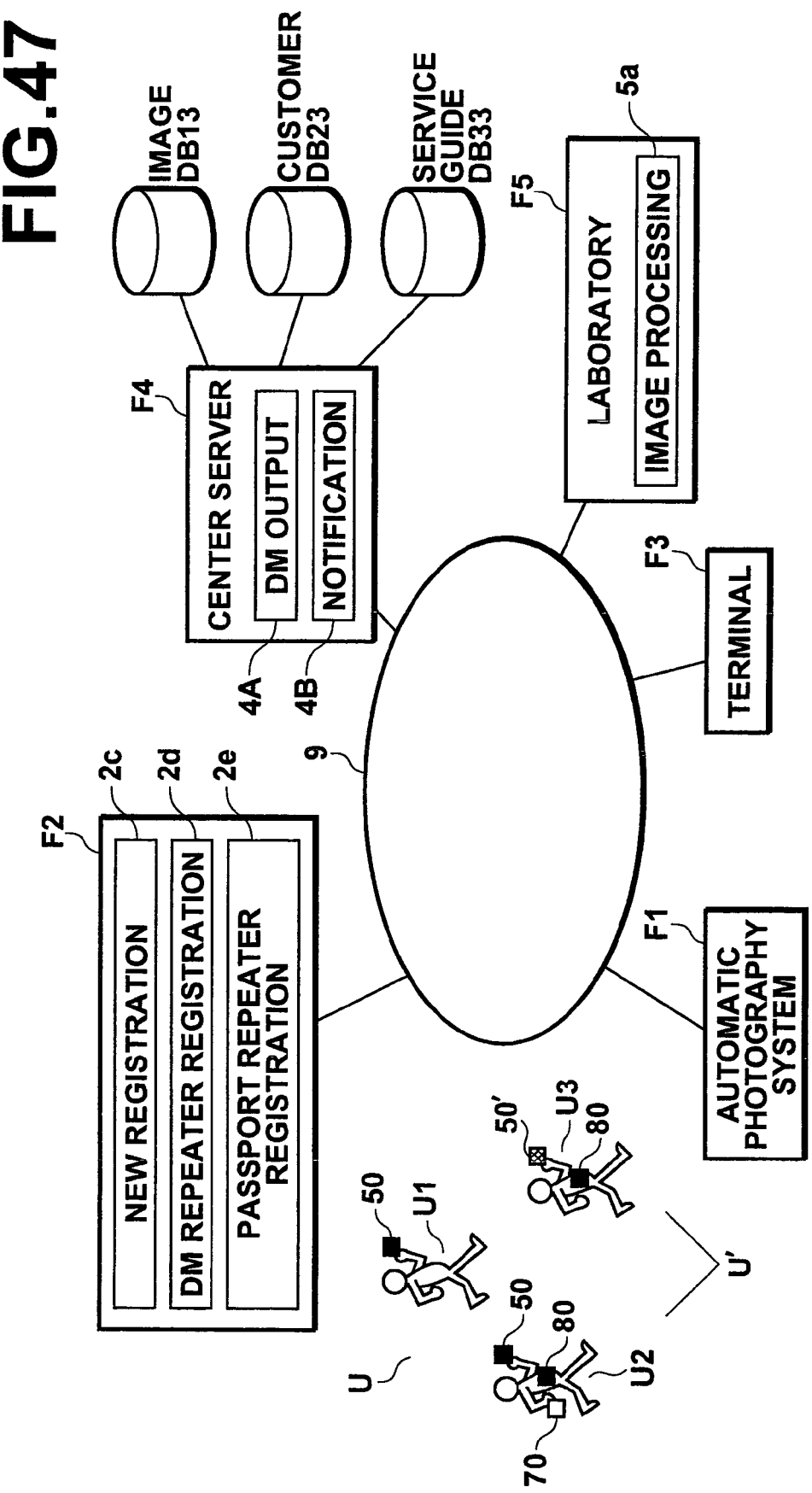

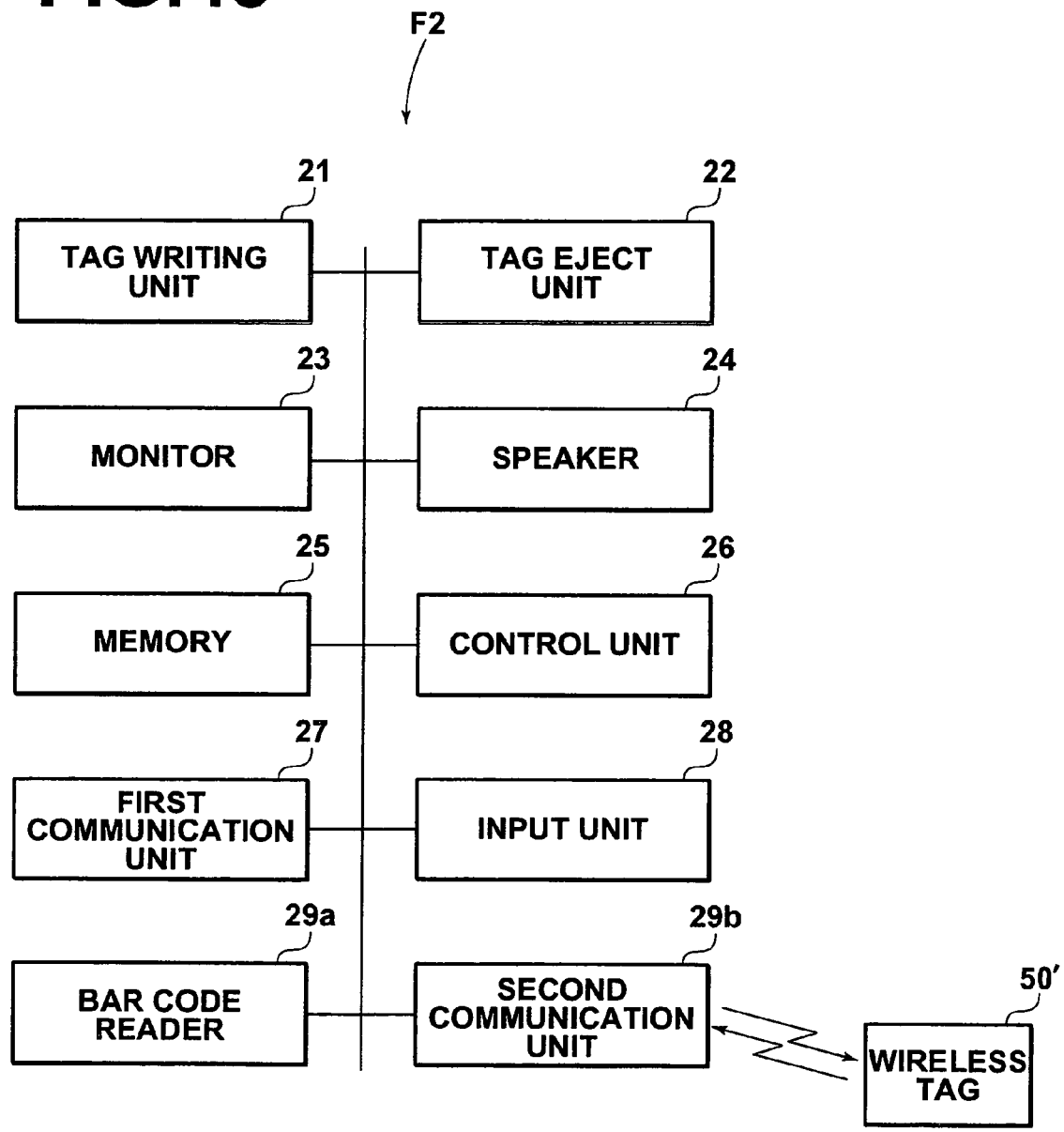

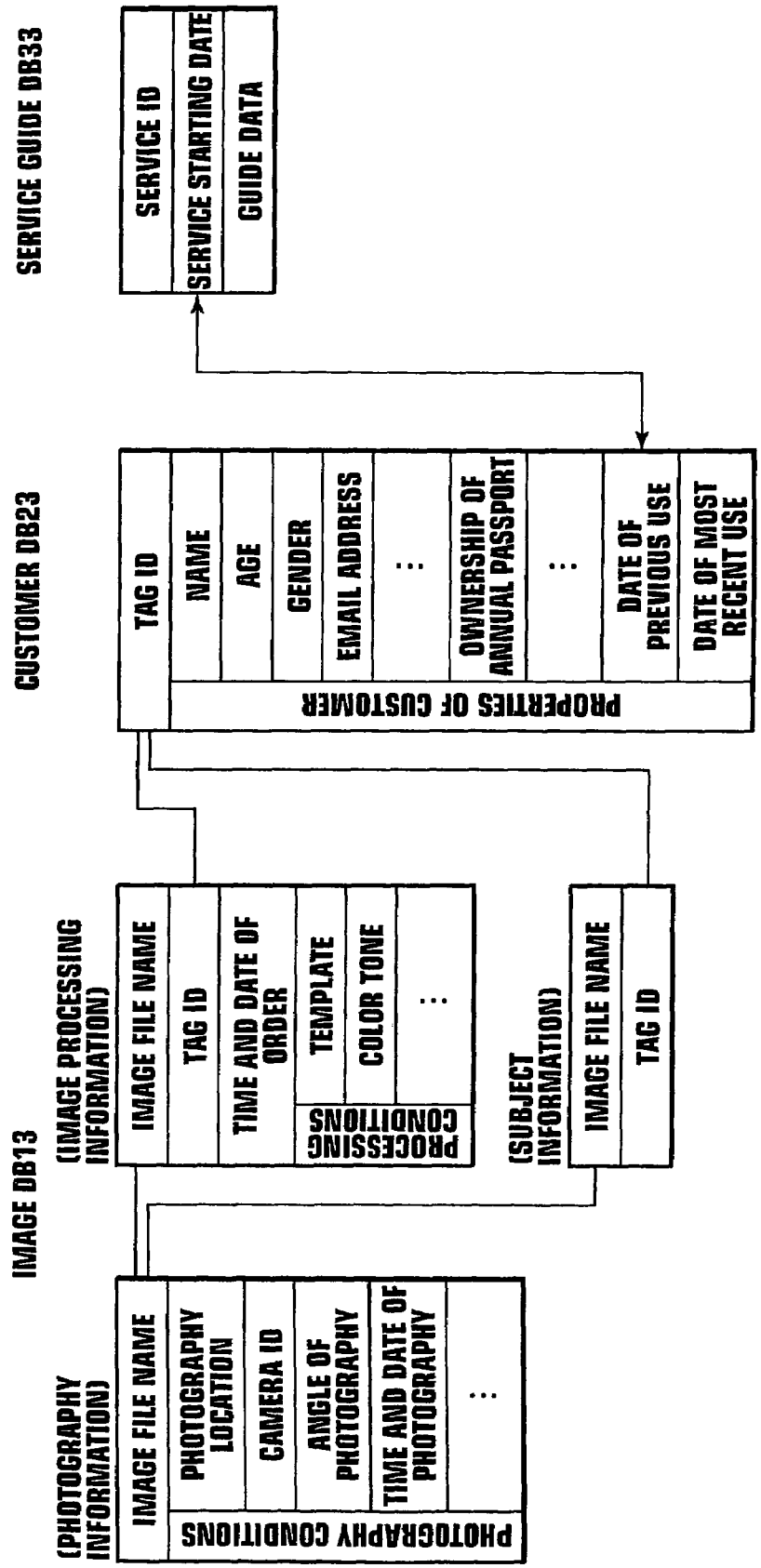

SERVICE PROVISION SYSTEM AND AUTOMATIC PHOTOGRAPHY SYSTEM

BACKGROUND OF THE INVENTION

1. Field of the Invention

The present invention relates to a service provision system. More specifically, the present invention relates to a system for providing a service such as automatically photographing a single visitor or a group of visitors to an entertainment facility such as a theme park or an amusement park.

2. Description of the Related Art

Systems for providing a group-oriented service by registering a group of customers are known.

For example, a system for providing a comfortable environment to customers has been known in an entertainment facility, such as a theme park, by providing information in accordance with activities of the customers and by supporting use of the facility (see U.S. Pat. No. 6,189,783, for example). In this system, a group of customers is registered with IC cards or the like, and each of the customers having the IC card understands activities of the other customers in the group, and exchanges messages with the other customers by using a terminal installed in the theme park.

Furthermore, in a sightseeing spot such as an amusement park and a theme park, a service has been carried out for selling a print of an image of a visitor photographed during an attraction. In order to efficiently carry out such a service, the following system has been proposed (see U.S. Pat. No. 6,628,899).

In this system, a communication device storing ID information (personal identification information) of a customer is firstly provided to the customer. Thereafter, each time the customer having the communication device visits an attraction or a predetermined photography spot in a sightseeing spot, a camera installed in the attraction or the photography spot automatically photographs the customer, and obtains the ID information from the communication device of the customer. Image data obtained through photography are sent to a server by being related to the ID information of the customer, and the server stores the image data and the ID information. When an order is placed via an order terminal installed in the sightseeing spot, the server searches for the image data of the customer, based on the ID information thereof. The server then prints the image data and provides a print to the customer. Alternatively, the server records the image data in a recording medium or the like to be provided to the customer. In this manner, the customer can collectively order any images among images photographed in the sightseeing spot by using the order terminal, which enables provision of a more convenient service. Furthermore, in this system, if a part of the personal identification information is used commonly among a group, not only an image of the single customer but also an image of the other customers belonging to the same group as the customer can be searched for, by using the identification information that is used commonly among the group.

In the inventions described in U.S. Pat. Nos. 6,189,783 and 6,658,899, a plurality of customers are simply grouped. However, in reality, the form of a group is more complex in static and dynamic points of view.

Furthermore, regarding provision of a service to a group, the inventions described above are mere extensions of a service that has been provided conventionally to an individual. Therefore, provision of a group-oriented service has been desired.

For example, in a sightseeing spot such as an amusement park or a theme park, most customers visit in groups and an image of a whole group is desired in most cases upon photography in the sightseeing spot. However, in a conventional automatic photography system such as those described above, photography is carried out through recognition of the communication device provided to each of the customers as a subject. Therefore, in the case of a group as a subject, photography is not necessarily carried out at a preferable timing, and the whole group may not be photographed.

In addition, in the automatic photography system described in U.S. Pat. No. 6,189,783, only a service provided during one visit to a theme park or the like is considered, and no service to customers as repeaters has been considered.

SUMMARY OF THE INVENTION

The present invention has been conceived in consideration of the above circumstances, and an object of the present invention is therefore to provide a system for providing a service that serves more uses to respective members of a group while flexibly and appropriately dealing with a more complex form of the group. For example, in the case of providing a service by an automatic photography system, the present invention provides an automatic photography system that enables photography of a group as a subject at a preferable timing.

Furthermore, the present invention provides an automatic photography system enabling provision of an efficient, appropriate, and detailed service to a customer who uses the automatic photography system repeatedly.

A service provision system of the present invention comprises:

group registration means for registering respective members of a group comprising customers, by relating group identification information for identifying the group to personal identification information for identifying each of the customers, and service provision means for providing services that are convenient for the group, to each of the members of the group. The service provision system of the present invention is characterized by at least one of the following aspects.

Firstly, the group registration means may further register a property of the group in relation to the group identification information so that the service provision means can provide the services according to the property of the group.

The property of the group refers to a property of a group in which a relationship between the members is not equal as in the case of a family comprising parents and children, or to a property of a group in which the relationship between the members is equal as in the case of friends, a couple, and participants of a bus tour. Whether the relationship between the members is equal or not is determined by whether the respective members can equally enjoy the services to be provided. For example, in the case where one of the services to be provided is a payment service, a group is dealt with as a group having an unequal relationship if the group comprises a member in charge of payment (that is, a parent) and a member or members who cannot pay (that is, a child or children).

As examples of the services to be provided according to the property of the group, an automatic photography service and an information provision service can be listed. In an automatic photography service, the service provision means comprises:

identification information transmission means for transmitting the personal identification information while being held by each of the customers;

photography means for carrying out automatic photography of the customers having the identification information transmission means upon reception of the personal identification information from the identification information transmission means;

image storage means for storing an image output through the automatic photography, in relation to the personal identification information received by the photography means; and image output means for obtaining the image from the image storage means and for outputting the image in a predetermined medium such as printing paper or a CD-R. The image output means determines a quantity of the image to be output, based on the property of the group identified by the group identification information related to the personal identification information related to the image.

In an information provision service, the service provision means comprises:

information storage means for storing information on various goods and/or the services to be provided to the customers, in relation to the property of the group that is suitable for provision of the information; and information output means for outputting the information appropriate for the customers in the group, based on the property of the group identified by the group identification information related to the personal identification information of the customers.

Secondly, the group registration means may register the personal identification information of any one of the customers in relation to the group identification information of two or more groups.

A relationship between the two or more groups to be identified by the group identification information can be any relationship. For example, hierarchical groups comprising a group including another group, or groups that are independent of each other, or a group having a member belonging to another independent group may be the groups to be identified. An example of a hierarchical group is a group of bus-tour participants comprising friends and families. In the hierarchical groups, the members of the lower-order groups such as the friends and the families are necessarily the members of the upper-order group such as the bus-tour participants. Examples of independent groups are groups of families who are not related to each other. As an example of the groups having a common member, the case where one of members of family 1 is a friend of a member of family 2 can be listed. In this case, groups comprising the family 1, the family 2, and the friends are formed.

Thirdly, the service provision system of the present invention may further comprise group changing means for registering one or more of the members of the group identified by the personal identification information related to the group identification information of the group as a member or members of another group by relating the personal identification information thereof to the group identification information of the group to which the member or members newly belong.

In this case, it is preferable for the group changing means to register an effective period of membership of each of the groups in relation to the group identification information of each of the groups. The group registration means may also register the effective period in the same manner. Therefore, the cases can be dealt with where the effective period of the former group before the change overlaps with the effective period of the latter group after the change (that is, the case of adding a new group) and where the effective period of the former group before the change does not overlap with the effective period of the latter group after the change (that is, the case of dropping out of the former group). The effective period may be set for each of the groups. However, all the members of each of the groups need to change the groups. For this reason, it is more preferable for each of the members to set the effective period of each of the groups he/she belongs to. In this manner, each of the members can change the groups by himself/herself, which is more preferable. The effective period can be defined by at least two of three items comprising starting time and date of the corresponding group, ending time and date thereof, and a period in which the group exists.

Fourthly, the service provision means may provide the services according to the number of the members in the group.

An example of the services to be provided is an information provision service. In this case, the service provision means may comprise:

information storage means for storing information on various goods and/or the services to be provided to the customers, in relation to the number of members in the group that is suitable for provision of the information; and information output means for outputting the information appropriate for the members of the group, based on the number of the members in the group identified by the group identification information related to the personal identification information of the members.

In the case of the information provision service, the service provision means may further comprise customer registration means for registering a property of each of the customers in relation to the personal identification information thereof. In this case, the information storage means stores the information on the various goods and/or the services to be provided to the customers by relating the information to the property of each of the customers that is appropriate for provision of the information, and the information output means outputs the information appropriate for each of the customers, based on the property of each of the customers related to the personal identification information thereof.

Fifthly, the service provision means may comprise:

identification information transmission means held by each of the customers for transmitting the personal identification information thereof;

photography means for carrying out automatic photography of the customers having the identification information transmission means in response to reception of the personal identification information from the identification information transmission means;

image storage means for storing an image output through the automatic photography, in relation to the personal identification information received by the photography means;

image search means for obtaining the image related to the personal identification information of the customers through a search of the image storage means for the image in response to a search request by any one of customers; and search permission/prohibition setting means for setting permission or prohibition of the search for the image by the image search means, for the group identified by the group identification information related to the personal identification information related to the image.

Sixthly, the group registration means may register the personal identification information of one of the members in charge of payment for predetermined goods and/or services, in relation to the group identification information of the group. In this case, the service provision means totals prices and/or charges for the predetermined goods and/or services for the group so that the member in charge of payment can collectively pay.

Seventhly, the service provision means may provide the services by using an automatic photography system. The automatic photography system automatically photographs the group of the customers and comprises:

a camera installed at a predetermined position;

first communication means (identification information transmission means) distributed to each of the customers for transmitting personal identification information specific thereto;

second communication means installed at a known position for receiving the personal identification information transmitted from the first communication means;

group information management means for managing information on the group, in relation to the personal identification information of each of the customers therein;

position detection means for detecting a position of each of the customers, based on the personal identification information received by the second communication means; and photography timing control means for controlling timing of photography of the group by the camera, based on output from the position detection means and the information managed by the group information management means.

More specifically, the first communication means and the second communication means may be an RFID (Radio Frequency IDentification) of a long transmission range (several meters) and a reception antenna.

In the automatic photography system, the photography timing control means may compare the number of all the customers in the group and the number of the customers in the group in a photography range. In this case, if these numbers are the same, the photography timing control means causes the camera to carry out the photography. If the latter number is smaller than the former number, the photography timing control means may cause the camera to stand by for the photography. Alternatively, the photography timing control means may control the photography timing based on state flow monitoring of each of the customers in the group.

State flow monitoring refers to a method of analyzing an action of each of the customers. In this method, an action of each of the customers is defined as a state, and a flow of the action in a predetermined amount of time is thought as a state flow. By comparing the state flow to a predetermined pattern, the action of the customer can be analyzed.

More specifically, state flow monitoring is carried out in the case where not all the customers of the group are in the photography range. In the case where any part of the customers outside the photography range is moving to the photography range, the customer or customers are judged to have an intention to be photographed, and the photography by the camera is put on stand-by until the customer or customers outside the photography range reach the photography range.

It is preferable for the service provision means to further comprise notification means for notifying the photography timing to the group to be photographed or to a group not to be photographed, based on output from the photography timing control means.

It is preferable for the second communication means to notify the first communication means of the photography timing, based on the output from the photography timing control means.

A first automatic photography system for carrying out an automatic photography service as one of the services provided by the present invention is an automatic photography system comprising:

identification information transmission means held by a customer for transmitting personal identification information for identifying the customer;

photography means for carrying out automatic photography of the customer in response to reception of the personal identification information sent from the identification information transmission means; and image storage means for storing an image output through the automatic photography, in relation to the personal identification information received by the photography means. The first automatic photography system of the present invention is characterized by that the system further comprises:

customer information storage means for storing the personal identification information sent by the identification information transmission means, in relation to customer information that identifies the customer holding the identification information transmission means;

media output means for outputting a distribution medium to be distributed to the customer by recording the personal identification information of the customer in the distribution medium; and access enabling means for enabling access to the customer information based on the personal identification information at the time of subsequent use of the automatic photography system by the customer who received the distribution medium, by reading the personal identification information recorded in the distribution medium and by relating the customer information stored in the customer information storage means in relation to the personal identification information to the personal identification information transmitted by the identification information transmission means held by the customer in the subsequent use.

The identification information transmission means is held by the customer and transmits the personal identification information for identifying the customer. It is preferable for the identification information transmission means to transmit the personal identification information by using radio. As an example of the identification information using radio, a long-range RFID having several meters of communicable range is preferable, in order to cover a photography area of a predetermined size used by the photography means. In this case, the photography means has a reception antenna for receiving the personal identification information transmitted thereto.

The customer information is information for identifying the customer having the identification information transmission means. More specifically, the customer information comprises properties for uniquely identifying the customer, such as the name, the address, the phone number, an e-mail address, and date of birth. Properties for aiding unique identification of the customer, such as age, gender, height, pregnancy or non-pregnancy, history of past disease, and a date or dates of use of the automatic photography system in the past and frequency thereof may also be used.

An example of the distribution medium having the personal identification information recorded by the media output means is a card or a direct mail having the personal identification information printed in a code, such as a bar code that can be read optically. Alternatively, the distribution medium may be a magnetic card or a magneto-optic card having the personal identification information recorded optically or magneto-optically, or an IC card storing the personal identification information recorded electrically. A wireless tag recorded with the personal identification information can also be used as the distribution medium.

The media output means may also output the distribution medium having not only the personal identification information of the customer but also the image stored in the image storage means in relation to the personal identification information.

The access enabling means may read the personal identification information recorded in the distribution medium at the time of the subsequent use of the automatic photography system by the customer who received the distribution medium so that the image stored in the image storage means in relation to the personal identification information can further be related to the personal identification information transmitted by the identification information transmission means held by the customer upon the subsequent use.

In other words, the access enabling means relates the customer information stored in the customer information storage means and the image stored in the image storage means upon previous use of the automatic photography system by the customer, to the personal identification information transmitted from the identification information transmission means held by the customer upon the subsequent use of the automatic photography system by the customer via the personal identification information stored and transmitted by the identification information storage means upon the previous use or the personal identification information recorded in the distribution medium. Therefore, any method of linking may be adopted as long as the customer information and the image stored previously can be obtained by the linking based on the personal identification information set for the identification information transmission means upon the subsequent use. In other words, the form of the personal identification information and the means described above can be in any form as long as the personal identification information set for the identification information transmission means held by the customer upon the previous use, the personal identification information recorded in the distribution medium provided to the customer, the personal identification information set for the identification information transmission means held by the customer upon the subsequent use, the personal identification information related to the image of the customer stored in the image storage means, and the personal identification information related to the customer information of the customer stored in the customer information storage means can be related to each other, and as long as the customer information and the image of the customer can be obtained from the customer information storage means and from the image storage means based on the personal identification information of any one of the forms described above.

FIGS. 39 to 41 show examples of the forms. In FIG. 39, a code system for the personal identification information is standardized, and the customer is identified by the same personal identification information (shown as ID1). In this case, the image and the customer information are stored in the customer information storage means and in the image storage means by being related to the personal identification information (ID1) stored in the identification information transmission means upon the previous use. The personal identification information (ID1) is recorded in the distribution medium by the media output means, and the access enabling means sets the same personal identification information (ID1) for the identification information transmission means upon the subsequent use. In FIG. 40, a code system for the personal identification information set for the identification information transmission means is different from a code system for the personal identification information for identifying the customer information in the customer information storage means. In this case, the personal identification information set for the identification information transmission means (ID1-1 and ID1-2) is different at each time the customer uses the automatic photography system, and the image is stored in the image storage means in each use by being related to the personal identification information (ID1-1 and ID1-2) transmitted from the identification information transmission means, while the personal identification information recorded by the media output means in the distribution medium is the personal identification information (ID2) in the customer information storage means. The personal identification information (ID1-1 and ID1-2) set for the identification information transmission means in each use is related to the personal identification information (ID2) in the customer information storage means as a part of the customer information. The access enabling means obtains the customer information of the customer from the customer information storage means, based on the personal identification information (ID2) read from the distribution medium. The personal identification information (ID1-2) that has been set for the identification information transmission means in the subsequent use is recorded as a part of the customer information by the access enabling means. In FIG. 41, a code system for the personal identification information set for the identification information transmission means is also different from a code system for the personal identification information for identifying the customer information in the customer information storage means. This case is different from the case in FIG. 40 in that the image and the customer information are managed by the personal identification information (ID2) of the same code system and in that the personal identification information (ID1-2) set for the identification information transmission means in the latest use is related to the personal identification information (ID2) for identifying the customer information in the customer information storage means. Therefore, the personal identification information (ID2) for identifying the customer information is obtained from the customer information storage means at each time, based on the personal identification information (ID1-1 or ID1-2) received by the photography means from the identification information transmission means. The image output from the photography means is stored in the image storage means by being related to the personal identification information (ID2). The access enabling means obtains the customer information (ID2) of the customer from the customer information storage means, based on the personal identification information (ID2) read from the distribution medium. The access enabling means updates the personal identification information (ID1-1) that was set for the identification information transmission means and stored as a part of the customer information in the previous use to the personal identification information (ID1-2) for the identification information transmission means used in the latest use.

A second automatic photography system of the present invention is an automatic photography system comprising:

identification information transmission means held by a customer for transmitting personal identification information that identifies the customer;

photography means for carrying out automatic photography of the customer in response to reception of the personal identification information sent from the identification information transmission means; and image storage means for storing an image output through the automatic photography, in relation to the personal identification information received by the photography means. The second automatic photography system of the present invention is characterized by that the automatic photography system further comprises:

customer information storage means for storing customer information for identifying the customer holding the identification information transmission means, in relation to the personal identification information sent by the identification information transmission means;

effective period storage means for storing an effective period during which the automatic photography system can be used based on the personal identification information; and access enabling means for obtaining from the effective period storage means the effective period regarding the personal identification information transmitted from the identification information transmission means held by the customer in subsequent use of the automatic photography system by the customer and for enabling access to the customer information stored in the customer information storage means in relation to the personal identification information transmitted by the identification information transmission means held by the customer in the case where the effective period has not expired.

In the case where the customer information can be accessed, the access enabling means may also enable access to the image stored in the image storage means in relation to the personal identification information of the customer.

Details of the identification information transmission means are the same as those of the first automatic photography system. An example of the identification information transmission means transmitting the personal identification information having the effective period is an annual passport for the automatic photography system that allows the customer to use the automatic photography system more than once based on the identification information transmission means, for example.

The effective period storage means may be installed together with the identification information transmission means in a ticket such as the annual passport, for example. Alternatively, the effective period storage means may be installed in a server computer together with the customer information storage means and the image storage means.

Details of the customer information are the same as in the first automatic photography system. The customer information may also include information (such as a flag) representing that the customer uses the annual passport and the effective period of the annual passport, for example.

Services to be provided to the customer upon use of the first or second automatic photography system of the present invention will be described next.

In each of the automatic photography systems described above, the image storage means may store a photography condition used at the time of the photography of the image by the photography means by relating the condition to the image. In this case, prior to the photography in the subsequent use of the automatic photography system by the customer, the photography means obtains from the image storage means the photography condition regarding the image of the customer photographed before the subsequent use and related by the access enabling means to the personal identification information transmitted from the identification information transmission means held by the customer in the subsequent use, based on the personal identification information transmitted from the identification information transmission means in the subsequent use. Based on the photography condition obtained in this manner, the photography means sets photography condition in the subsequent use.

Furthermore, each of the automatic photography systems may also comprise image processing means for obtaining the image from the image storage means according to an order placed by the customer and for carrying out image processing such as editing and processing on the image, and image processing condition storage means for storing a condition of the image processing regarding the image. In this case, prior to the image processing at the time of subsequent use of the automatic photography system by the customer, the image processing means obtains from the image processing condition storage means the condition of the image processing on the image of the customer photographed before the subsequent use and related by the access enabling means to the personal identification information transmitted from the identification information transmission means held by the customer upon the subsequent use, based on the personal identification information transmitted in the subsequent use. The image processing means can set the condition of the image processing in the subsequent use, based on the condition obtained in the above manner.

The photography condition may be a location of photography, a camera used at the location, a photography angle, or time and date of photography, for example. Examples of the image processing condition may be: generation of a composite image with a frame to be used for the image or with a template such as a character, or color tone conversion such as conversion to sepia or monochrome tones.

When the photography condition and the condition of the image processing are set in the subsequent use based on the photography condition and the condition of the image processing obtained from the corresponding means, the conditions set in the subsequent use may be different from or the same as the conditions in the past. In the former case, 3 patterns of the condition of the image processing may be prepared in advance for the same photography location, for example. An image photographed at the location is subjected to the image processing using a different one of the patterns each time, and the customer having the images subjected to the image processing of the 3 different patterns is given a present as one of the services to the customer. In the latter case, photography is carried out by using the same photography condition in the same photography location, so that a record of growth of a child can be provided as one of the services, for example. The automatic photography system may also comprise means for selecting either the same conditions or the different conditions.

In each of the automatic photography systems described above, the customer information storage means may store date of last use of the automatic photography system by the customer in the customer information thereof. In this case, the automatic photography system further comprises system update information storage means and notification means. The system update information storage means stores information on update of the automatic photography system by relating the information to date of the update. The notification means obtains from the customer information storage means the date of last use of the automatic photography system by the customer identified by the personal identification information, transmitted from the identification information transmission means held by the customer, in the subsequent use of the automatic photography system, and obtains from the system update information storage means the information on the update of the automatic photography system carried out after the date of last use of the automatic photography system by the customer. The notification means notifies the customer of the information on the update.

Moreover, in the first automatic photography system, the customer information storage means may store the date of last use of the automatic photography system by the customer in the customer information. In this case, if the automatic photography system comprises the system update information storage means, the media output means obtains from the customer information storage means the information on the date of last use of the automatic photography system by the customer identified by the personal identification information to be recorded in the distribution medium, and obtains from the system update information storage means the information on the update of the automatic photography system carried out after the date of last use. The media output means then outputs the information in the distribution medium.

The "information on the update of the automatic photography system" refers to addition or change of a photography location, change of a photography function or addition of a photography function to the existing photography means, and addition or change of an image processing function such as addition of a new template, for example. The "date of update" preferably refers to the date on which the automatic photography system after the update (such as the newly added function) becomes or will become available to the customer.

As a method of notification by the notification means, characters, images, or voice can be used, for example. An example of the notification means is a small terminal that can be carried by the customer and can notify the information by radio, for example. Alternatively, the notification means may be a fixed information terminal that is installed in a predetermined location in the automatic photography system and can notify the information in a wired or wireless manner. The notification means may notify not only the update of the system but also use history of the customer, such as a photography location and the image processing in the past, as well as a route, along which the customer moved in the past, for example. In this case, the use history and the route can be obtained based on the information on the photography condition, such as the photography location or the time and date of photography, and on the condition of the image processing such as a template. The information is stored in the image storage means in relation to the image of the customer.

According to the service provision system of the present invention, the group registration means registers customers in a group by relating the group identification information to the personal identification information of each of the customers in the group, and the service provision means provides to the respective customers of the group the services that are highly convenient for the group to use. In the following points, provision of the services, which can flexibly and appropriately deal with a more complex form of the group and are more convenient for the group, can be realized.

Firstly, if the group registration means carries out the registration by further relating the group property to the group identification information, and if the service provision means provides services according to the group property, not all groups are dealt with in the same manner but services, which are different from group to group, can be provided. In this manner, the services can be provided in a flexible, appropriate, and detailed manner, which is effective.

For example, in the automatic photography service provided by the service provision means, if the image output means determines the quantity of an image to be output based on the property of a group identified by the group identification information related to the personal identification information related to the image, the quantity of the image is determined to be 1 for the case of a group comprising a family and to be the number of members in the case of a group of friends. Therefore, the service can be provided appropriately for the group.

Furthermore, in the information provision service provided by the service provision means, if the information output means outputs the information appropriate for members of a group according to the property of the group identified by the group identification information related to the personal identification information for identifying the members, information on waiting time for a family-oriented attraction can be provided for a group comprising a family in the case of information provision in a theme park, for example. In this manner, provision of the information appropriate for the group can be realized.

Secondly, if the group registration means can register the personal identification information of a member in relation to the group identification information of two or more groups, the case can be flexibly and appropriately dealt with where a customer belongs to a plurality of groups. Therefore, the customer can be provided with services appropriate for each of the groups, which is effective.

Thirdly, if the group changing means can register a customer in a group as a member of another group by relating the personal identification thereof related to the group identification information of the former group to the group identification information of the latter group, the case can be dealt with where a customer belongs to a group in the morning but belongs to another group in the afternoon, for example. In this manner, a change in configuration of groups can be dealt with dynamically, which leads to dynamic change of services to be provided. In this manner, the services can be provided effectively.

Moreover, if the group changing means can register the group identification information of a group by relating the group identification information to the effective period of a customer as a member of the group, a more complex change in the configuration of groups can be dealt with flexibly, as in the case of addition to a group or withdrawal of membership from a previous group. In this manner, services can be provided more effectively.

Fourthly, if the service provision means can provide services according to the number of members in a group, the services can be provided differently for different groups as in the case of provision of the services according to the group property. In other words, not all groups are treated uniformly. Therefore, the services can be provided in flexible, appropriate, and detailed manner, which is effective.

For example, in the case of information provision service by the service provision means, if the information output means outputs the information appropriate for members of a group according to the number of the members in the group identified by the group identification information related to the personal identification information of the members, a guiding service can be provided effectively, such as remaining seat guidance regarding an attraction in a theme park or vacancy guidance regarding a table having a predetermined capacity in a restaurant, for example.

Fifthly, in the automatic photography service provided by the service provision means, if the search permission/prohibition setting means can set permission or prohibition of image search by the image search means for each group identified by the group identification information related to the personal identification information related to an image to be searched for, each of the members can set security of image search for each group, which realizes provision of the service in a highly practical manner.

Sixthly, if the group registration means can further register the personal identification information of a member in a group who is in charge of payment for predetermined goods and/or services by relating the personal identification of the member to the group identification information of the group, and if the service provision means totals prices and/or charges for the predetermined goods and/or services for the group, the member in charge of payment can collectively pay for the prices and/or charges for the group, and the prices and/or charges for purchase and/or use can be managed efficiently and easily. In addition, the service provision system can process the payment more efficiently than in the case of separate payment by each member.

Seventhly, when the automatic photography system photographs a group comprising customers, if the automatic photography service is provided by controlling the photography timing by the photography timing control means based on positions of all the customers in the group, photography can be carried out at a preferable timing so that the customers in the group can collectively be photographed as much as possible.

In the automatic photography system, if the photography timing control means compares the number of customers in a group to be photographed with the number of the customers in the photography range for causing the camera to carry out photography in the case where these numbers are the same, and for causing the camera to stand by in the case where the number of the customers in the range is smaller, an image having all the customers can be photographed in the case where all the customers are in the range. If not all the members are in the range, the remaining members can be called while the camera is put on stand-by for a predetermined period.

If the photography timing control means controls timing of photography of a group by the camera based on state flow monitoring of positions of all members in the group, photography can be carried out at more preferable timing. For example, in the case where not all the members are present, an intention to be photographed of the member or members outside the photography range can be judged based on movement toward the camera or the like, and photography timing is controlled based on the judgment.

If the automatic photography system comprises the notification means for notifying photography timing to members in a group to be photographed and/or members of a group not to be photographed according to the output from the photography timing control means, preferable photography can be carried out by letting the members to be photographed to pose and by causing the members not to be photographed to get out of the photography range.

Moreover, if the second communication means notifies the photography timing to the first communication means held by each customer according to the output from the photography timing control means, the customer to be photographed can be notified of the photography timing with certainty.

In the automatic photography system for providing the automatic photography service as one of the services to be provided by the present invention, at the time of subsequent use of the automatic photography system by a customer, the access enabling means enables access to the customer information of the customer stored in the customer information storage means, based on the personal identification information transmitted by the identification information transmission means held by the customer in the subsequent use. Therefore, the customer can receive the service efficiently since the customer does not need to register the customer information again at the time of the subsequent use. In addition, the automatic photography system understands the subsequent use by the customer. Therefore, the content of the service can be changed according to the customer as a newcomer or a repeater, which enables provision of the service in an appropriate and detailed manner.

If the access enabling means enables access to an image of a customer that has already been stored in the image storage means according to the personal identification information transmitted from the identification information transmission means held by the customer at the time of subsequent use by the customer, provision of the service using the image photographed in previous use can be realized. In this manner, the service can be provided in detail.

For example, at the time of subsequent use of the automatic photography system by the customer, if the photography condition or the image processing condition is set according to the photography condition or the image processing condition in the past, an image can be output according to the same condition as for the past image or according to the condition different from the past image. Therefore, the customer can obtain a more satisfactory image according to his/her preference.

If the date of last use of the automatic photography system by a customer is stored and if the information on the update of the automatic photography system after the date is notified, the customer can experience a new function and the like of the automatic photography system introduced after the last visit, which improves satisfaction of the customer. In the case where the information on the update is recorded in the distribution medium, the information contributes to revisit of the automatic photography system by the customer.

If the media output means outputs the distribution medium having not only the personal identification information but also an image of a customer stored in the image storage means in relation to the personal identification information thereof, authentication of the customer can be realized in the subsequent use, by using the image recorded in the distribution medium. In this manner, fraudulent use of the distribution medium can also be prevented.

BRIEF DESCRIPTION OF THE DRAWINGS

FIG. 7 is a block diagram showing the configuration of a wireless tag in the first and fourth embodiments;

FIG. 8 is a block diagram showing the configuration of a customer registration apparatus in the first embodiment;

FIG. 12 shows an example of an image database in the first embodiment;

FIG. 13 shows an example of a customer database in the first embodiment;

FIG. 14 shows an example of a master group table in a group management database in the first embodiment;

FIG. 15 shows an example of a group membership table in the group management database in the first embodiment;

FIG. 16 shows an example of a search permission/prohibition management table in the group management database in the first embodiment;

FIG. 17 shows an example of a provision information database in the first embodiment;

FIG. 18 shows an example of a transaction list database in the first embodiment;

FIG. 26 shows a customer ID database in the automatic photography system in the second embodiment;

FIG. 36 shows a structure of a customer database in the fourth embodiment;

FIG. 47 is a block diagram showing the configuration of an automatic photography system in a sixth embodiment of the present invention;

FIG. 48 is a block diagram showing the configuration of a customer registration apparatus in the sixth embodiment; and FIG. 49 shows structures of databases in the automatic photography system in the sixth embodiment.

DESCRIPTION OF THE PREFERRED EMBODIMENTS

Hereinafter, embodiments of the present invention will be described with reference to the accompanying drawings. In the descriptions below, the same elements are denoted with the same reference numbers. In the case where the same elements need to be distinguished from each other in the respective embodiments, characters from A to F representing the embodiments are added to the reference numbers.

Figure 1:
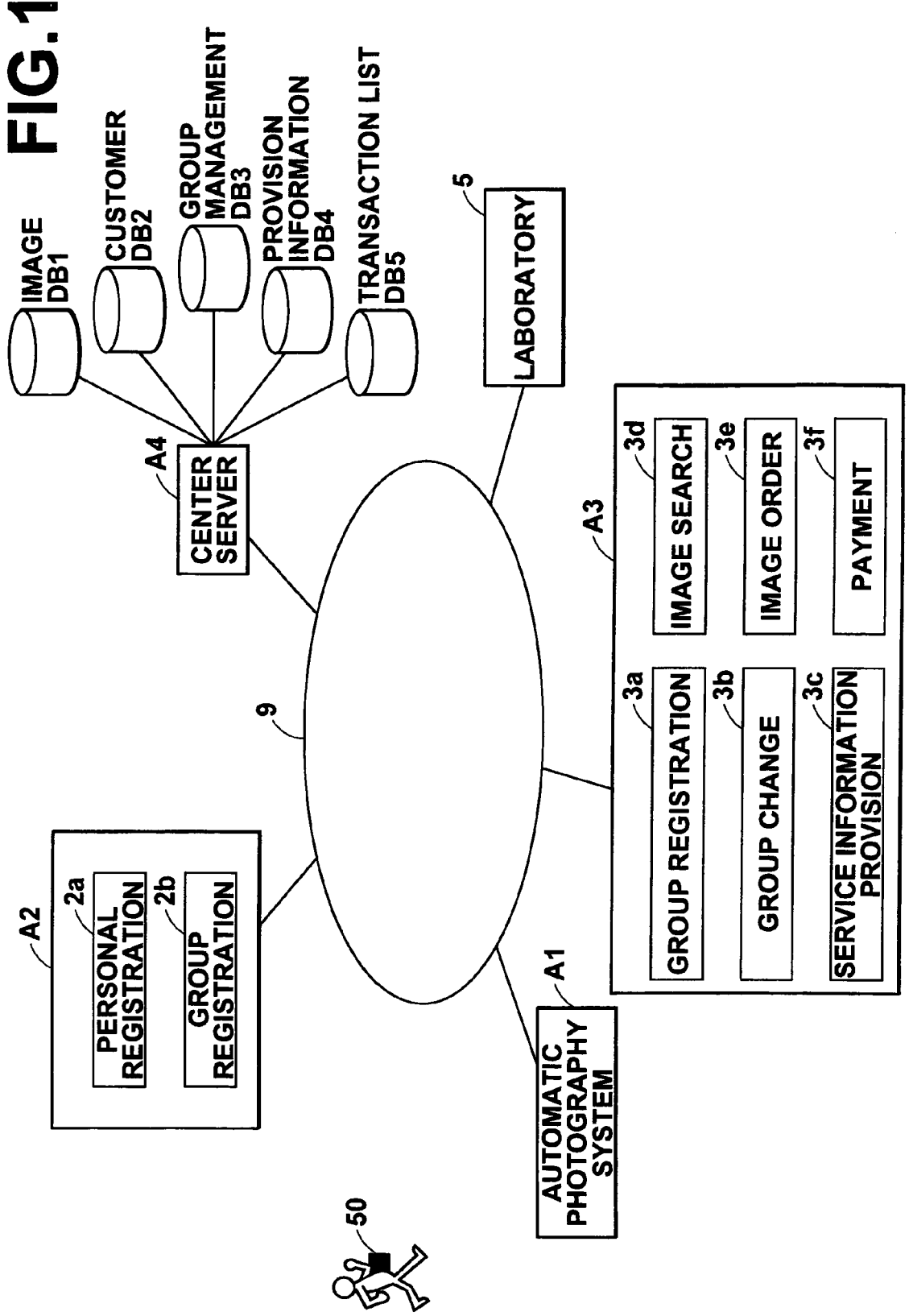
FIG. 1 is a block diagram showing the configuration of a theme park system of a first embodiment of the present invention.

FIG. 1 is a block diagram showing the configuration of a theme park system of a first embodiment of the present invention. As shown in FIG. 1, the theme park system in the first embodiment is installed in a theme park, and comprises an automatic photography system A1 (photography means), a customer registration apparatus A2, a terminal A3, a center server A4, and a laboratory 5 (image output means) connected to each other via a network 9. The automatic photography system A1 obtains image data sets S1 representing a subject by photography of customers to the theme park (hereinafter referred to as customers U) as the subject each holding a wireless tag 50 (identification information transmission means). The customer registration apparatus A2 comprises a customer information registration unit 2a (customer registration means), and a group registration unit 2b (group registration means and search permission/prohibition setting means), and distributes the wireless tag 50. The terminal A3 comprises a group registration unit 3a (group registration means and search permission/prohibition setting means), a group change unit 3b (group changing means), a service information provision unit 3c (information output means), an image search unit 3d (image search means), an image order unit 3e, and a payment unit 3f. The center server A4 comprises an image database DB1 (image storage means), a customer database DB2 (customer information storage means), a group management database DB3, a provision information database DB4 (information storage means), and a transaction list database DB5. The laboratory 5 carries out printing of the image data sets S1, generation of a photo album, and recording of the image data sets S1 in a CD-R, for example.

The customers U are photographed by the automatic photography system A1 by moving in the theme park while respectively holding the wireless tags 50. The customers U are also provided with service information from the terminal A3.

Figure 2:
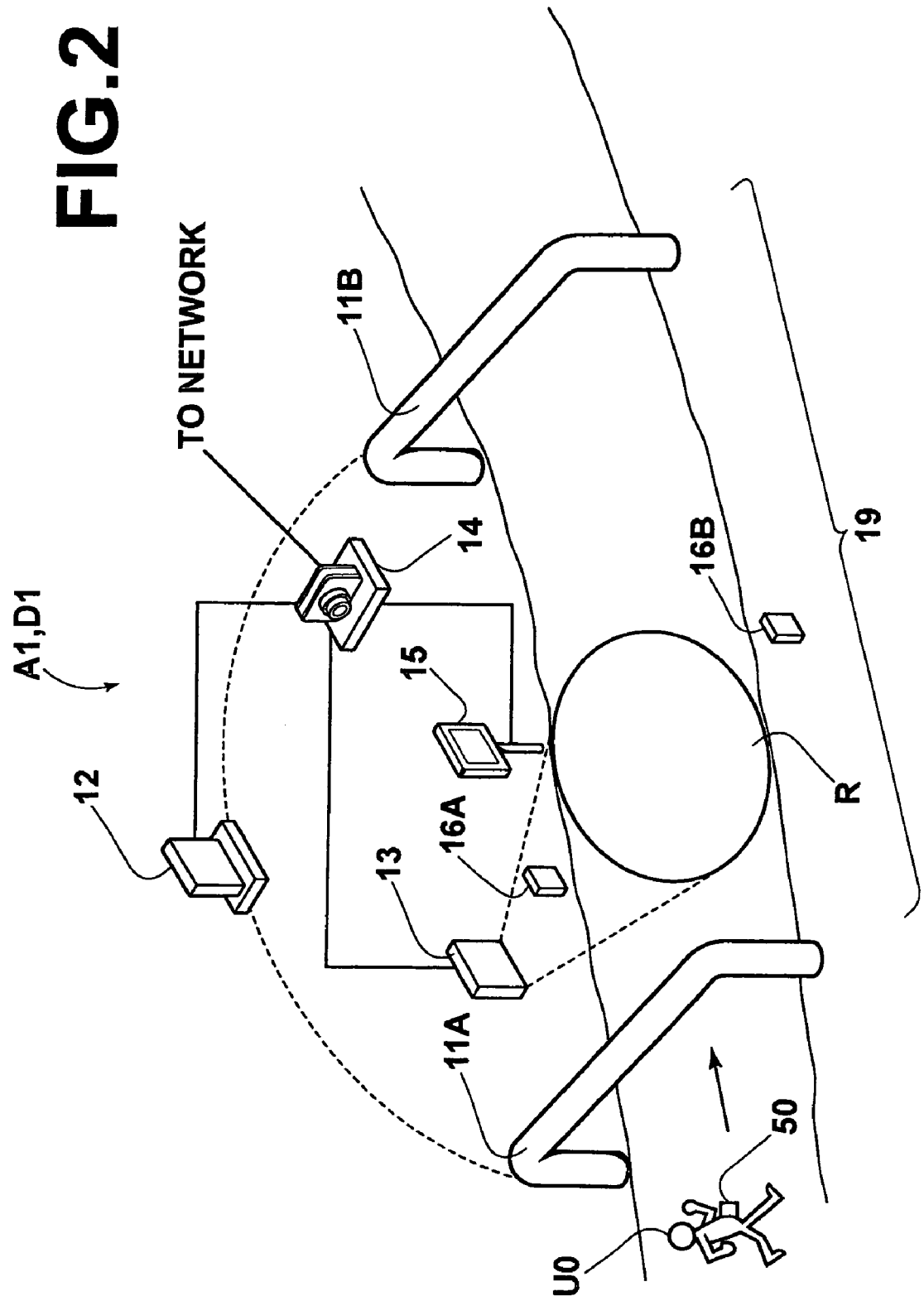
FIG. 2 is a perspective view showing the configuration of an automatic photography system in the first embodiment and in a fourth embodiment of the present invention.

FIG. 2 is a perspective view of the automatic photography system A1. As shown in FIG. 2, the automatic photography system A1 photographs the customers U in a photography range R in the theme park. The automatic photography system A1 comprises gates 11A and 11B for counting the number of visitors entering an area 19, a wide range sensor 12 for counting the number of the customers U holding the wireless tags 50 in the area 19 between the gates 11A and 11B, a communication device 13 for communicating with the customers U having the wireless tags 50 in the photography range R, a photography device 14 for photographing the customers U, and human sensors 16A and 16B comprising an infrared sensor and an ultrasonic sensor for detecting the customers U in the photography range R for photography of the customers U by the photography device 14.

The gates 11A and 11B count the number of visitors entering the area 19, regardless of possession or non-possession of the wireless tags 50. The number counted by the gates is input to a system, which is not shown but installed in the theme park together with the center server A4, and is used for understanding how many visitors have entered the area 19. The number is also input to the photography device 14 as information representing the number, and used for controlling photography.

The gates 11A and 11B can have any arbitrary configuration as long as the number of visitors is counted. For example, the gates may count the number by using an electric light, or by using a revolving bar turned by the visitors upon entering.

Figure 3:
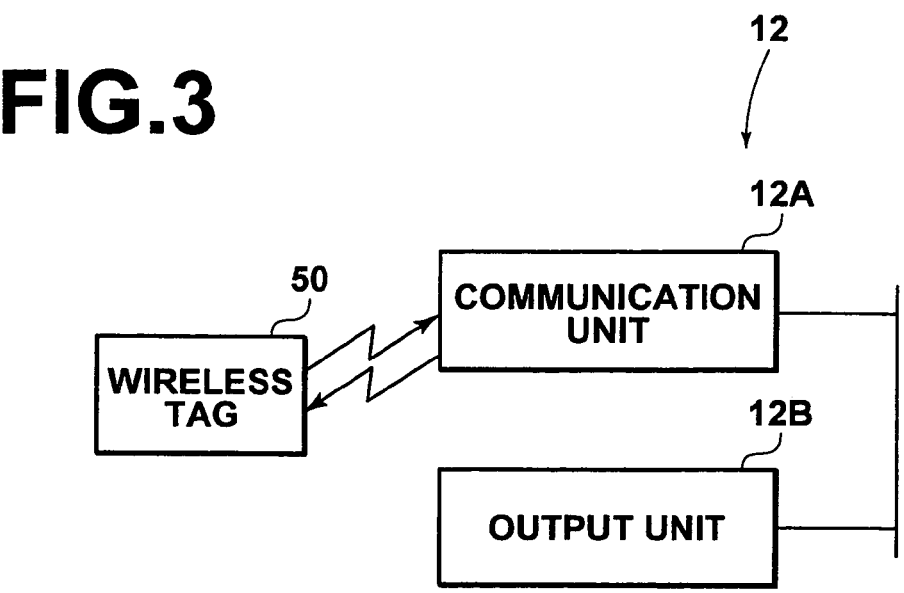
FIG. 3 is a block diagram showing the configuration of a wide range sensor in the first and fourth embodiments.

The wide range sensor 12 detects the customers U having the wireless tags 50 in the area 19. FIG. 3 is a block diagram showing the configuration of the wide range sensor 12. As shown in FIG. 3, the wide range sensor 12 comprises a communication unit 12A and an output unit 12B. The communication unit 12A transmits an inquiry signal representing inquiry information at predetermined intervals, and receives a reply signal from each of the wireless tags 50. The output unit 12B outputs a signal representing reception of the reply signal and reply information represented by the reply signal to the photography device 14.

The wide range sensor 12 counts the number of the customers U having the wireless tags 50 in an attraction 10.

Figure 4:
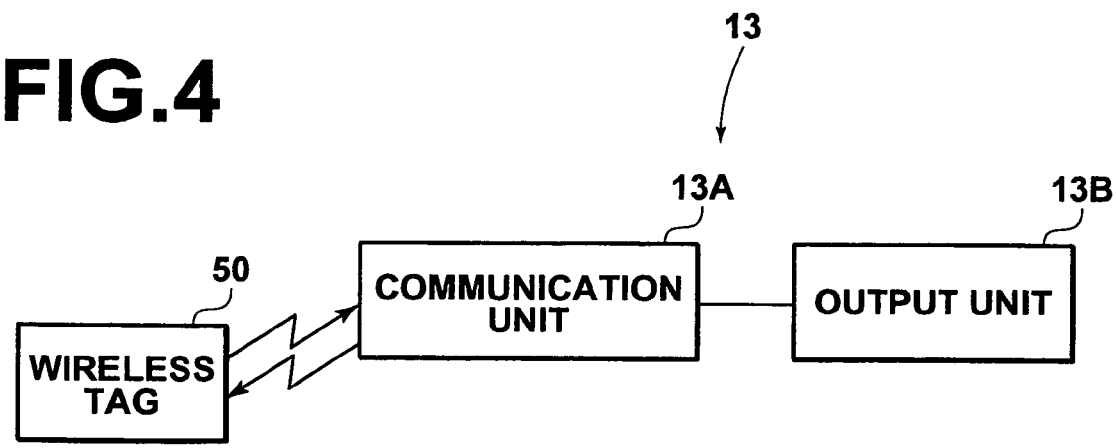
FIG. 4 is a block diagram showing the configuration of a communication device in the first and fourth embodiments.

The communication device 13 communicates with the customers U respectively having the wireless tags 50 in the photography range R. FIG. 4 is a block diagram showing the configuration of the communication device 13. As shown in FIG. 4, the communication device 13 comprises a communication unit 13A and an output unit 13B. The communication unit 13A transmits an inquiry signal representing the inquiry information at predetermined intervals, and receives a reply signal and a photography instruction signal from each of the wireless tags 50. The output unit 13B outputs the reply information represented by the reply signal received by the communication unit 13A to the photography device 14.

The reply information represented by the reply signal from each of the wireless tags 50 includes a tag ID (personal identification information). The tag ID is a number specific to each of the wireless tags 50. Therefore, each of the customers U holding the wireless tag 50 can be identified. The tag ID is written by a tag writing unit 21 of the customer registration apparatus A2.

Figure 5:
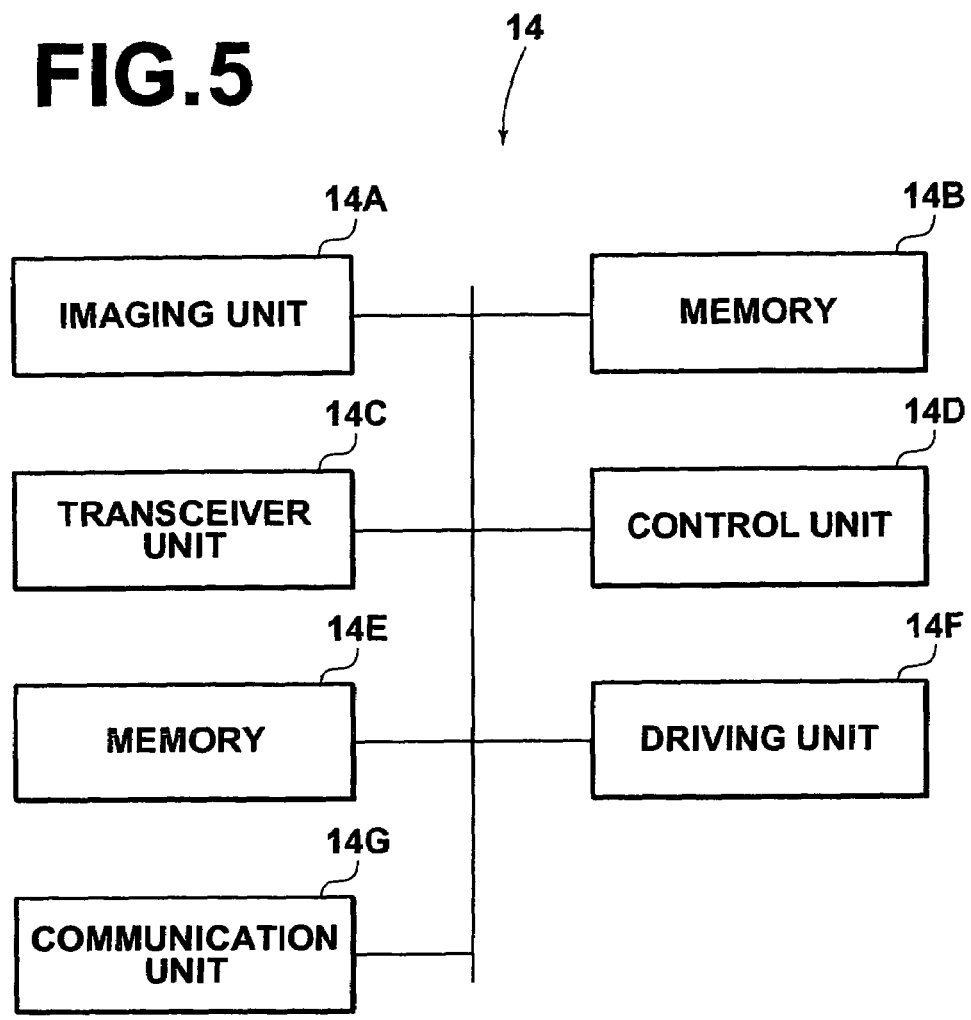
FIG. 5 is a block diagram showing the configuration of a photography device in the first and fourth embodiments.

FIG. 5 is a block diagram showing the configuration of the photography device 14. As shown in FIG. 5, the photography device 14 comprises a digital camera. The photography device 14 has an imaging unit 14A, a first memory 14B, a transceiver unit 14C, a control unit 14D, a second memory 14E, a driving unit 14F, and a communication unit 14G. The imaging unit 14A obtains the image data sets S1 by photography. The first memory 14B temporarily stores the image data sets S1. The transceiver unit 14C sends and receives signals to and from the gates 11A and 11B, the wide range sensor 12, the communication device 13, the display device 15, and the human sensors 16A and 16B. The control unit 14D controls the photography device 14. The second memory 14E stores a control program and various kinds of information. The driving unit 14F is used for panning and tilting the imaging unit 14A. The communication unit 14G is connected to the network 9.

In the photography device 14, the control unit 14D puts the imaging unit 14A on stand-by for photography, based on the signal sent from the wide range sensor 12 for representing reception of the reply signal by the wide range sensor 12. More specifically, the control unit 14D switches on the imaging unit 14A or cancels a sleep state of the imaging unit 14A in the case where the imaging unit 14A has been turned off or the imaging unit 14A has been in the sleep state for saving power consumption. In the case where the imaging unit 14A has already been turned on or not in the sleep state, the control unit 14D maintains the current state of the imaging unit 14A.

The photography device 14 changes a photography mode by understanding the number of visitors in the area 19 according to the information representing the number of visitors counted by the gates 11A and 11B. More specifically, the control unit 14D compares the number with a threshold value Th1. In the case where the number is smaller than the threshold value Th1 and appropriate for automatic photography, the control unit 14D switches the photography mode of the imaging unit 14A to an automatic photography mode. In the case where the number is not smaller than the threshold value Th1 and identification of each of the customers U becomes difficult for photography, the control unit 14D changes the photography mode of the imaging unit 14A to temporarily suspend photography.

In the case where the number is not smaller than the threshold value Th1, the customers U having the wireless tags 50 may be present in the photography range R, which makes identification of a specific one of the customers U difficult. Therefore, the photography mode may be set to a manual photography mode that enables manual photography through operation of the wireless tag 50 by each of the customers (hereinafter, the customer to be photographed is referred to as the customer U). In this case, the photography device 14 sends an instruction signal to the display device 15 for instructing the customer U to carry out photography. Since the reply information represented by the reply signal sent from each of the wireless tags 50 has the tag ID, the photography mode may be changed to a mode for photographing the customer U by calling the customer U from the display device 15, or to a mode for carrying out photography after telling other visitors to leave the photography range R. A photography mode may also be adopted that carries out photography after accessing the group management database DB3 based on the tag ID and detecting presence in the photography range R of all members in the same group as the customer U through acquisition of the tag IDs of the remaining members. This mode will be described in detail in a second embodiment and a third embodiment. In this embodiment, the photography mode is set to be the manual photography mode. In the manual photography mode, the customer U may be called for photography.

In the manual photography mode and in the photography mode for carrying out photography after calling the customer U, the customer U needs to be notified of photography. Therefore, the control unit 14D accesses the center server A4, and obtains information representing the name of the customer U by referring to the customer database DB2 according to the tag ID included in the reply information. The control unit 14D causes the display device 15 to call the name of the customer U.

The photography device 14 sends the reply information represented by the reply signal sent from the communication device 13 and the image data set Si obtained by photography of the customer U, from the communication unit 14G to the center server A4. The image data set S1 may be sent to the display device 15 to be displayed thereon.

The photography device 14 understands where the customer U is in the photography range R, based on a signal sent from the human sensors 16A and 16B. The photography device 14 pans and tilts the imaging unit 14A by using the driving unit 14F so that the customer U is captured in a view angle of the imaging unit 14A.

The image data set S1 obtained by the photography device 14 is sent to the center server A4, together with the reply information represented by the reply signal from the communication device 13, information on time and date of photography, and location information representing where the automatic photography system A1 is located. The information may be sent to the center server A4 in the form of a file separate from the image data set Si or together with the image data set S1 by being described in a header thereof. In this embodiment, the information is described in the header of the image data set S1.

Figure 6:
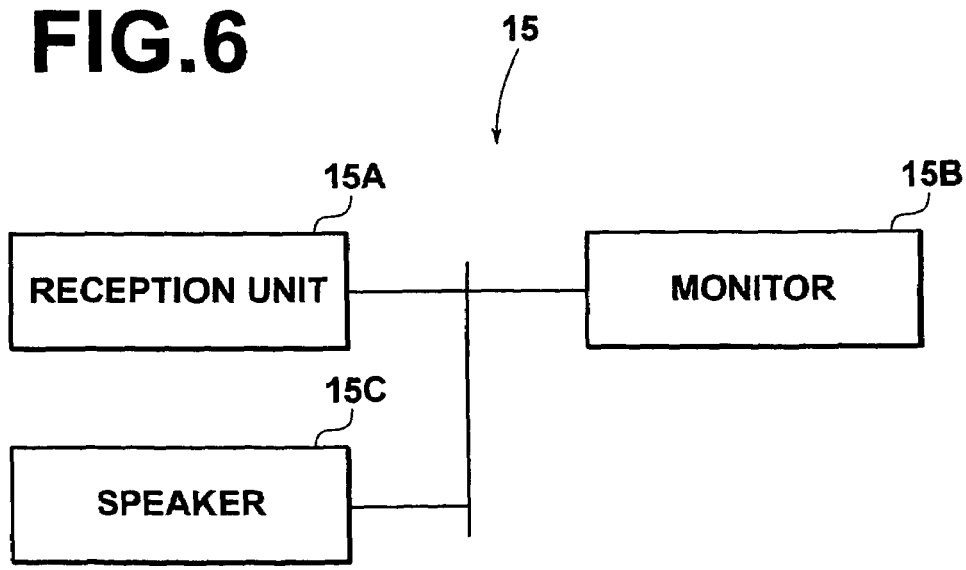
FIG. 6 is a block diagram showing the configuration of a display device in the first and fourth embodiments.

FIG. 6 is a block diagram showing the configuration of the display device 15. As shown in FIG. 6, the display device 15 comprises a reception unit 15A for receiving the image data set S1 and instruction signals representing various instructions from the photography device 14, a monitor 15B for displaying the image data set S1 and the various instructions, and a speaker 15C for outputting voice for instructing the customer to act for photography based on the instruction signals.

In the case where the customer U is called, as in the case where the photography mode is the manual photography mode or the mode for carrying out photography after calling the customer U, the photography device 14 instructs the display device 15 to output the voice by which the customer U is identified, such as "Tommy, we are going to photograph you" or "Annie, please press the photography button", for example.

The human sensors 16A and 16B detects the position of the customer U in the photography range R, and sends a position signal representing the position to the photography device 14 for panning and tilting the photography device 14. In this embodiment, the number of the human sensors is two. However, three or more human sensors may be used for improving detection accuracy regarding the position of the customer U.

FIG. 7 is a block diagram showing the configuration of the wireless tag 50. As shown in FIG. 7, the wireless tag 50 comprises a memory 51, a communication unit 52, a photography button 53, and a control unit 54. The memory 51 stores the tag ID and the like for identifying the customer U holding the wireless tag 50. The communication unit 52 receives the inquiry signal and sends the reply signal representing the reply information including the tag ID and the photography instruction signal. The photography button 53 is used for instructing photography in the manual photography mode. The control unit 54 controls operation of the wireless tag 50. The wireless tag 50 is formed to have a card-like shape so that the customer U can easily carry the tag. When the photography button 53 is pressed, the photography instruction signal is sent from the communication unit 52 to the communication device 13 for instructing photography.

A long-range RFID tag having a battery and communicable within several meters, for example, may be used as the wireless tag 50. The wireless tag 50 is distributed by the customer registration apparatus A2 to the customer U who wishes to be photographed by the automatic photography system A1. At this time, the name of the customer U is registered with the customer database DB2 in the center server A4. Therefore, the name of the customer U can be identified and the voice identifying the customer U can be output from the display device 15 at the time of photography, as has been described above.

FIG. 8 is a block diagram showing the configuration of the customer registration apparatus A2. As shown in FIG. 8, the customer registration apparatus A2 comprises the tag writing unit 21 for writing the tag ID in the wireless tag 50, a tag ejection unit 22 for ejecting the wireless tag 50, a, monitor 23 for displaying the content of registration and guidance information, a speaker 24 for outputting the guidance information as voice, a memory 25 for storing a program and various kinds of information for operating the customer registration apparatus A2, a control unit 26 for controlling operation of the customer registration apparatus A2, a communication unit 27 connected to the network 9, and an input unit 28 for receiving input of the customer information.

The control unit 26 acts as the personal registration unit 2a and the group registration unit 2b by carrying out the program stored in the memory 25. In the personal registration unit 2a, the information of the customer U that is input by the customer U with use of the input unit 28 is registered with the customer database DB2 in relation to the tag ID written by the tag writing unit 21. The group registration unit 2b registers the information that has been input with use of the input unit 28 on the group to which the customer U belongs and on whether or not image search is permitted for the group, with the group management database DB3 in relation to the tag ID written by the tag writing unit 21 and a group ID for identifying the group.

After the tag writing unit 21 writes the tag ID in the wireless tag 50, the tag ejection unit 22 ejects the wireless tag 50 having the tag ID written therein. The wireless tag 50 is held by the customer U whose customer registration has been carried out.

Figure 9:
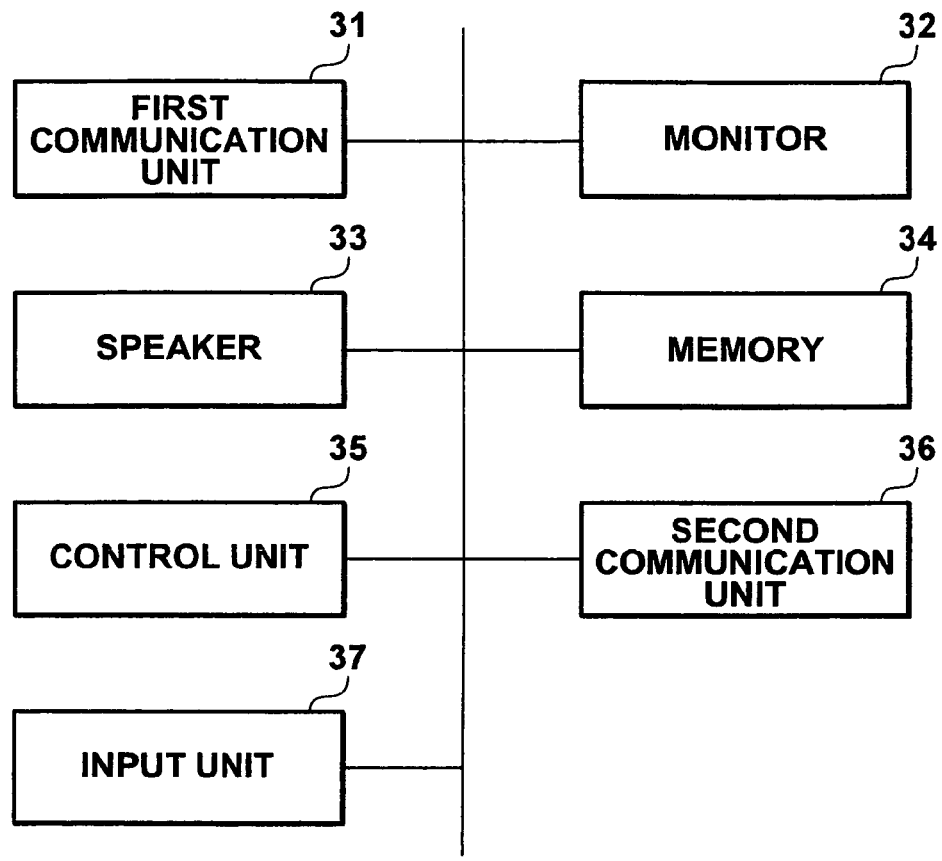
FIG. 9 is a block diagram showing the configuration of a terminal in the first and fourth embodiments.

FIG. 9 is a block diagram showing the configuration of the terminal A3. As shown in FIG. 9, the terminal A3 comprises a first communication unit 31, a monitor 32, a speaker 33, a memory 34, a control unit 35, a second communication unit 36, and an input unit 37. The first communication unit 31 communicates with the customer U having the wireless tag 50. The monitor 32 displays an image and information searched for or provided, and the guidance information. The speaker 33 outputs the provided information and the guidance information as voice. The memory 34 stores programs and various kinds of information for operating the terminal A3. The control unit 35 controls operation of the terminal A3. The second communication unit 36 is connected to the network 9. The input unit 37 receives input of various kinds of information by the customer U.

The control unit 35 functions as the group registration unit 3a, the group change unit 3b, the service information provision unit 3c, the image search unit 3d, the image order unit 3e, and the payment unit 3f by carrying out the programs stored in the memory 34. The difference between these units is caused by the programs executed by the control unit 35. The program to be carried out is determined by selection from a menu displayed on the monitor 32 by the customer U using a touch panel of the input unit 37. The monitor 32 and the speaker 33 function as the information output means.

The first communication unit 31 transmits the inquiry signal representing the inquiry information at predetermined intervals, and receives the reply signal from the wireless tag 50 of the customer U.

The reply information represented by the reply signal sent from the wireless tag 50 includes the tag ID (the identification information) for identifying the customer U. The control unit 35 sends the tag ID, a request code corresponding to an item selected from the menu by the customer U, and the content of the input by the customer U from the input unit 37, from the second communication unit 36 to the center server A4 via the network 9. After the center server A4 appropriately carries out processing according to the content and the like sent from the second communication unit 36, the control unit 35 displays or outputs the content and the like sent from the center server A4 on the monitor 32 or from the speaker 33 as the voice after processing thereof.

Figure 10:
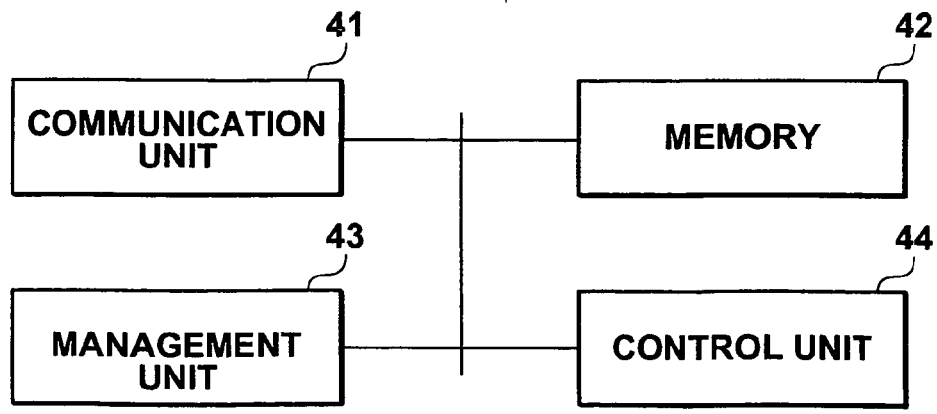
FIG. 10 is a block diagram showing the configuration of a center server in the first embodiment.

FIG. 10 is a block diagram showing the configuration of the center server A4. As shown in FIG. 10, the center server A4 comprises a communication unit 41, a large-capacity memory 42, a management unit 43, and a control unit 44. The communication unit 41 communicates with the automatic photography system A1, the customer registration apparatus A2, the terminal A3, and the laboratory 5 via the network 9. The memory 42 stores the image data sets S1, the image database DB1, the customer database DB2, the group management database DB3, the provision information database DB4, and the transaction list database DB5 and programs for operating the center server A4. The management unit 43 manages the image data sets S1 stored in the memory 42 by generating the image database DB1 to be stored in the memory 42. The control unit 44 controls operation of the center server A4.

The management unit 43 generates the image database DB1 from the information described in the header of each of the image data sets S1 (the header information) sent from the automatic photography system A1. The header information of each of the image data sets S1 includes the name of the file of the image data set S1, the tag ID of the wireless tag 50 held by the customer U represented by the reply information, the information on the time and date of photography, the location information, a camera ID, and photography information.

The management unit 43 classifies the image data sets S1 according to the customers U, based on the tag ID of each of the customers U included in the header information of the image data sets S1, and further sorts the image data sets S1 in ascending order of the time and date of photography based on the information on the time and date of photography described in the header information of each of the image data sets S1. In this manner, the management unit 43 generates the image database DB1.

The control unit 44 in the center server A4 executes a main program stored in the memory 42, and further starts a program necessary for a request code upon access from the customer registration apparatus A2 or from the terminal A3. The control unit 44 causes the program to carry out necessary processing such as database search, database update, and totaling, and sends data representing a result of the processing.

Figure 11:
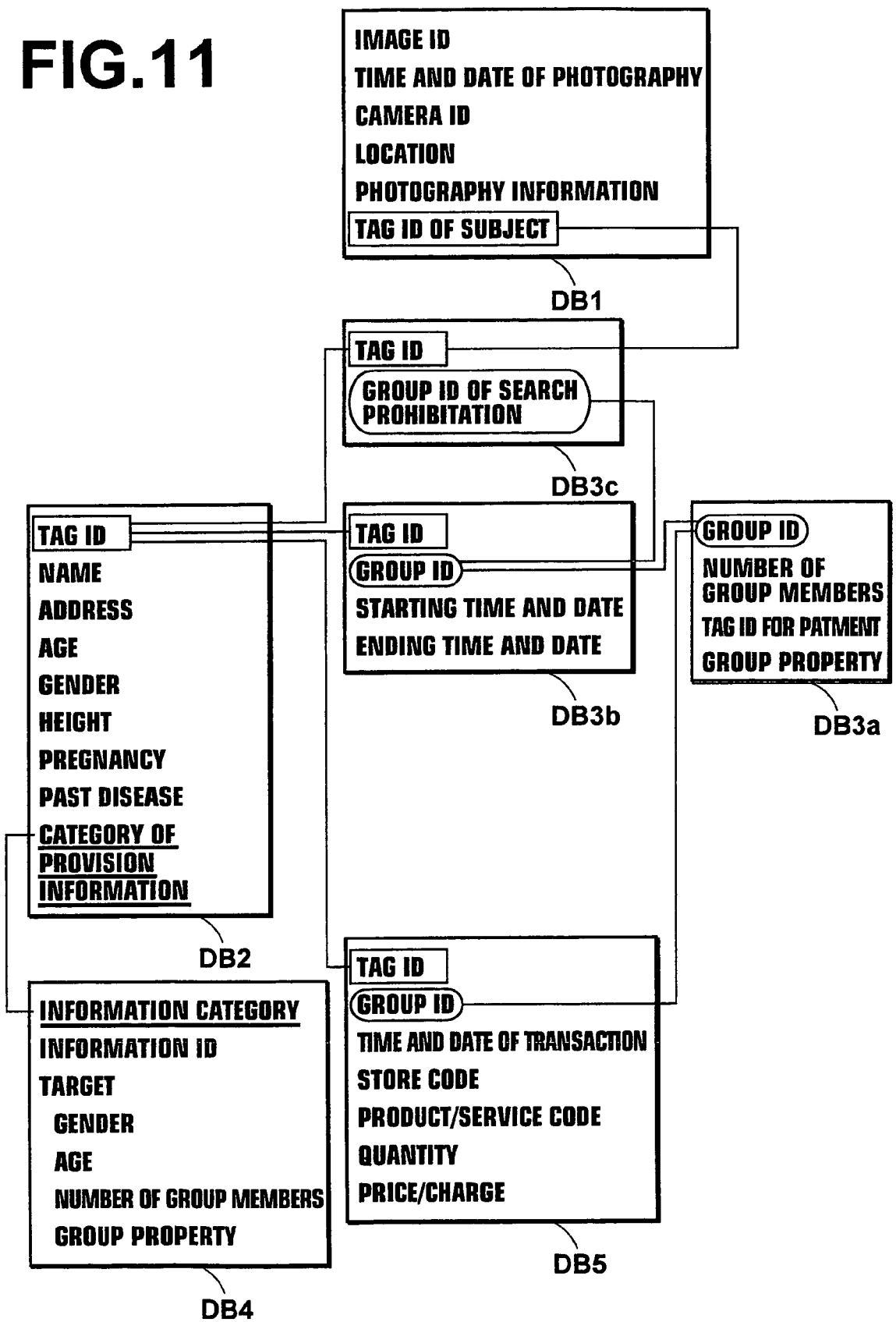
FIG. 11 shows structures of databases in the first embodiment.

FIG. 11 shows structures of the databases and relationships between the databases. In this example, the databases are relational databases, and data are stored in the form of tables. As shown in FIG. 11, the time and date of photography, the camera ID, the location, the photography information, and the tag ID of the subject in the image of the image ID representing the image file are registered with the image database (table) DB1 (see FIG. 12). The name, the address, age, gender, height, pregnancy or non-pregnancy, a past disease, and a category or categories of service information that can be provided are registered with the customer database (table) DB2 for the tag ID of the wireless tag 50 held by the customer U (see FIG. 13). The group management database DB3 comprises a master group table DB3a, a group membership table DB3b, and a search permission/prohibition management table DB3c. A group property, the tag ID of the wireless tag 50 held by one of the members in charge of payment in the group (only for the case where the group comprises a family), and the number of the members in the group are registered with the master group table DB3a for each group ID (see FIG. 14). The group membership table DB3b stores the tag ID of the wireless tag 50 held by each of the customers U as a member of the group, the group ID of the group to which the customers U belong, the starting time and date of membership of the group, and the ending time and date of the membership (see FIG. 15). The search permission/prohibition management table DB3c stores the group ID of a group that is not allowed to carry out image search among groups the customer U belongs to if the customer U belongs to the groups, for the tag ID of the wireless tag 50 held by the customer U (see FIG. 16). In a general rule, a member of a group to which a customer does not belong cannot search for an image of the customer. A member of a group to which a customer belongs can search for an image of the customer. However, in the case where image search by the other members is not desired, prohibition of the image search is registered. The provision information database (table) DB4 stores gender, age, the number of members in a group, and the group property, for each of the information categories as well as an information ID (see FIG. 17). The transaction list database (table) DB5 stores the group ID, time and date of transaction, a store code, a product/service code, a quantity, and a price/charge, for each of the tag IDs (see FIG. 18). The items to be registered in the databases are not necessarily limited to those described above, and items in accordance with intension of the databases can be registered.

Procedures carried out in this embodiment will be described next.

The customer U who uses the automatic photography system registers himself/herself with the customer registration apparatus A2 at the time he/she enters the theme park.

The personal registration unit 2a of the customer registration apparatus A2 displays a screen for selecting personal registration or group registration on the monitor 32, and outputs audio guidance from the speaker 24 for prompting the selection. The customer U selects personal registration by using a touch panel or the like of the input unit 28. The input unit 28 receives the selection of the personal registration, and displays a screen for personal registration on the monitor 32. The input unit 28 also outputs audio guidance from the speaker 24 for prompting the customer U to input and select items that are necessary. The customer U inputs and selects the name, the address, age, gender, and height of the customer U, pregnancy or non-pregnancy, a past disease, and the category or categories of the service information desired by the customer, with use of the touch panel or the like of the input unit 28. The personal registration unit 2a then examines the content of the input or selection. If an error is found, the item having the error is displayed with a mark in the personal registration screen on the monitor 23, and the speaker 24 outputs audio guidance for prompting correction of the error. If no error is found, the monitor 23 displays the personal registration screen filled with the items input and selected, and the speaker 24 outputs audio guidance for prompting final confirmation of the registration content. When the customer U confirms the content and selects "OK", the tag writing unit 21 newly writes the tag ID in the wireless tag 50, and the personal registration unit 2a relates the content of registration to the tag ID. The personal registration unit 2a then registers the content in relation to the tag ID with the customer database DB2 in the center server A4 via the communication unit 27 and the network 9. FIG. 13 shows an example of the content of registration. The tag ejection unit 22 ejects the wireless tag 50 storing the tag ID, and the wireless tag 50 is provided to the customer U.

In this embodiment, the types and the number of services to be provided to the customer U change, depending on a charge paid by the customer U. For example, the theme park provides information on the services such as display of a path along which the customer U has moved, display of vacancy and waiting time for a restaurant and reservation thereof, notification of a special event, order of the image photographed in the park and notification of progress in processing of the order, request for missing child search, request for lost and found, display of waiting time for an attraction and reservation thereof, and notification of admission control due to height or condition, and the charge paid by the customer U becomes different according to the types and the number of pieces of service information desired by the customer.

For this reason, the customer U registers the category or categories of the service information to be provided, by paying the charge at the time of property registration thereof.

A procedure of group registration by the customer U will be described next. Group registration is carried out by the group registration unit 2b of the customer registration apparatus A2 or by the group registration unit 3a of the terminal A3. In the description below, the procedure carried out by the group registration unit 2b will be described.

The group registration unit 2b of the customer registration apparatus A2 displays on the monitor 23 a message for confirming whether or not the customer U is accompanied by other member or members (hereinafter referred to as the other members) in the group after the personal registration. Audio guidance therefor is also output from the speaker 24. The customer U selects presence of group members by using the touch panel or the like of the input unit 28, and the input unit 28 receives selection of group member presence. A screen for personal registration of group members is displayed on the monitor 23, and audio guidance for prompting input and selection of the items necessary therefor is also output from the speaker 24. Thereafter, personal registration of the other group members is carried out in the same manner described above. After completion of personal registration of the other group members, a screen is displayed on the monitor 23 for selecting the group property and the member in charge of payment. Audio guidance therefor is also output from the speaker 24. After the customer U selects the group property and the member in charge of payment by using the touch panel or the like of the input unit 28, error check is carried out. The group registration unit 2b registers the information on the tag ID, the group ID, the group property, and the member in charge of payment with the group management database DB3 in the center server A4 via the communication unit 27 and the network 9. FIGS. 14 and 15 show examples of the content of registration. As shown in FIG. 14, the master group table DB3a has information on the group ID, the group property, the tag ID of the member in charge of payment, and the number of the members in the group, in relation to each other. The group membership table DB3b has the information on the tag ID of each of the members and the group ID in relation to the tag ID, as shown in FIG. 15. The starting time and date refers to the time of registration, and the ending time and date refers to the time and date of losing membership of the group. At the time of registration, the ending date is initially set to be Dec. 31, 9999.

Hierarchical group registration can also be carried out. In the example shown in FIGS. 14 and 15, groups represented by the group IDs "G2", "G3", and "G5" are registered under a group represented by the group ID "G4". The group G4 refers to a group comprising participants of a bus tour, and the groups G2, G3, and G5 are a couple, friends, and a couple, respectively. This relationship can be understood by appearance of the group ID "G4" in records of the tag ID corresponding to the group IDs "G2", "G3", and "G5" in FIG. 15.

The group registration unit 3a basically carries out the same procedure. However, in this case, since personal registration of the members of the group has been completed, the tag ID of the wireless tag 50 of each of the members is detected by the first communication unit 31 and read for registration with the group management database DB3 in relation to the group ID.

A procedure carried out for changing group registration by the customer U will be described next. The group change unit 3b of the terminal A3 carries out group registration change. Hereinafter, output of audio guidance from the speaker 33 is carried out appropriately upon necessity, which is thus not mentioned specifically below.

The customer U operates the touch panel of the input unit 37 according to display on the monitor 32 of the terminal A3, and selects an item for group registration change. The group change unit 3b communicates with the wireless tag 50 of the customer U by using the first communication unit 31. The group change unit 3b reads the tag ID of the wireless tag 50, and accesses the group management database DB3 in the center server A4 via the second communication unit 36 and the network 9. The group change unit 3b therefore obtains the information on group registration of the customer U, and displays a screen on the monitor 32 for prompting the customer U to select either membership cancellation or addition to a new group. In the case where the customer U selects membership cancellation by using the input unit 37, the group change unit 3b displays a list of the groups to which the customer U belongs on the monitor 32 for prompting the customer U to select one of the groups whose membership is no longer desired by the customer U. When the customer U selects the group by using the input unit 37, the group change unit 3b accesses the group membership table DB3b in the center server A4 via the second communication unit 36 and the network 9, and updates the ending time and date of the record having the tag ID of the customer U and the group ID of the selected group to the current time and date. The group change unit 3b also updates the number of the members of the group in the master group table DB3a. In the case where the customer U selects addition to a new group, the group change unit 3b displays on the monitor 32 a message for prompting reading of the wireless tag 50 of a member of the new group. The first communication unit 31 communicates with the wireless tag 50 of the member of the new group, and reads the tag ID of the wireless tag 50. The group change unit 3b also accesses the group management database DB3 of the center server A4 via the second communication unit 36 and the network 9, and obtains the information on group registration of the member in the new group. The group change unit 3b then displays on the monitor 32 a list of groups to which the member of the new group currently belongs, and prompts the customer U to select either selection of one of the groups to which the customer U wishes to belong newly or registration of a new group. In the case where the customer U selects a predetermined one of the groups from the list by using the input unit 37, the group change unit 3b accesses the group membership table DB3b of the center server A4 via the second communication unit 36 and the network 9. The group change unit 3b then inserts a record having the tag ID of the customer U and the group ID of the selected group in the group membership table DB3b, and updates the number of the members of the master group table DB3a. In the case where the customer U selects registration of a new group, the group change unit 3b displays on the monitor 32 a screen for selecting the group property and the like of the new group for causing the customer U to input selection by using the input unit 37. The group change unit 3b then accesses the master group table DB3a of the center server A4 via the second communication unit 36 and the network 9 for inserting a record having the group ID of the new group. The group change unit 3b also accesses the group membership table DB3b and inserts a record having the tag ID of the customer U and the new group ID and a record having the tag ID of the new member and the new group ID in the group membership table DB3b.

In the example shown in FIG. 15, the customer having the tag ID "8" has canceled membership of the group "G3" at 13:00 on Sep. 9, 2003. At the same time, the customer forms the new group "G5" with a customer whose tag ID is "6". Since the ending time and date of the record having the group ID "G3" and the tag ID "6" has not changed from the initial value, the customer whose tag ID is "6" has not cancelled his/her membership of the existing group "G3". It is also shown that a customer whose tag ID is "7" has become a new member of a group "G6" comprising members whose tag IDs are "9" and "10".

Figure 19:
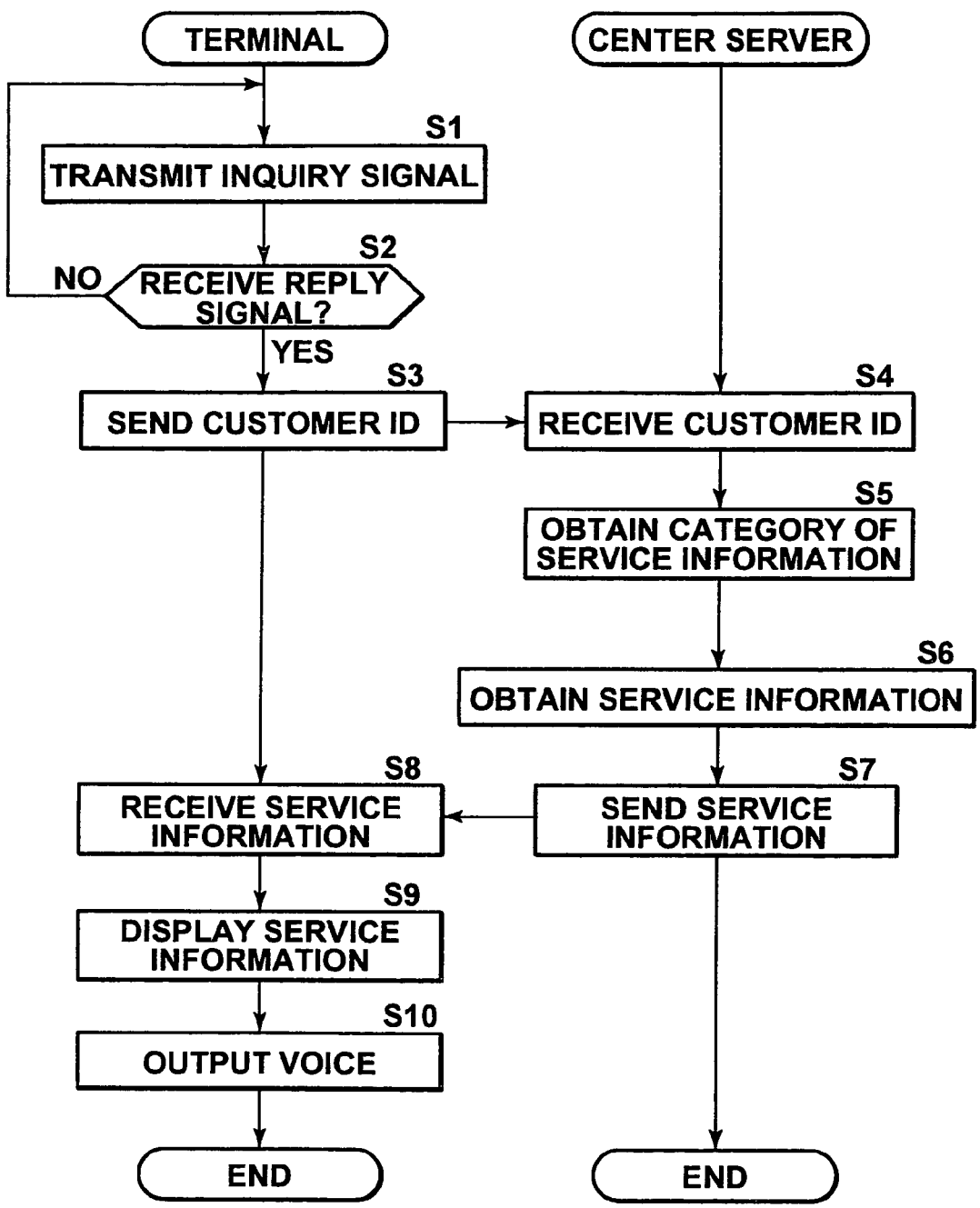
FIG. 19 is a flow chart showing a procedure carried out when service information is provided in the first embodiment.

A procedure carried out when the service information is provided to the customer U will be described next. FIG. 19 is a flow chart showing the procedure carried out for providing the service information in the first embodiment. The procedure carried out by the service information provision unit 3c of the terminal A3 will be described here. The control unit 35 of the terminal A3 causes the first communication unit 31 to constantly transmit the inquiry signal (Step S1), and monitors whether or not the first communication unit 31 has received the reply signal from the wireless tag 50 of the customer U (Step S2). If a result at Step S2 is affirmative, the tag ID included in the reply information represented by the reply signal is sent from the second communication unit 36 to the center server A4 (Step S3). If the result at Step S2 is negative, the procedure returns to Step S1.

In the center server A4, the communication unit 41 receives the tag ID (Step S4), and the control unit 44 refers to the customer database DB2 stored in the memory 42 to obtain the information on the category or categories of the service information registered by the customer U corresponding to the tag ID (Step S5). The service information to be provided is then obtained from the provision information database DB4 (Step S6). For example, for a customer represented by the tag ID "2" in the customer database DB1 in FIG. 13, the category of the information he/she wishes to be provided is "restaurant". Therefore, the information represented by the category "restaurant" in the provision information database DB4 in FIG. 17 is a candidate of the information to be provided. According to the group membership table DB3b shown in FIG. 15, the customer belongs to a group represented by the group ID "G1". The group property of the group "G1" is "family" and the number of members in the group is 3, according to the master group table DB3a shown in FIG. 14. Therefore, among records whose category is "restaurant" in the provision information database DB4 shown in FIG. 17, information whose ID is "restaurant B, 4-seat table, vacancy" is selected and obtained as the information that agrees with conditions for provision. The information to be provided can be determined based on not only the group property but also the personal properties registered with the customer database DB2 and personal properties such as age and gender of a target of information provision registered with the provision information database DB4.

The service information obtained in this manner is then sent to the terminal A3 (Step S7).

In the terminal A3, the second communication unit 36 receives the service information (Step S8), and the control unit 35 displays the service information on the monitor 32 (Step S9). The control unit 35 also outputs voice representing the service information from the speaker 33 (Step S10) to end the procedure.

Figure 20:
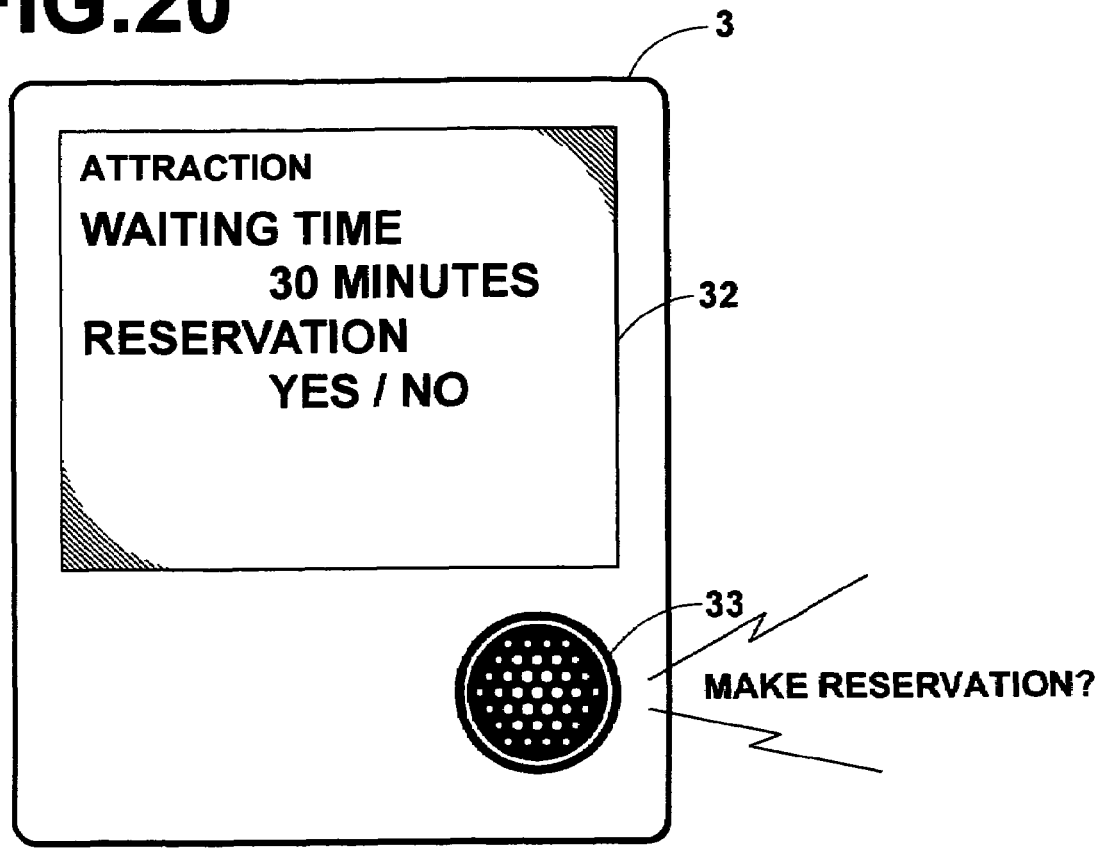
FIG. 20 shows how the service information is output from the terminal in the first embodiment.

FIG. 20 shows an example of the service information output from the terminal A3. An example of providing the service information on waiting time for an attraction and reservation thereof will be described here. As shown in FIG. 20, the waiting time and characters representing necessity or no necessity of reservation are displayed on the monitor 32. Voice asking intention of reservation is also output from the speaker 33. The monitor 32 is a touch panel, and the customer U can select reservation or no reservation by touching the corresponding characters on the monitor 32.

Figure 21:
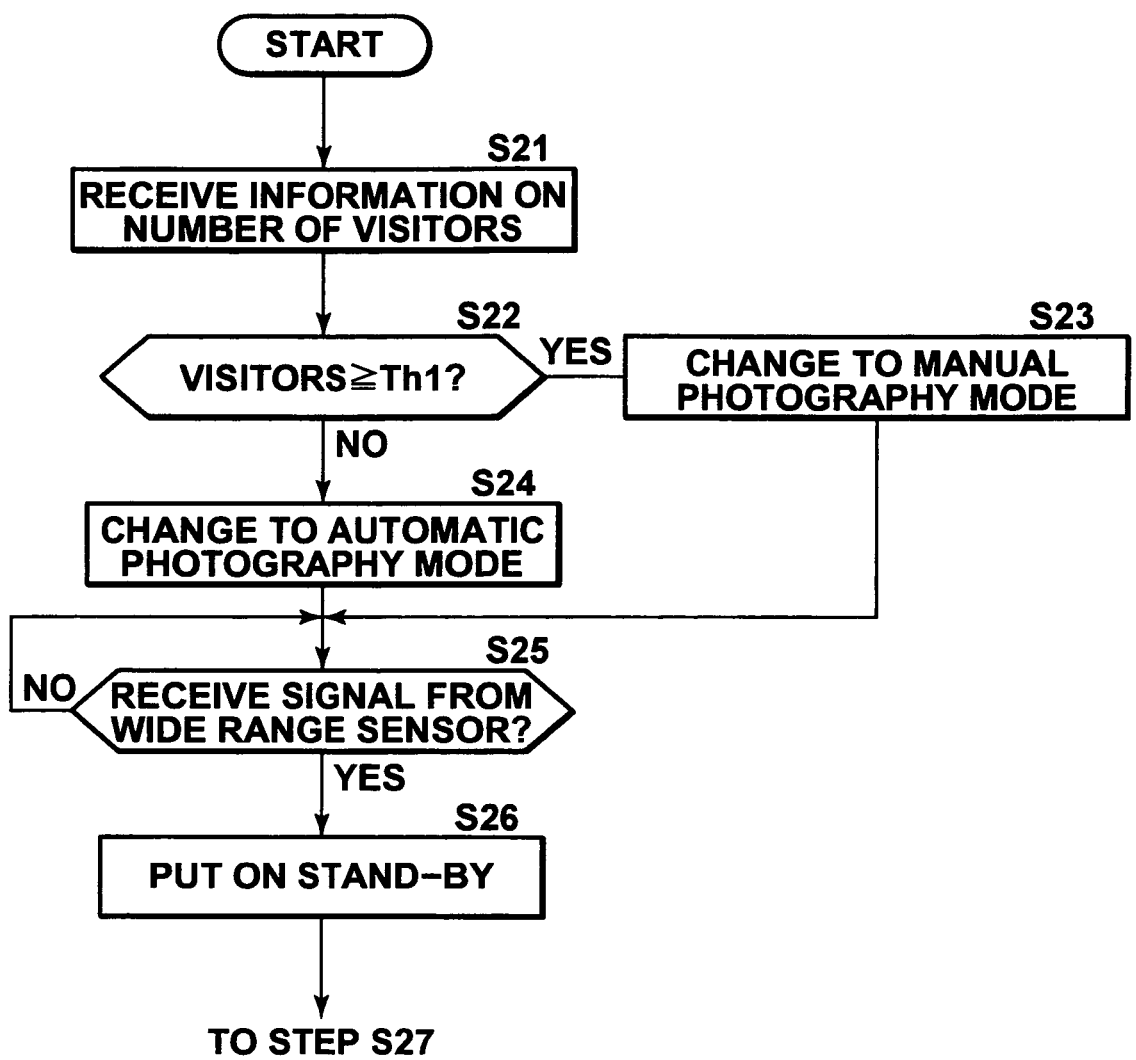
FIG. 21 is a flow chart showing a procedure carried out at the time of photography by the automatic photography system in the first and fourth embodiments (part 1)
Figure 22:
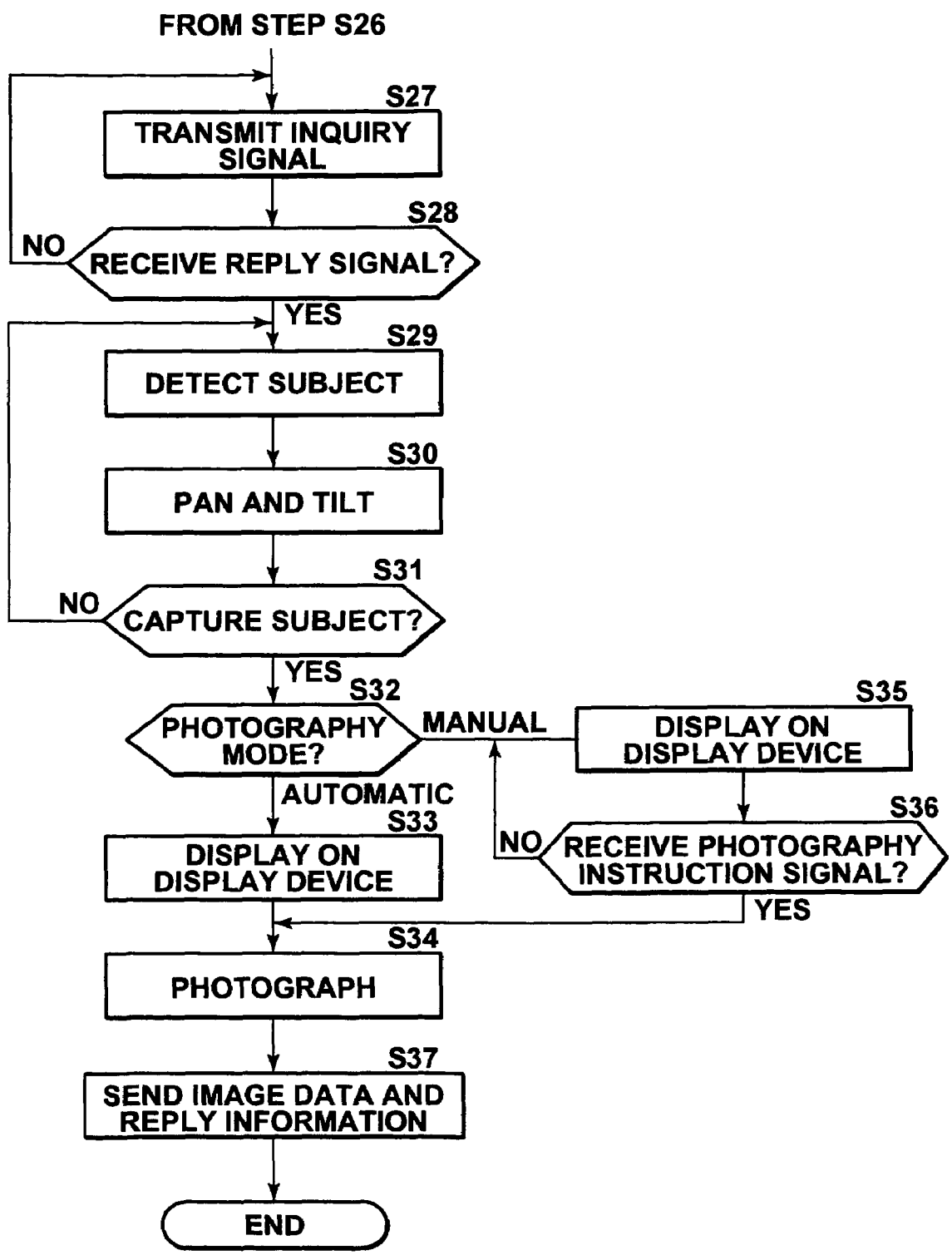
FIG. 22 is a flow chart showing the procedure carried out at the time of photography by the automatic photography system in the first and fourth embodiments (part 2)

A procedure carried out when the customer U uses the automatic photography system A1 will be described next. FIGS. 21 and 22 are flow charts showing the procedure carried out by the automatic photography system A1 at the time of photography.

The control unit 14D of the photography device 14 is always receiving the information on the number of visitors from the gates 11A and 11B (Step S21), and compares the number with the threshold value Th1 (Step S22). If the number is not smaller than the threshold value Th1 at Step S22, the control unit 14D sets the imaging unit 14A to the manual photography mode (Step S23), and the procedure goes to Step S25. In the case where the number is not smaller than the threshold value Th1 at Step S22, the imaging unit 14A may be set to the manual photography mode or the mode of photography by calling the customer, as has been described above.

If the number is smaller than the threshold value Th1 at Step S22, the control unit 14D sets the imaging unit 14A to the automatic photography mode (Step S24). The control unit 14D then starts monitoring of whether or not the signal representing reception of the reply signal has been sent from the wide range sensor 12 (Step S25). If a result at Step S25 is affirmative, the control unit 14D causes the imaging unit 14A to stand by for photography (Step S26).

The control unit 14D causes the communication device 13 to constantly transmit the inquiry signal (Step S27), and starts monitoring of whether or not the communication device 13 has received the reply signal from the wireless tag 50 of the customer U in the photography range R (Step S28). If a result at Step S28 is affirmative, the control unit 14 causes the human sensors 16A and 16B to detect the customer U in the photography range R (Step s29). The control unit 14D also pans and tilts the imaging unit 14A for capturing the customer U (Step S30). If the result at Step S28 is negative, the procedure returns to Step S27.

The control unit 14D judges whether or not the imaging unit 14A has captured the customer U (Step S31). If a result at Step S31 is negative, the procedure returns to Step S29. If the result at Step S31 is affirmative, the control unit 14D judges whether the photography mode is the automatic photography mode or the manual photography mode (Step S32).

In the case of automatic photography mode, the control unit 14D displays the instruction for photography on the display device 15 (Step S33), and the imaging unit 14A obtains the image data set S1 by carrying out photography of the customer U according to the timing indicated by the voice of photography instruction from the display device 15 (Step S34).

In the case of manual photography mode, the control unit 14D displays on the display device 15 the instruction to cause the customer U to press the photography button 53 of the wireless tag 50 (Step S35). The control unit 14D starts monitoring of whether or not the communication device 13 has received the photography instruction signal sent from the wireless tag 50 in response to pressing the photography button 53 by the customer U (Step S36). If a result at Step S36 is affirmative, the procedure returns to Step S34 whereat the imaging unit 14A obtains the image data set S1 by photography.

The control unit 14D sends the image data set S1 and the reply information represented by the reply signal sent from the wireless tag 50 to the center server A4 via the communication unit 14G (Step S37) to end the procedure.

In the center server A4, the management unit 43 generates the image database DB1 from the header information of each of the image data sets S1 sent from the automatic photography system A1 in the above manner. FIG. 12 shows an example of the content of the image database DB1.

Figure 23:
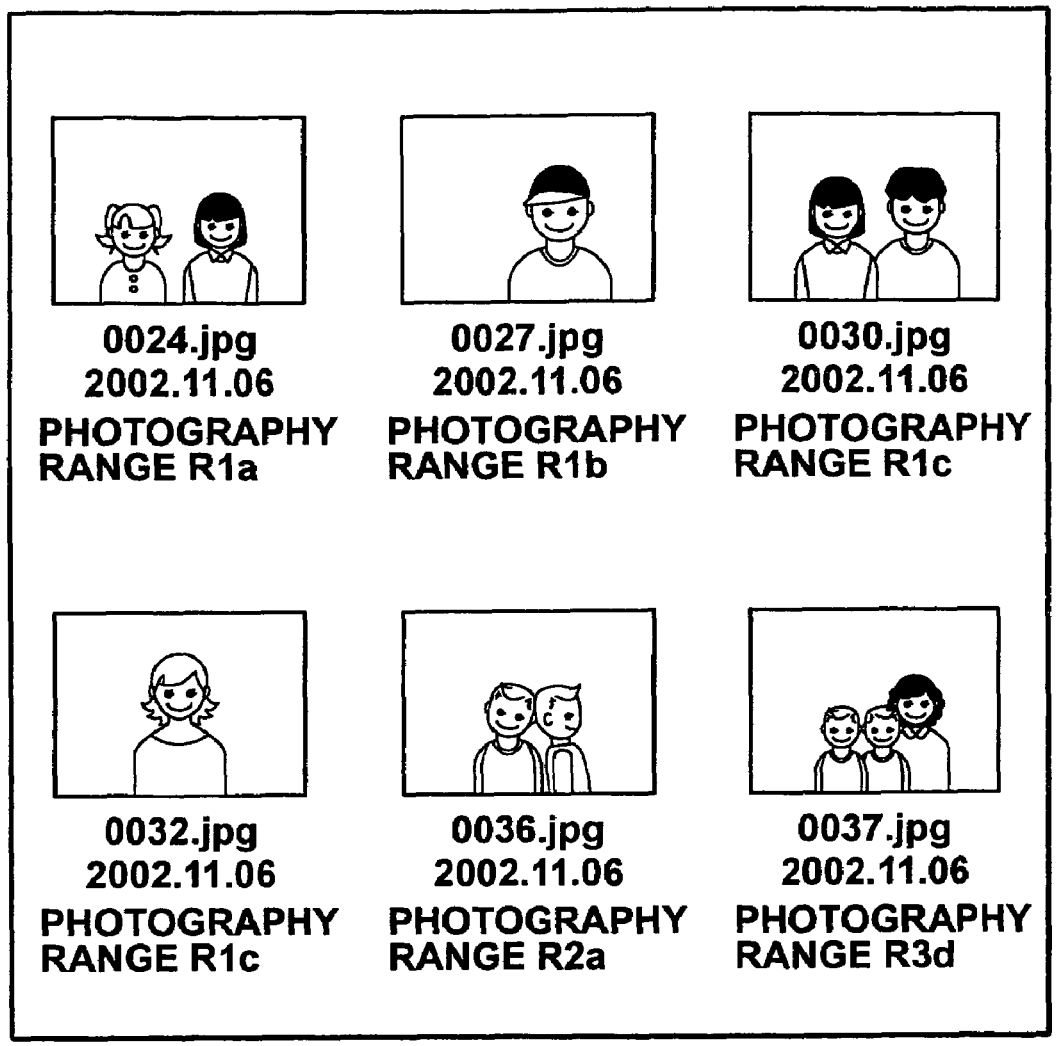
FIG. 23 shows a catalog of thumbnail images in the first and fourth embodiments.

Thereafter, the customer U searches for the images or places an order therefor by using the terminal A3. In the terminal A3, when the first communication unit 31 receives the reply information from the wireless tag 50 of the customer U, the image search unit 3d accesses the center server A4 via the second communication unit 36 and the network 9 for sending the tag ID included in the reply information to the center server A4. The control unit 44 in the center server A4 searches the image database DB1 stored in the memory 42 by using the tag ID as a search key, and obtains the image data sets S1 classified according to the tag ID. Based on the tag ID, the control unit 44 accesses the group membership database DB3b, and obtains the group ID of the group to which the customer U belongs. The control unit 44 also obtains the tag IDs of the other members in the images if the members are included therein, and accesses the search permission/prohibition management table DB3c by using the tag IDs as search keys. The control unit 44 judges if there are any groups that are not permitted to search, among the members in the image. If a corresponding group is found in the groups in the database, the members in the group corresponding to the group ID cannot search for the images even if the members belong to the same group. For example, in the case shown in FIG. 16, although a customer whose tag ID is "5" belongs to the group whose ID is "G4" as shown in FIG. 15, the group ID that is not allowed to search is the group "G4" for the customer "5". Therefore, even if one of the members in the same group "G4", such as the customer represented by the tag ID "8", carries out image search for obtaining the image represented by the image ID "P011" in the image database DB1 shown in FIG. 12, the image cannot be displayed. In the case where image search is permitted, the image data set sets S1 obtained through the search are sent to the terminal A3. The terminal A3 displays the image data sets S1 on the monitor 32. More specifically, a catalog of thumbnail images of the image data sets S1 sorted by the file names thereof is displayed on the monitor 32 as shown in FIG. 23. The catalog includes the file name, the time and date of photography, and the name of the photography range for each of the images.

Permission or prohibition of the search can be set by the group registration unit 2b or 3a, based on an input by the customer U from the input unit 37 according to display on the monitor 32.

The images related to the tag ID of the customer U are shown in this example. However, the group ID of the group to which the customer U belongs may be obtained by accessing the group membership table DB3b according to the tag ID of the customer U so that the tag IDs of the other members in the group having the group ID can also be obtained. In this case, images related to the tag IDs of the other members can also be obtained. In this manner, images having the members of the same group can all be displayed.

The customer U selects a part of the thumbnail images from the catalog for placing the order for printing or recording in a CD-R, according to guidance displayed on the monitor 32 or output from the speaker 33. The customer U also selects a template used for printing composite images, and places the order. The input unit 37 of the terminal A3 receives the order, and places the order from the center server A4 via the second communication unit 36 and the network 9. A plurality of templates may be prepared so that the template used for printing can be changed according to the group property and the number of the members in the master group table DB3a and according to the gender and the age in the customer database DB2.

In the case where the order is placed from the center server A4, the center server A4 sends to the laboratory 5 the image data sets S1 whose printing has been ordered. The laboratory 5 prints the image data sets S1 or writes the image data sets S1 in a CD-R according to the order. The laboratory 5 accesses the customer database DB2 and the group management database DB3 of the center server A4 for generating only one print for one image in the case where the group property is "family" and for generating a print to each of the members of the group otherwise.

A procedure of payment by the customer U will be described next. Payment is made by using the terminal A3.

When payment is selected from the menu displayed on the monitor 32 of the terminal A3, the first communication unit 31 communicates with the wireless tag 50 of the customer U, and obtains the tag ID thereof. The payment unit 3f accesses the group management database D33 of the center server A4 via the second communication unit 36 and the network 9, and judges whether or not the customer U represented by the tag ID is in charge of payment. More specifically, in the case of a customer represented by the tag ID "1" in FIG. 15, the payment unit 3f accesses the group membership table DB3b and obtains the group ID "G1". The payment unit 3f then obtains the tag ID "1" of the customer in charge of payment in the group "G1", by accessing the master group table DB3a. Since the tag ID "1" of the customer U who is going to pay agrees with the tag ID "1" of customer in charge of payment in this case, the payment unit 3f judges that the customer U can pay. In the case where the customer U has been judged that he/she is not in charge of payment, the fact is displayed on the monitor 32. In the case of the customer U in charge of payment, the payment unit 3f accesses the transaction list database DB5, and calculates a total by obtaining a transaction list of all the members in the group. More specifically, in the case of the customer whose tag ID is "1", records shown in FIG. 18 are obtained from the transaction list database DB5, and the total is calculated to be "¥3150". The center server A4 sends the records and the total to the terminal A3. In the terminal A3, the records and the total are displayed on the monitor 32, and the customer U is prompted to select a method of payment.

The customer U pays the total by selecting a desired payment method such as payment by credit card.

As has been described above, in the theme park system of the first embodiment, the group registration unit 2*b* or 3*a* registers the customers U as the members of the respective groups by relating the tag IDs thereof to the corresponding group IDs. The means for providing the services provide the services such as provision of the service information, automatic photography, image search, order placement, and payment. In the following points, the complex forms of the groups can be flexibly and appropriately dealt with, and provision of the services that are more convenient for the groups can be realized.

Firstly, the group registration unit 2*b* or 3*a* registers the group property in relation to each of the group IDs, and the means for providing the services provide the services according to the group property. Therefore, the groups are not dealt with uniformly, and provision of the services that are different from group to group can be realized. In this manner, the flexible, appropriate, and detailed services can be provided, which is effective.

More specifically, in the case of the automatic photography service, the image order unit 3*e* can select one of the templates selectable at the time of order placement and the laboratory 5 determines the number of prints such as 1 for a family and 1 for each member of a group of friends, based on the group property identified by the group ID related to the tag ID or IDs related to each of the images. Therefore, the service can be provided appropriately to the respective groups.

In the case of the information provision service, the information appropriate for the members of the group is output based on the group property identified by the group ID related to the tag ID of the customer U. For example, in the information provision on the theme park, information on waiting time for a family-oriented attraction is provided to a family group. Therefore, the information can be provided appropriately to the respective groups.

Secondly, since the group registration unit 2*b* or 3*a* can register the unique tag ID of the customer in relation to the group IDs of two or more groups, the case can be flexibly and appropriately dealt with where the customer belongs to the plurality of groups. In this manner, each of the customers can receive the appropriate services as a member of each of the groups, which is effective.

Thirdly, the group change unit 3*b* can change the customer identified by the tag ID to a member of another group by relating the tag ID of the customer, which has been related to the group ID of his/her original group, to the group ID of the new group. Therefore, a change in a group configuration can be dynamically dealt with as in the case where a customer belongs to a group in the morning but belongs to another group in the afternoon, for example. Consequently, the services to be provided can also be changed dynamically, which is effective.

Furthermore, since the group change unit 3*b* can register the effective period of membership of the customer in each of the groups in relation to the group ID thereof, a more complex change in the forms of groups such as cancellation of membership and addition of a group can be flexibly dealt with, which is also effective.

Fourthly, the means for providing the services provide the services according to the number of group members. Therefore, the services can be provided in more consideration of groups, which is also effective.

More specifically, in the information provision service, the information appropriate for the members of the group can be output according to the number of the members in the group identified by the group ID related to the tag ID of the customer U as the member. Therefore, for example, notification of vacancy of an attraction in the theme park or vacancy of a table having a predetermined number of seats in a restaurant can be provided, which is effective.

Fifthly, in the automatic photography service, whether an image can be searched for by the image search unit 3*d* can be determined for each of the groups identified by the group ID related to the tag ID or IDs related to the image. Therefore, each of the members can set security of image search for each of the groups, which makes provision of the service highly practical.

Sixthly, the group registration unit 2*b* or 3*a* can register the tag ID of the member in charge of payment for predetermined goods and/or services in relation to the group ID of the group. In payment, the prices and/or charges for the goods and/or services are totaled up for the group, and the member in charge of payment can pay collectively for the goods and/or services for the group. Consequently, the customer can easily manage the transaction, and the system can carry out more efficient processing than in the case of separate payment.

In this embodiment, the group ID of each of the groups is managed by the center server A4. However, the group ID may also be written in the wireless tag 50.

In this embodiment, the means for storing the information for identifying the customer is the wireless tag 50. However, the means may be a mobile communication terminal such as a PHS or a cellular phone.

In this embodiment, group registration is carried out by the input from the customer registration apparatus A2 or from the terminal A3. However, a wireless tag dedicated to a pre-registered group may be distributed. Furthermore, a wireless tag dedicated to the group property such as family, couple, or friends may be distributed.

Figure 24:
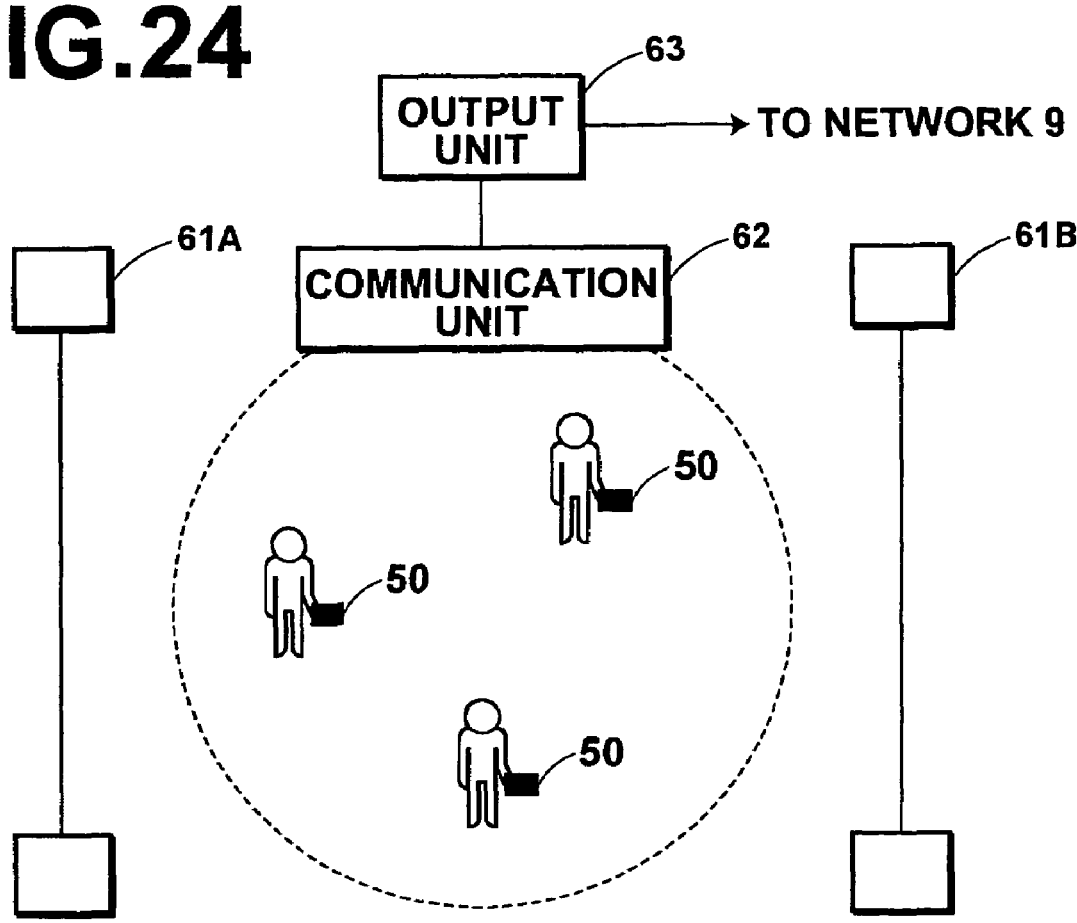
FIG. 24 shows an example of group registration means using a group registration zone in the first embodiment.

After distribution of the wireless tag 50, the wireless tag 50 of each of the members of the group may be scanned collectively. More specifically, group registration means using a group registration zone shown in FIG. 24 may be used. As shown in FIG. 24, the group registration means comprises a first gate 61A, a second gate 61B, a communication unit 62, and an output unit 63. The communication unit 62 transmits an inquiry signal representing inquiry information at predetermined intervals, and receives the reply signal from one or more of the wireless tags 50 in a communicable range between the two gates. The output unit 63 outputs the reply information represented by the reply signal received by the communication unit 62 to the network 9. Group registration by the means is carried out in the following manner. Firstly, the first gate 61A opens and members in a group enter an area between the gates. The first gate 61A is then closed, and the communication unit 62 detects all the wireless tags 50 in the communicable range for reading the tag ID written in each of the wireless tags. The output unit 63 sends information on the tag IDs to the center server A4 via the network 9, and the center server A4 judges that the tag IDs sent thereto are tag IDs of the members of the group. Therefore, the center server A4 issues the group ID thereto and registers the group ID with the group management database DB3. After completion of registration, the second gate 61B opens, and the members leave the area. If registration is carried out in the above manner, registration can be carried out more easily and in a shorter time than in the case of using a predetermined terminal.

If the theme park system in this embodiment comprises a database for storing history of use of facilities such as attractions and restaurants used by the customers, how the facilities are used, such as a path, the facilities used therein, and the time spent in the facilities, can be understood for each of the properties of the customers by using the properties of the customers registered with the customer database DB2. In addition, by using the information registered with the group management database DB3, how the groups move and how the groups use the facilities can also be understood, which enables the information to be used for marketing. Therefore, a flow of visitors in the theme park can be controlled, for example.

An automatic photography system in a theme park system of the second embodiment of the present invention will be described next.

Figure 25:
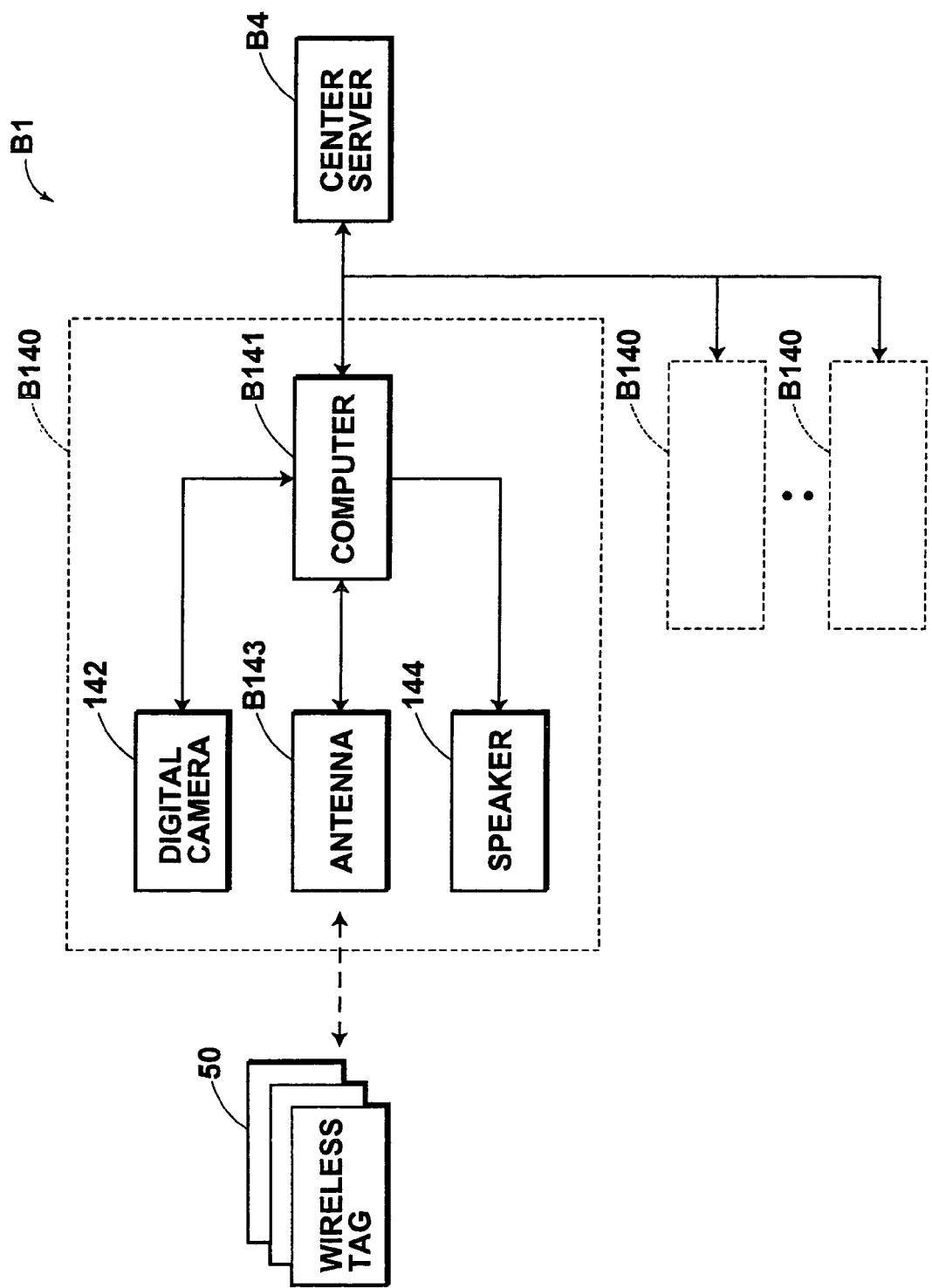
FIG. 25 is a block diagram showing an automatic photography system in a second embodiment of the present invention.

FIG. 25 is a block diagram showing the automatic photography system in the second embodiment.

An automatic photography system B1 in FIG. 25 comprises a plurality of photography devices B140 for automatically photographs customers as a subject, a wireless tag 50 held by each of the customers and transmitting identification information, and a center server B4 for storing an image data set obtained by each of the photography devices B140.

A long-range RFID tag having a battery and communicable within several meters, for example, may be used as the wireless tag 50. The wireless tag 50 is distributed to each of members in a group using services by the automatic photography system B1. The wireless tag 50 stores a customer ID (a tag ID) specific to each of the customers as the member of the group. Customer information necessary for the services, such as the name and the address of each of the customers, is obtained from the customers at the time of distribution of the wireless tag 50. For the members belonging to the same group, the same group ID is issued, and the customer ID, the group ID, and the customer information are stored in a customer ID database in the center server B4 shown in FIG. 26 in relation to each other. In this manner, the wireless tag 50 transmits only the customer ID information, which contributes simplification of communication.

Different groups may wish to photograph themselves together after group registration. In this case, in order to photograph the different groups as one group, the customer ID database can store the group ID (related group ID) of the group different from the group of the customers, in addition to the customer IDs, the group ID of the original group, and the customer information. The related group ID can be registered according to an instruction from the customers.

Each of the photography devices B140 comprises a digital camera 142 for photographing the subject, an antenna B143 for detecting the wireless tags 50 held by the subject and for communicating with the wireless tags 50, a speaker 144 acting as notification means, and a computer B141 connected to the digital camera 142, the antenna B143, and the speaker 144. The photography devices B140 are installed in a theme park having the automatic photography system B1 installed therein.

The computer B141 comprises a communication control unit for communicating with the center server B4, and a CPU/memory. The computer B141 functions as position detection means for detecting a position of each of the customers based on the identification information received by the antenna 143 and means for controlling timing of photography by the digital camera 142.

Figure 27:
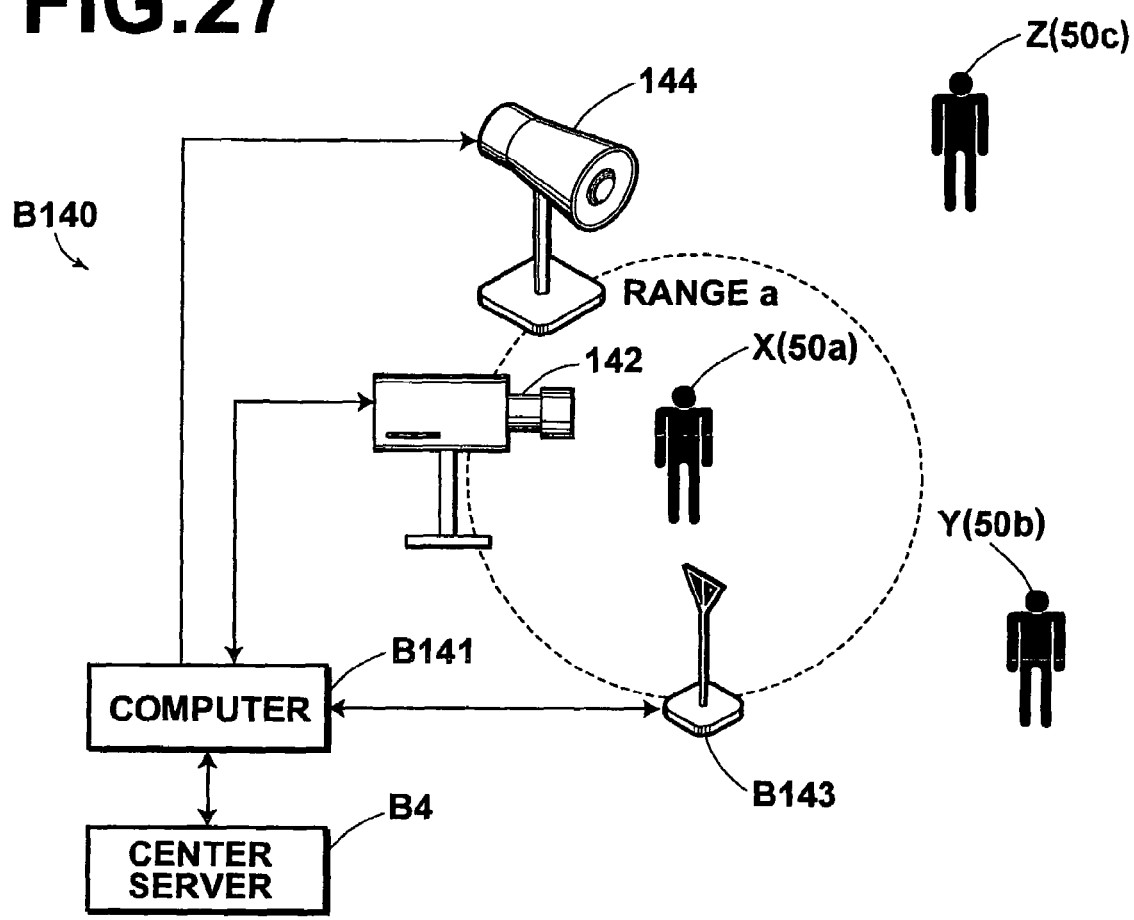
FIG. 27 shows an example of how a photography device is installed in the automatic photography system in the second embodiment.

FIG. 27 shows an example of installation of the photography devices B140 in the theme park. Each of the digital cameras 142 is installed at a position where a predetermined photography spot in the theme park can be photographed. The corresponding antenna B143 is installed in a position where the wireless tag 50 in a photography range (range a) of the digital camera 142 can be detected. The corresponding speaker 144 is installed at a position where the photography timing can be notified to the photography range and its periphery.

Each of the photography devices B140 has a location ID specific to the place of installation thereof. The image data set obtained by photography by each of the digital cameras 142 is added with an image ID specific thereto. The computer B141 sends to the center server B4 the image data set together with photography information comprising time and date of photography, the location ID, the group ID or IDs of the group or groups that have been photographed, the customer ID of each of the members in the group or groups, and the image ID of the image data set. The photography information is stored in a photography information database in the center server B4 shown in FIG. 28. The image data set is also stored in an image database in the center server B4.

The center server B4 comprises a communication control unit, a storage unit, and a CPU/memory. The communication control unit communicates with the computer B141 of each of the photography devices B140, with order terminals not shown but installed in the theme park, and with output means that is used for image output but is not shown. The storage unit stores the customer ID database, the photography information database, the image database, and the like. The CPU/memory controls the communication unit and the storage unit described above. The center server B4 functions as group information management means for managing the information on the group to which each of the customers belongs in relation to the identification information.

A procedure carried out by the automatic photography system B1 will be described next.

The wireless tag 50 is distributed to each of the customers in each of the groups to use the services. At this time, the customer information necessary for the services, such as the name and address of each of the customers, is obtained from the customers. The same group ID is issued to the customers in the same group, and the customer ID, the group ID, and the customer information are stored in the customer ID database in the center server B4 in relation to each other.

Figures 28, 29:
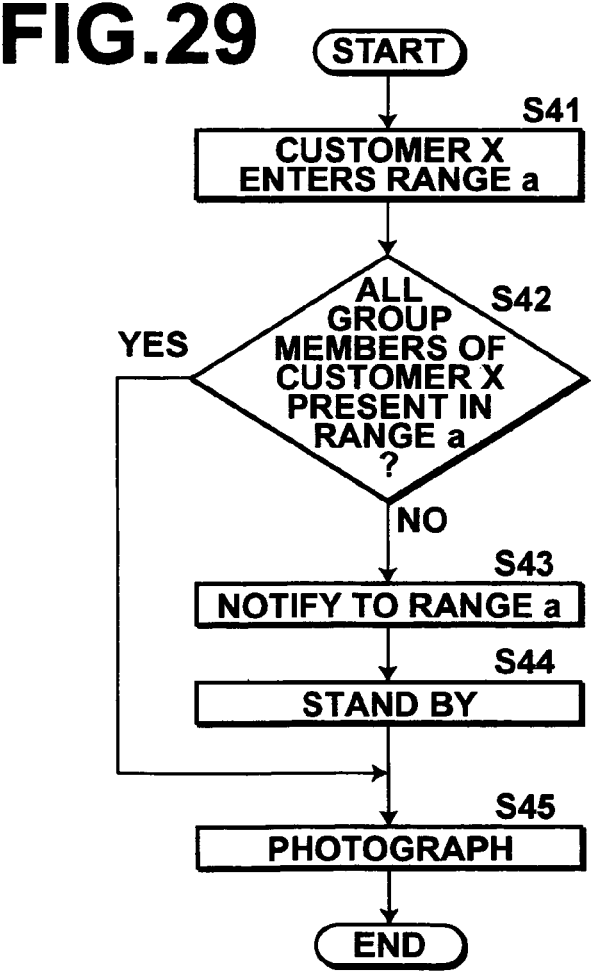
FIG. 28 shows a photography information database in the automatic photography system in the second embodiment.
FIG. 29 is a flow chart showing a procedure from determination of photography timing to actual photography in the second embodiment.

A procedure starting from determination of photography timing to actual photography when the customers enter the photography spot will be described with reference to a flow chart shown in FIG. 29.

In the description below, the customers in the group to be photographed are referred to as customers X, Y, and Z while the wireless tags held by the customers are referred to as 50a, 50b, and 50c, respectively.

When the customer X enters the photography range (the range a) of any one of the digital cameras 142, the corresponding antenna B143 receives the customer ID (the identification information) of the customer X from the wireless tag 50a of the customer X (Step S41)

The customer ID received by the antenna B143 is sent from the computer B141 to the center server B4. The center server B4 receives the customer ID of the customer X, and searches the customer ID database for the group ID of the customer X and the customer ID of each of the other customers in the group. The group ID and the customer ID are sent to the computer B141. If the group ID has the related group ID, the customer ID of each of members in the related group is also obtained from the database.

The computer B141 confirms whether or not the wireless tags 50 of the customers received from the center server B4 are present in the range a (Step S42).

In the case where the customers Y and Z of the group of the customer X who firstly entered the range a are present in the range a, the digital camera 142 photographs the customers (Step S45). In the case where either the customer Y or Z or both the customers Y and Z are not present in the range a, a message calling the other customers of the group of the customer X, such as "Members of group MM, please come to the camera for photography" is announced from the corresponding speaker 144 to the range a and the periphery thereof (Step S43). The camera 142 waits for photography for a predetermined period (Step S44). After waiting for the predetermined period, photography is carried out even if not all the members in the group of the customer X are present (Step S45).

At the time of photography at Step S45, preferable photography can be carried out by letting the customers to pose according to the photography timing if the photography timing is notified from the speaker 144. More specifically, a message such as "Now counting down, 3, 2, 1, Cheese!" may be announced. Furthermore, by causing customers that are not to be photographed to leave the range by announcement of a message such as "Group MM is going to be photographed. Guests other than the members, please leave the area in front of the camera", preferable photography can be realized. Instead of announcement from the speaker 144, a signal for notifying the photography timing may be sent at predetermined timing to the wireless tag 50 of each of the customers to be photographed. In this case, if the wireless tag 50 has a small speaker or an LED, a message may be announced from the speaker or the LED may be caused to blink in response to reception of a timing notification signal. In this manner, the photography timing can be notified with certainty to the customers to be photographed.

The computer B141 sends to the center server B4 the image data set together with the photography information comprising the time and date of photography, the location ID, the group ID or IDs of the group or groups that have been photographed, and the customer IDs of the customers that have actually been photographed. The photography information is stored in the photography information database in the center server B4. The image data set is also stored in the image database in the center server B4.

The image data set obtained in the above manner is output in response to an order placed by any one of the customers. Hereinafter, a flow of providing the image data set will be described.

When any one of the customers having the wireless tag 50 accesses one of the order terminals (not shown), the order terminal starts order reception. The order terminal obtains the customer ID from the wireless tag 50 held by the customer, and sends the customer ID to the center server B4.

The center server B4 searches for the group ID of the customer who accessed the order terminal, based on the customer ID received from the order terminal. The center server B4 then extracts the photography information corresponding to the group ID from the photography information database, and extracts the image data set of the group or groups including the customer who accessed the order terminal from the image database according to the photography information. The image data set is sent to the order terminal.

The order terminal displays the image data set received from the center server B4, and causes the customer to input a quantity and a form of output, for example. The information input in this manner is sent to the center server B4.

The center server B4 outputs the image data set to the output means (not shown) according to the information on the order, and ends the procedure.

In the configuration described above, photography can be carried out at a preferable timing in automatic photography, in order to include all the customers comprising the group or groups to be photographed as much as possible.

The third embodiment of the present invention will be described next. In the third embodiment, the configuration of an automatic photography system is different from that of the automatic photography system in the second embodiment. Description of the same elements as the second embodiment will be omitted unless it is necessary.

Figure 30:
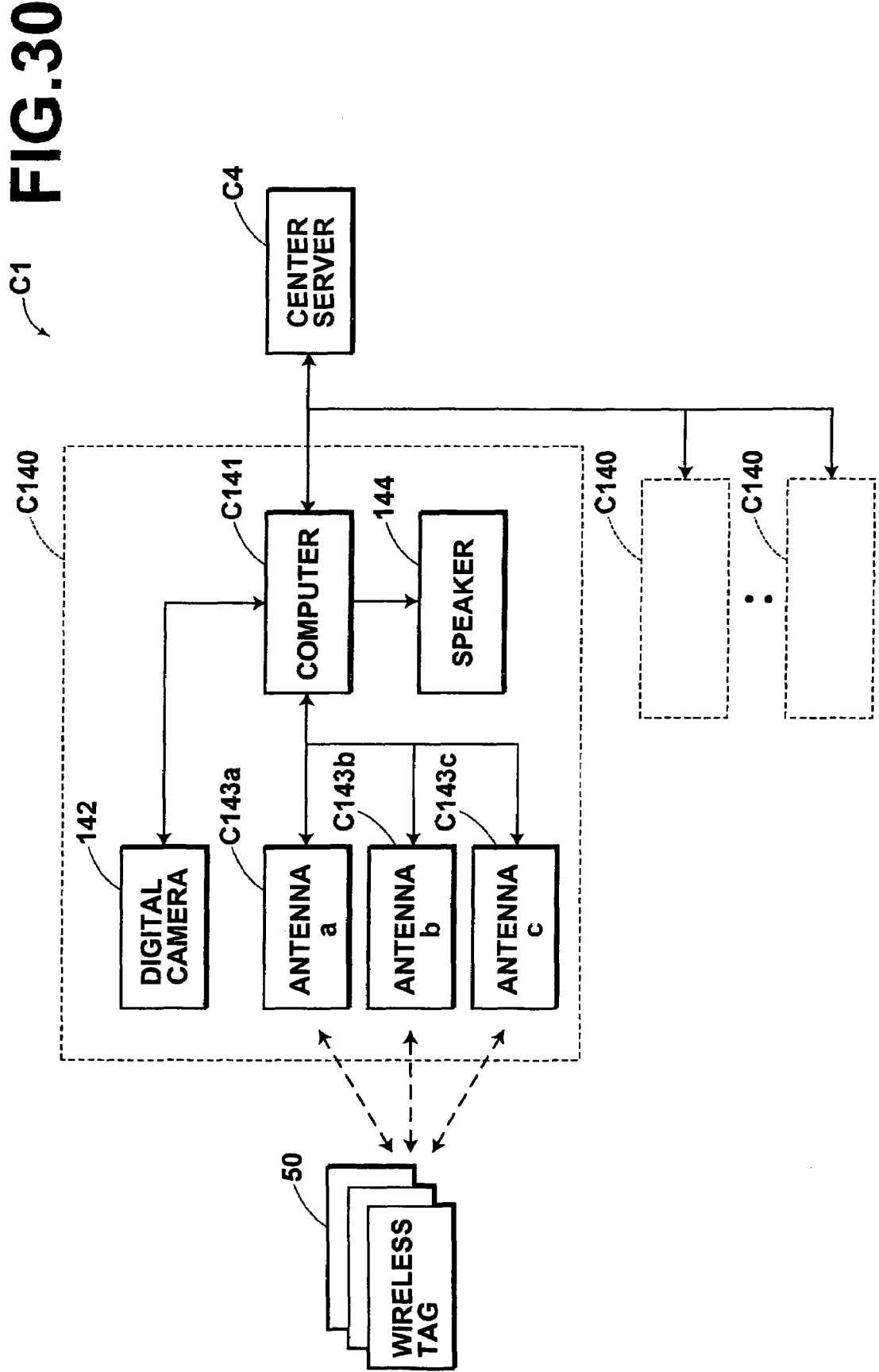
FIG. 30 is a block diagram showing an automatic photography system in a third embodiment of the present invention.

FIG. 30 is a block diagram showing the automatic photography system in the third embodiment. In an automatic photography system C1 in this embodiment, each of photography devices C140 comprises a digital camera 142 for photographing a subject, antennas C143A, C142B, and C143C for detecting a wireless tag 50 held by the subject and for communicating with the wireless tag 50, a speaker 144 as notification means, and a computer C141 connected to the digital camera 142, the antennas C143A, C143B, and C143C, and the speaker 144. The photography devices C140 are installed in a theme park having the automatic photography system C1 therein.

Figure 31:
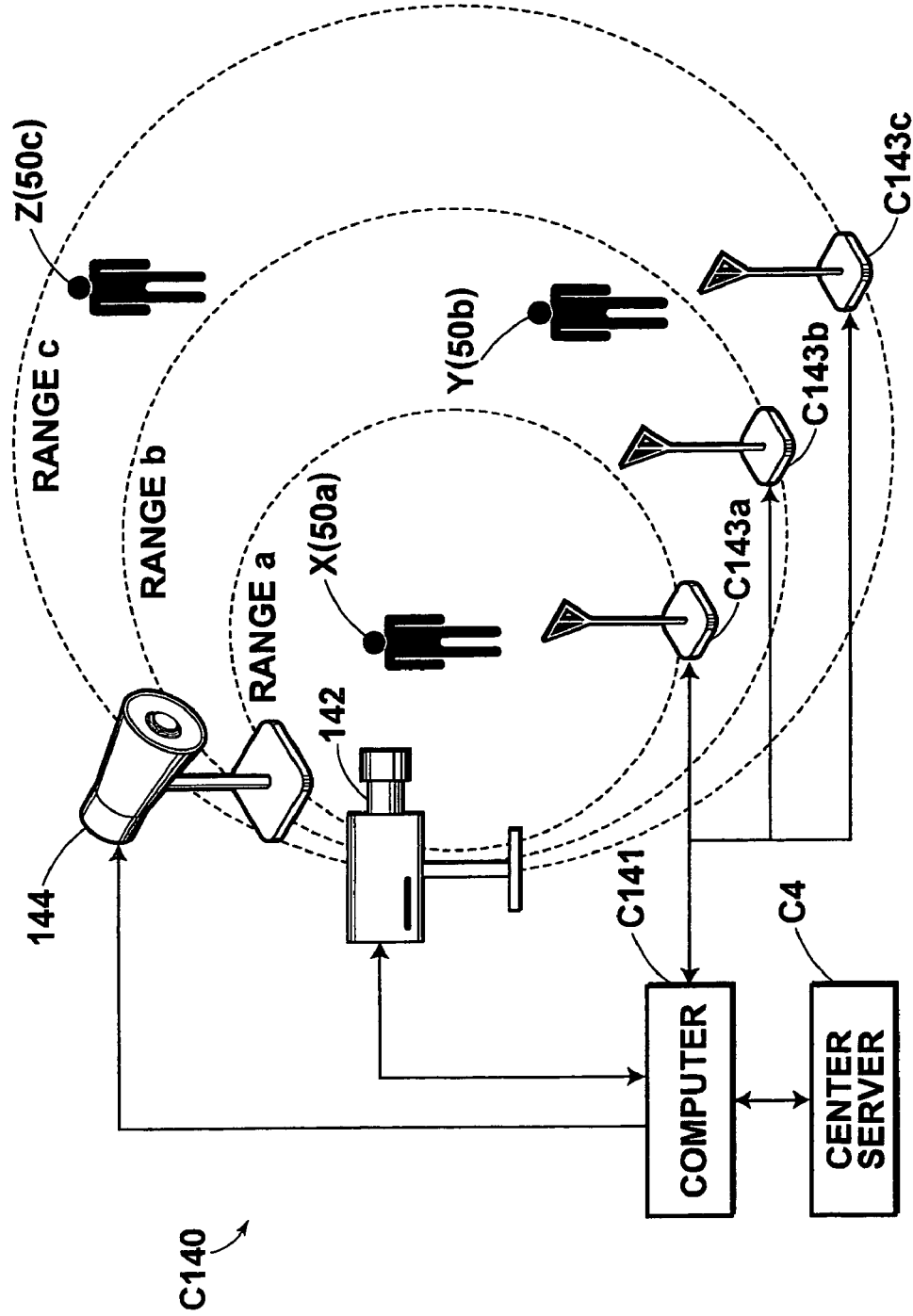
FIG. 31 shows an example of how a photography device is installed in the automatic photography system in the third embodiment.

FIG. 31 shows an example of installation of one of the photography devices C140 in the theme park. The digital camera 142 is installed at a position where a predetermined photography spot in the theme park can be photographed. The antenna C143A is installed at a position where the wireless tag 50 in a photography range (range a) of the digital camera 142 can be detected. The antenna C143B is installed at a position where the wireless tag 50 in a range (range b) surrounding the range a can be detected. The antenna C143C is installed at a position where the wireless tag 50 in a range (range c) surrounding the range b 142 can be detected. The speaker 144 is installed at a position where the photography timing can be notified to the ranges a, b, and c.

The computer C141 detects which of the ranges a, b, and c the subject is located in, based on which of the antennas C143A, C143B, and C143C has detected the wireless tag 50 held by the subject.

A procedure carried out by the automatic photography system C1 will be described next.

The wireless tag 50 is distributed to each of customers in a group to use services. At this time, customer information necessary for the services, such as the name and address of each of the customers, is obtained from the customers. The same group ID is issued to the customers in the same group, and a customer ID, the group ID, and the customer information are stored in a customer ID database in a center server C4 in relation to each other.

Figure 32:
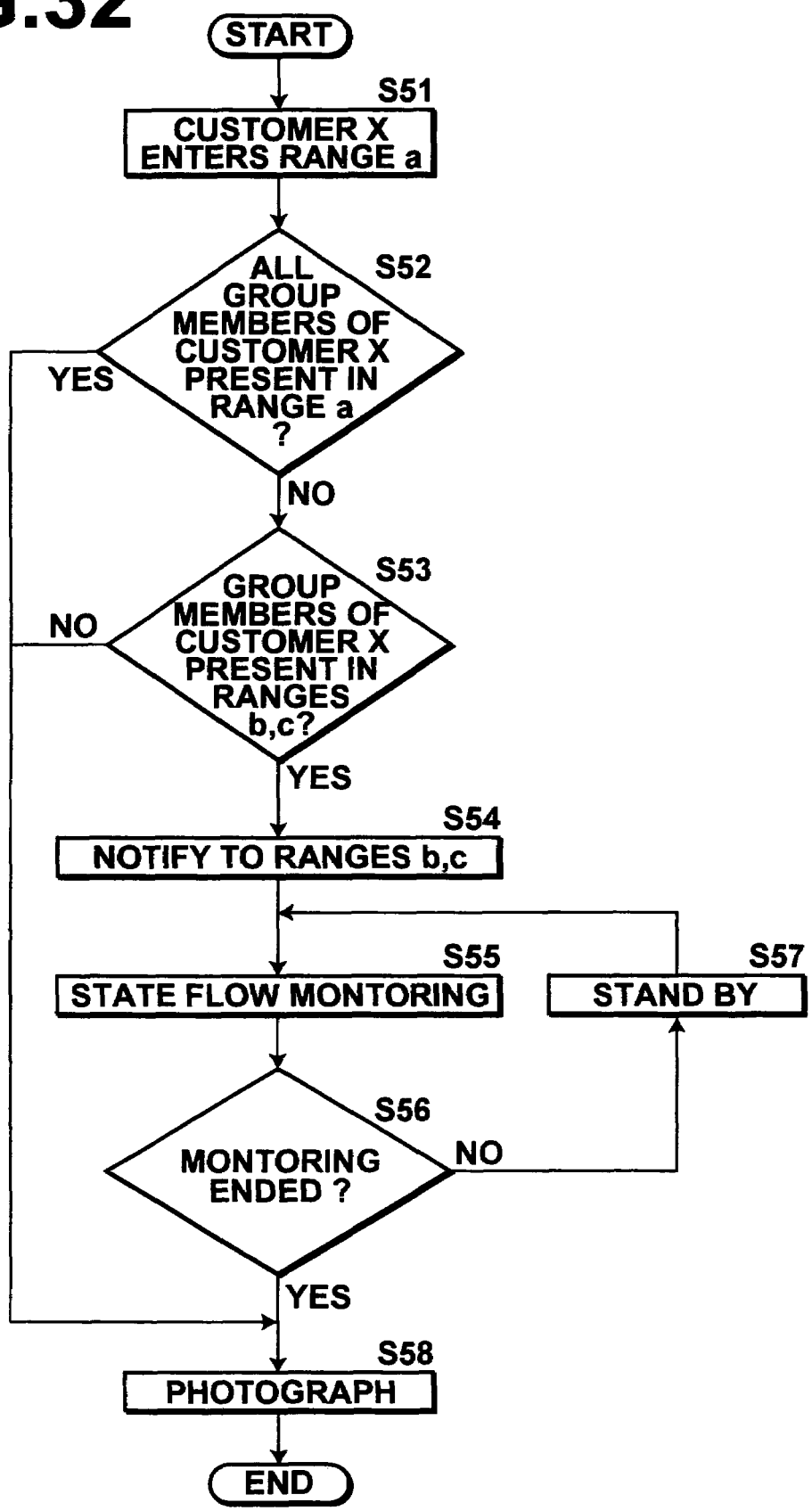
FIG. 32 is a flow chart showing a procedure from determination of photography timing to actual photography in the third embodiment.

A procedure starting from determination of photography timing to actual photography when the customers enter the photography spot will be described with reference to a flow chart shown in FIG. 32.

In the description below, the customers in the group to be photographed are referred to as customers X, Y, and Z while the wireless tags 50 held by the customers are referred to as 50a, 50b, and 50c, respectively.

When the customer X enters the photography range (the range a) of the digital camera 142, the antenna C143A receives the customer ID (personal identification information) of the customer X from the wireless tag 50a of the customer X (Step S51).

The customer ID received by the antenna C143A is sent from the computer C141 to the center server C4. The center server C4 receives the customer ID of the customer X, and searches the customer ID database for the group ID of the customer X and the customer ID of each of the other customers in the group. The group ID and the customer ID are sent to the computer C141. If the group ID has a related group ID, the customer ID of each of members in a related group is also extracted from the database.

The computer C141 confirms whether or not the wireless tags of the customers received from the center server C4 are present in the range a (Step S52).

In the case where the customers Y and Z of the group of the customer X who firstly entered the range a are present in the range a, the digital camera 142 photographs the customers (Step S58). In the case where either the customer Y or Z or both the customers Y and Z are not present in the range a, a message calling the other customers of the group of the customer X, such as "Members of group MM, please come to the camera for photography" is announced from the speaker 144 to the ranges a, b, and c (Step S54), and state flow monitoring is carried out on the customer or customers that are not present in the range a, such as the customers Y and Z (Steps S55, S56, S57).

In the state flow monitoring in this embodiment, a flow of position change of each of the customers outside the photography range (the range a) in a predetermined period is defined as a state flow, and an intention of each of the customers to be photographed is judged by comparing the state flow to a predetermined pattern. More specifically, in the case where a customer outside the range a moves from the range c to the range b which is closer to the range a as the actual photography range, the customer is judged to have an intention of being photographed. Therefore, the camera is put on stand-by until the customer reaches the photography range a (Step S57). On the contrary, if a customer moves from the range b to the range c which is farther from the range a, the customer is judged that he/she does not have an intention to be photographed, and photography of customers in the range a is carried out.

In the case where the remaining customers Y and Z in the group of the customer X have come to the range a, or in the case where unwillingness to be photographed has been judged, the state flow monitoring is ended (Step S56), and photography is carried out (Step S58).

At the time of photography at Step S58, preferable photography can be carried out by letting the customers to pose according to the photography timing if the photography timing is notified from the speaker 144. More specifically, a message such as "Now counting down, 3, 2, 1, Cheese!" may be announced. Furthermore, by causing customers that are not to be photographed to leave the range by announcement of a message such as "Group MM is going to be photographed. Guests other than the members, please leave the area in front of the camera", preferable photography can be realized. Instead of announcement from the speaker 144, a signal for notifying the photography timing may be sent at predetermined timing to the wireless tags 50 of the customers to be photographed. In this case, if each of the wireless tags 50 has a small speaker or an LED, a message may be announced or the LED may be caused to blink in response to reception of a timing notification signal. In this manner, the photography timing can be notified with certainty to the customers to be photographed.

The computer C141 sends to the center server C4 the image data set together with photography information comprising time and date of photography, a location ID, the group ID or IDs of the group or groups that have been photographed, the customer IDs of the customers that have actually been photographed, and an image ID of the image data set. The photography information is stored in a photography information database in the center server C4. The image data set is also stored in an image database in the center server C4.

In the above configuration, the same effect as the second embodiment can be obtained. In addition, based on the state flow monitoring of the position of each of the customers to be photographed, timing of photography of the group or groups by the camera is controlled. Therefore, even in the case where some of the customers are outside the photography range, the intention thereof to be photographed is judged based on movement to the camera or the like. In this manner, photography can be carried out at a preferable timing.

A fourth embodiment of the present invention will be described next. In the description below, the same elements as in the first embodiment are not described specifically unless it is necessary.

Figure 33:
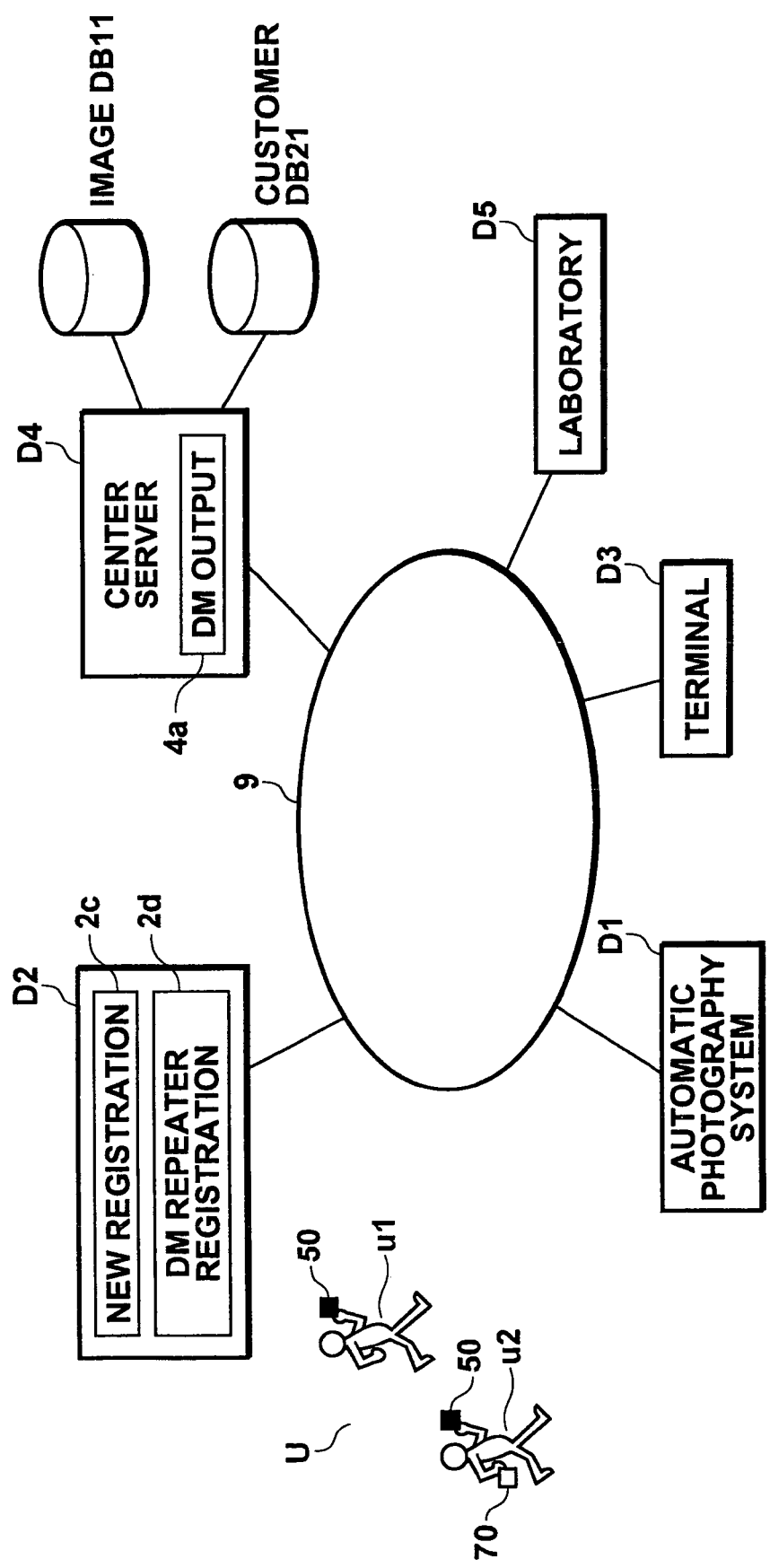
FIG. 33 is a block diagram showing the configuration of an automatic photography system in the fourth embodiment of the present invention.

FIG. 33 is a block diagram showing the configuration of an automatic photography system in a theme park system of the fourth embodiment of the present invention. As shown in FIG. 33, the theme park system is installed in a theme park, and the theme park system comprises an automatic photography system D1 (photography means), a customer registration apparatus D2, a terminal D3, a center server D4, and a laboratory D5 connected to each other via a network 9. The automatic photography system D1 photographs a visitor to the theme park as a subject (hereinafter referred to as a customer U) having a wireless tag 50 (identification information transmission means), and obtains image data sets S1 representing images of the subject. The customer registration apparatus D2 carries out registration of customer information and distribution of the wireless tag 50. The terminal D3 is used for image search, image order, and the like. The center server D4 has an image database DB11 (image storage means) and a customer database DB21 (customer information storage means). The laboratory D5 prints the image data sets S1, generates a photo album, and recording the image data sets S1 in a CD-R, for example.

The customer registration apparatus D2 has a new registration unit 2c for registering a visitor who uses the automatic photography system for the first time (hereinafter referred to as a new customer U1) and a DM repeater registration unit 2d (access enabling means) for registering a visitor who uses the automatic photography system for the second time or more with a direct mail 70 that will be described later (hereinafter referred to as a DM repeater U2). In the description below, the new customer and the DM repeater are referred to as the customer U if distinction thereof is not necessary.

The center server D4 has a DM output unit 4a (media output means) for outputting the direct mail 70 that is sent to the customer U later.

The customer U is photographed by the automatic photography system D1 by moving in the theme park while holding the wireless tag 50. The DM repeater U2 has the direct mail 70 output by the automatic photography system, when he/she visits the theme park.

The automatic photography system D1 and the wireless tag 50 are the same as in the first embodiment (see FIGS. 2 and 7). The configuration of the automatic photography system D1 (that is, gates 11A and 11B, a wide range sensor 12, a communication device 13, a photography device 14, and human sensors 16A and 16B) is also the same as the first embodiment (see FIGS. 3 to 6).

Figure 34:
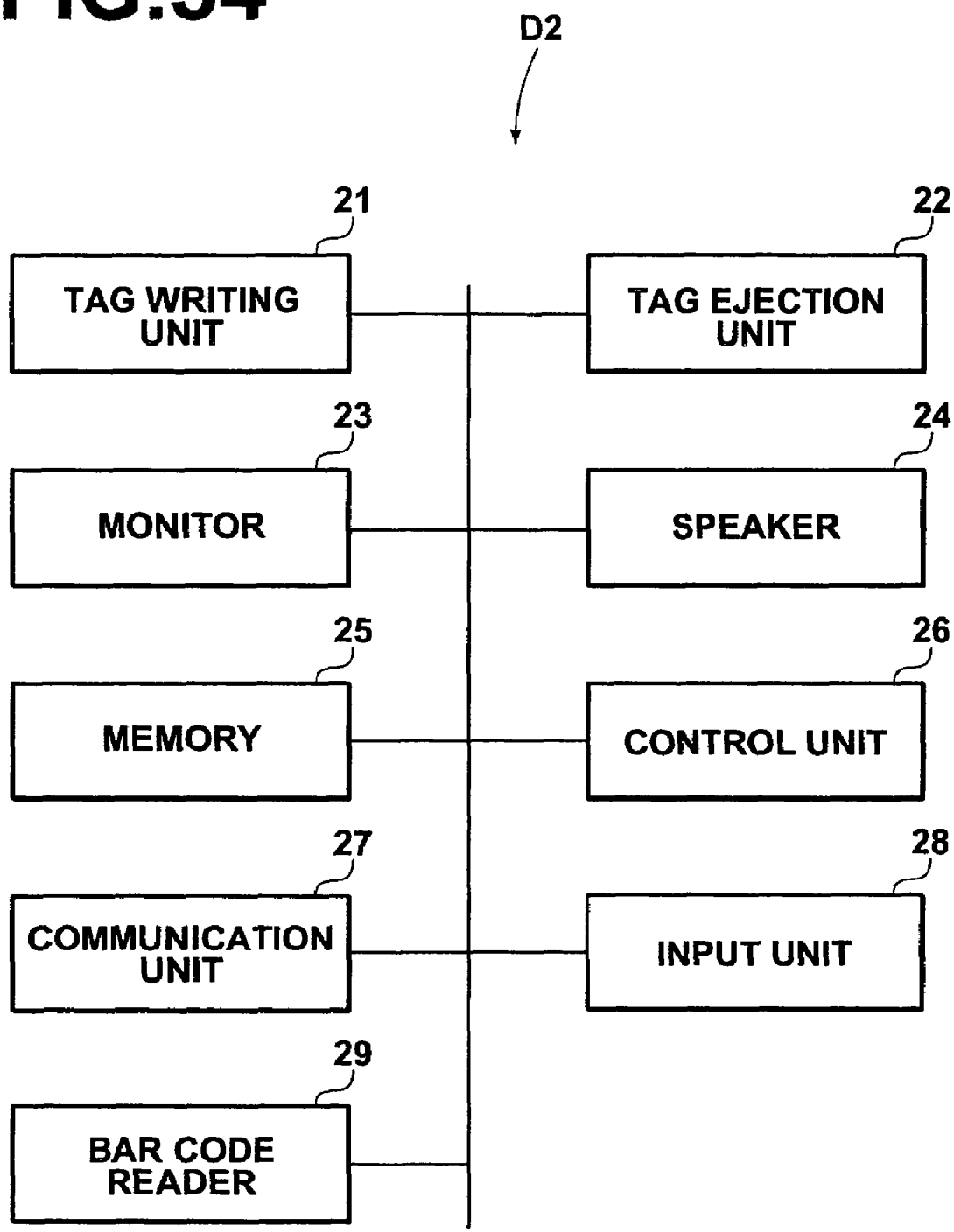
FIG. 34 is a block diagram showing the configuration of a customer registration apparatus in the fourth embodiment.

FIG. 34 is a block diagram showing the configuration of the customer registration apparatus D2. As shown in FIG. 34, the customer registration apparatus D2 comprises a tag writing unit 21 for writing a tag ID in the wireless tag 50, a tag ejection unit 22 for ejecting the wireless tag 50, a monitor 23 for displaying the content of registration and guidance information, a speaker 24 for outputting the guidance information as voice, a memory 25 for storing a program and various kinds of information for operating the customer registration apparatus D2, a control unit 26 for controlling operation of the customer registration apparatus D2, a communication unit 27 connected to the network 9, an input unit 29 for receiving input of the customer information, and a bar code reader 29 for reading a bar code recorded in the direct mail 70.

The control unit 26 functions as the new registration unit 2c and the DM repeater registration unit 2d by carrying out the program stored in the memory 25. The new registration unit 2c registers the customer information input from the input unit 28 with the customer database DB21 in relation to the tag ID written by the tag writing unit 21. In the DM repeater registration unit 2d, the bar code reader 29 reads the bar code, and obtains the tag ID written in the wireless tag 50 held by the customer in the previous visit. The repeater registration unit 2d registers the customer information, which has been related to the tag ID in the previous visit, with the customer database DB21 in relation to the tag ID written newly by the tag writing unit 21 in the visit time.

After the tag writing unit 21 writes the tag ID in the wireless tag 50, the tag ejection unit 22 ejects the wireless tag 50 written with the tag ID. The customer U holds the wireless tag 50 after customer registration.

The configuration of the terminal D3 is the same as in the first embodiment. In other words, as shown in FIG. 9, the terminal D3 comprises a first communication unit 31 for communicating with the customer U having the wireless tag 50, a monitor 32 for displaying a searched image and provided information as well as the guidance information, a speaker 33 for outputting the provided information and the guidance information as voice, a memory 34 for storing a program and various kinds of information for operating the terminal D3, a control unit 35 for controlling operation of the terminal D3, a second communication unit 36 connected to the network 9, and an input unit 37 for receiving input of various kinds of information by the customer U.

Figure 35:
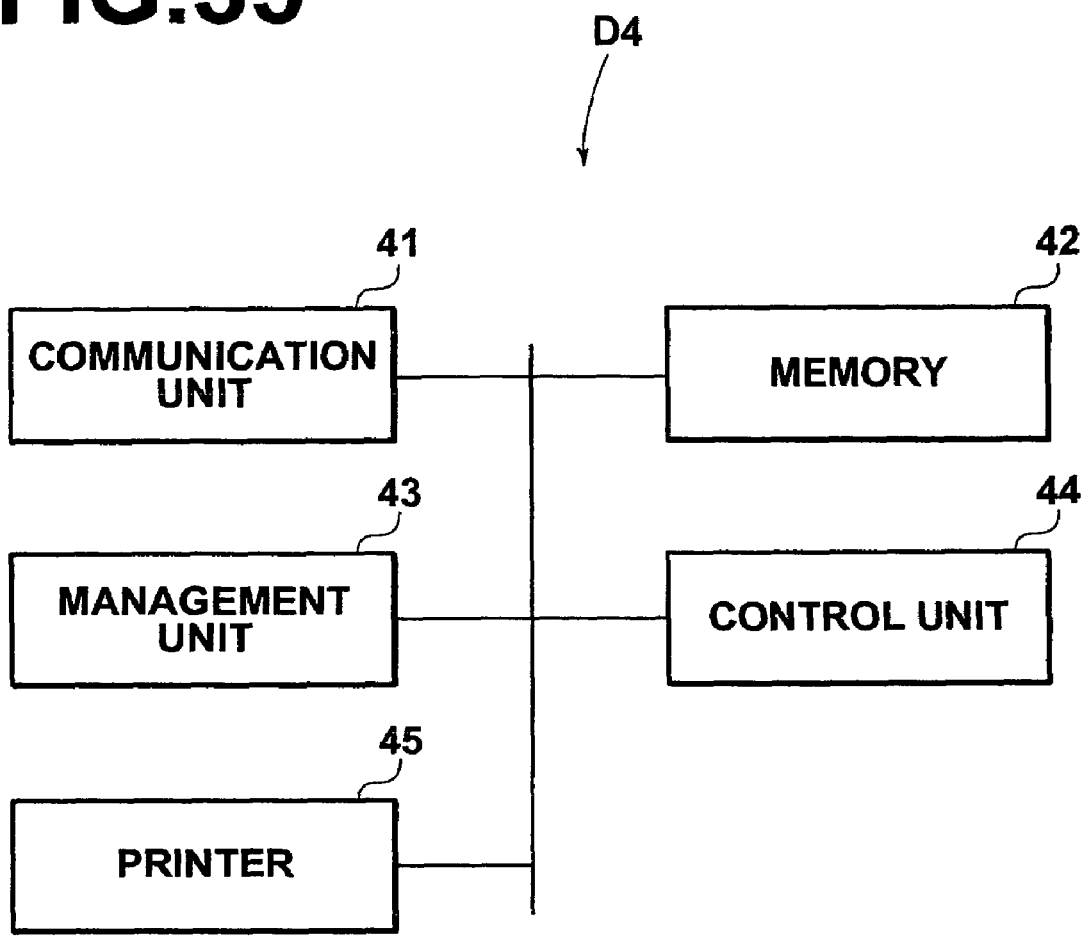
FIG. 35 is a block diagram showing the configuration of a center server in the fourth embodiment.

FIG. 35 is a block diagram showing the configuration of the center server D4. As shown in FIG. 35, the center server D4 comprises a communication unit 41, a large-capacity memory 42, a management unit 43, a control unit 44, and a printer 45. The communication unit 41 communicates with the automatic photography system D1, the customer registration apparatus D2, the terminal D3, and the laboratory D5 via the network 9. The large-capacity memory 42 stores various kinds of information such as the image data sets S1, the image database DB11 for image search, a program for operating the center server D4, and the customer database DB21 in which the tag ID of the wireless tag 50 held by the customer U (hereinafter referred to as the tag ID of the customer U) is related to the customer information. The management unit 43 manages the image data sets S1 stored in the memory 42 by generating the image database DB11 in the memory 42. The control unit 44 controls operation of the center server D4, and the printer 45 outputs the direct mail 70.

The management unit 43 generates the image database DB11 from information recorded in a header (hereinafter referred to as header information) of each of the image data sets S1 sent from the automatic photography system D1. The header information includes the file name of the corresponding image data set S1, the tag ID of the wireless tag 50 of the customer U represented by reply information, information on time and date of photography, location information, a camera ID, and photography information.

The management unit 43 classifies the image data sets S1 according to customer, based on the tag ID of the customer U included in the header information of each of the image data sets S1. Furthermore, the management unit 43 sorts the image data sets S1 in ascending order of photography time and date, according to the information on the time and date of photography described in the header information of each of the image data sets S1. In this manner, the management unit 43 generates the image database DB11.

The control unit 44 of the center server D4 searches the image database DB11 by using the tag ID input by the customer U by using the terminal D3 upon access from the terminal D3, and allows the terminal D3 to access the image data sets S1 classified by the tag ID. The customer U operates the terminal D3 for downloading the image data sets S1, requesting photo album generation, requesting generation of a CD-R, and placing a printing order from the center server D4.

By carrying out the program stored in the memory 42, the control unit 44 obtains the image data sets S1 of the customer U from the image database DB11, and obtains the customer information of the customer U from the customer database DB21. Based on the image data sets S1 and the customer information, the control unit 44 generates the direct mail 70 for the customer U, and causes the printer 45 to print the direct mail 70. In this manner, a function of the DM output unit 4a is realized.

FIG. 36 shows the configuration of the customer database DB21. As shown in FIG. 36, the customer database DB21 has the tag ID of the customer U registered therein. Under the tag ID, properties of the customer U is registered, comprising date of visit to the theme park, the name, the address, age, gender, height, the number of members in a group to which the customer U belongs, pregnancy to non-pregnancy, a past disease, and other information.

A procedure carried out in this embodiment will be described next.

Figure 37:
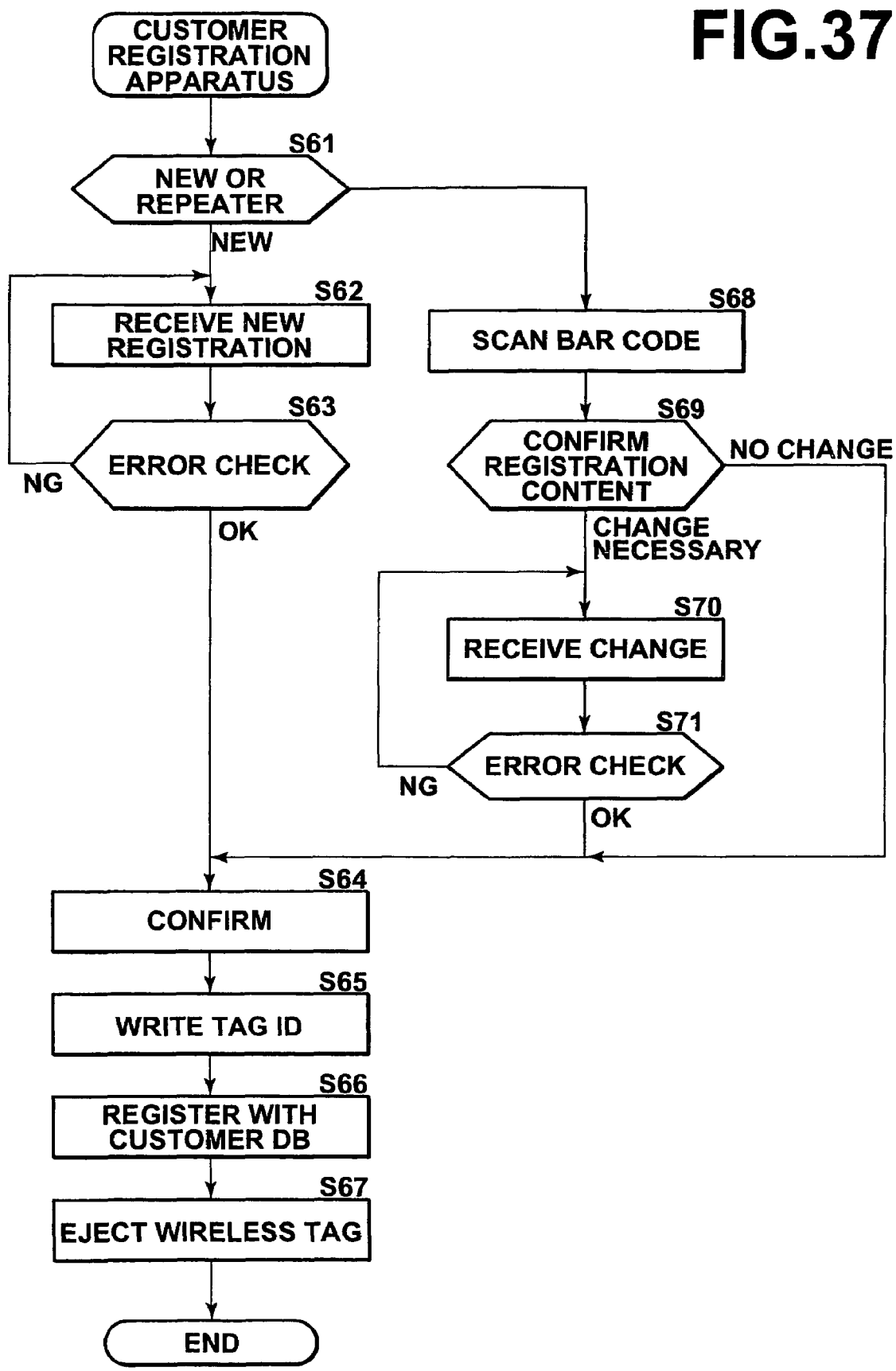
FIG. 37 is a flow chart showing a procedure carried out at the time of customer registration in the fourth embodiment.

If the new customer U1 uses the automatic photography system for the first time, the customer U1 newly registers himself/herself with the customer registration apparatus D2 at the time of visit. FIG. 37 is a flow chart showing a procedure carried out by the customer registration apparatus D2. Based on this flow chart, the procedure of new registration will be described in detail.

A screen is displayed on the monitor 23 for selecting new registration or repeater registration, and audio guidance for prompting the selection is output from the speaker 24 (Step S61). The new customer U1 selects new registration by using a touch panel or the like of the input unit 28. The input unit 28 receives the selection of new registration, and displays a screen for new registration on the monitor 23. Audio guidance for prompting input or selection of necessary items is also output from the speaker 24 (Step S62). After the new customer U1 inputs and selects the name, the address, age, gender, height, the number of members in the group, pregnancy or non-pregnancy, a past disease, and other information, by using the touch panel or the like of the input unit 28, the content of the input or selection is examined (Step S63). If an error is found, the item having the error is displayed with a mark in the new registration screen on the monitor 23, and the speaker 24 outputs audio guidance for prompting error correction (Step S62). If no error is found, the monitor 23 displays the new registration screen filled with the items input and selected, and the speaker 24 outputs audio guidance for prompting final confirmation of the registration content (Step S64). When the new customer U1 confirms the content and selects "OK", the tag writing unit 21 newly writes the tag ID in the wireless tag 50 (Step S65), and the new registration unit 2c relates the content of registration to the tag ID. The new registration unit 2c then adds the date of visit to the content, and registers the content with the customer database DB21 of the center server D4 via the communication unit 27 and the network 9 (Step S66). The tag ejection unit 22 ejects the tag 50 having the tag ID written therein, and the wireless tag 50 is provided to the new customer U1 (Step S67).

A procedure carried out by the automatic photography system D1 is the same as in the first embodiment when the customer U uses the automatic photography system D1 (see FIGS. 13 and 14).

In the center server D4, the management unit 43 generates the image database DB11 from the header information of each of the image data sets S1 sent from the automatic photography system D1.

The customer U uses the terminal D3 for image search and image order. In the terminal D3, when the first communication unit 31 receives the reply information from the wireless tag 50 of the customer U, the terminal D3 accesses the center server D4 via the second communication unit 36 and via the network 9 for sending the tag ID included in the reply information to the center server D4. The control unit 44 in the center server D4 searches the image database DB11 stored in the memory 42 by using the tag ID as a search key, and sends the image data sets S1 classified according to the tag ID to the terminal D3. The terminal D3 displays the image data sets S1 on the monitor 32. More specifically, a catalog of thumbnail images of the image data sets S1 sorted by the file names is displayed on the monitor 32 as shown in, FIG. 15. The catalog includes the file names, the time and date of photography, and the name of a photography range.

The customer U selects a part or all of the thumbnail images from the catalog and places an order for printing or recording in a CD-R, according to a screen displayed on the monitor 32 or guidance output from the speaker 33. The input unit 37 of the terminal D3 receives the order, and places the order from the center server D4 via the second communication unit 36 and the network 9.

In the case where the order is placed from the center server D4, the center server D4 sends the image data sets whose printing has been ordered to the laboratory D5. The laboratory D5 prints the image data sets S1, or writes the image data sets S1 in a CD-R according to the order.

A procedure for outputting the direct mail 70 after predetermined days have passed since the previous visit by the customer U will be described next.

The DM output unit 4a of the center server D4 obtains from the customer database DB21 the information on the name, the address, the date of visit, and the tag ID of the customer U whose visit to the park was the predetermined days ago, and also obtains the image data sets S1 classified by the tag ID from the image database DB11. If any one of the image data sets S1 solely includes the customer U, the image data set S1 is obtained in priority. More specifically, whether the image data set S1 solely includes the customer U can be judged by whether the tag ID other than the tag ID of the customer U is related to the image data set.

Figure 38:
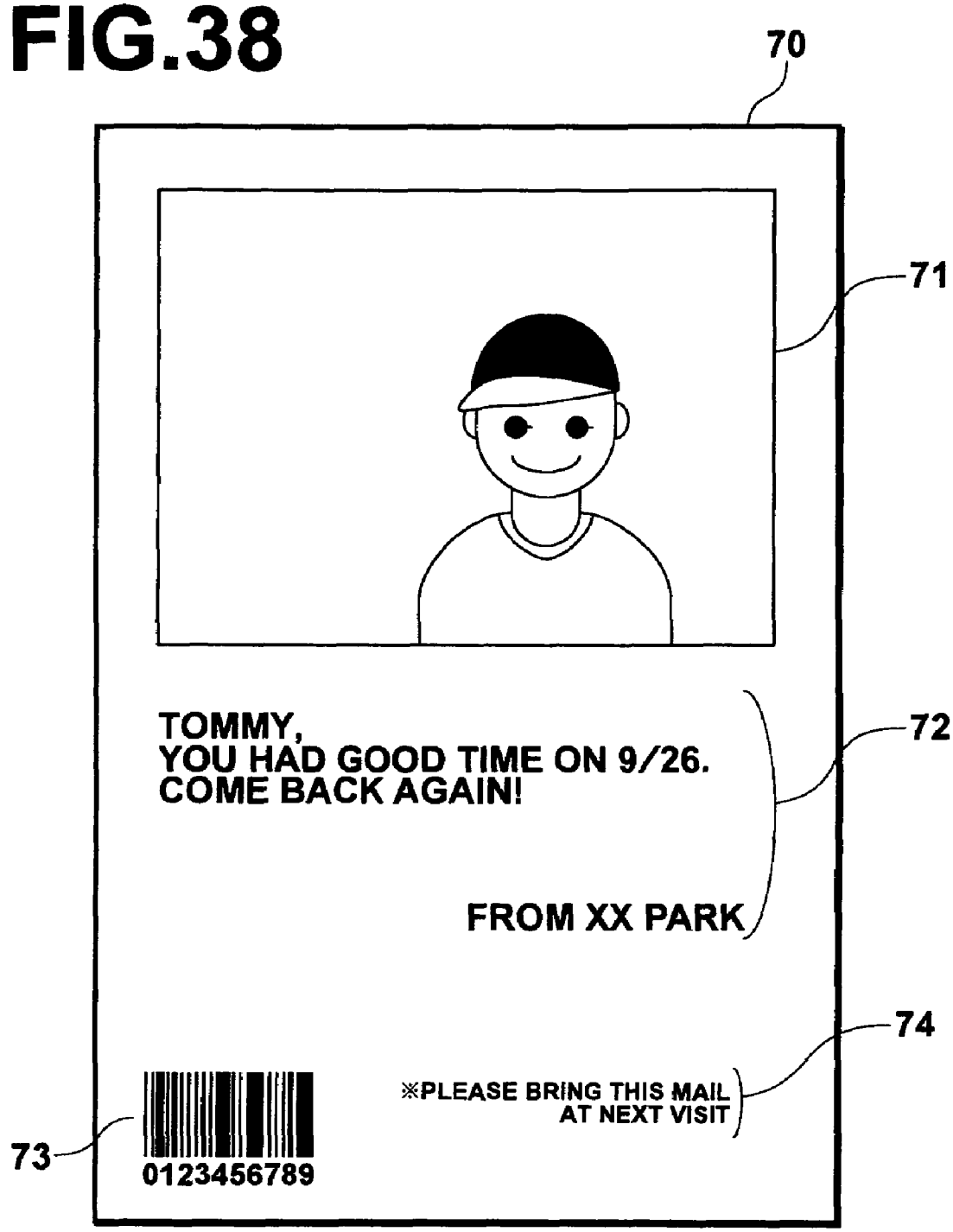
FIG. 38 shows an example of a direct mail in the fourth embodiment.

Based on the name and address of the customer U, the name and the address on the direct mail 70 are edited. In addition, main text of the direct mail 70 is also edited based on the image data set S1 and the customer information such as the name and the date of visit. The tag ID is then converted into the bar code, and the printer 45 outputs the direct mail 70. FIG. 38 shows an example of the direct mail 70. As shown in FIG. 38, the direct mail 70 includes a print 71 of the customer U, a message 72 for prompting another visit by the customer U, a bar code 73 representing the tag ID of the customer U, and a message 74 for prompting the customer U to bring the direct mail 70 at the time of next visit.

A procedure carried out by the customer registration apparatus D2 for registering the DM repeater U2 having the direct mail 70 will be described next with reference to FIG. 37.

The screen for selecting new registration or repeater registration is displayed on the monitor 32, and the audio guidance for prompting the selection is also output from the speaker 24 (Step S61). In this case, the DM repeater U2 selects repeater registration by using the touch panel or the like of the input unit 28. The input unit 28 receives the selection of repeater registration, and a screen is displayed on the monitor 23 while audio guidance is output from the speaker 24 for prompting the customer U to bring the bar code 73 printed on the direct mail 70 close to the bar code reader 29 (Step S68). When the DM repeater U2 brings the bar code 73 close to the bar code reader 29, the bar code reader 29 reads the bar code 73, and obtains the tag ID of the DM repeater U2 used in the previous visit. The customer registration apparatus D2 accesses the customer database DB21 in the center server D4 via the communication unit 27 and the network 9, by using the tag ID as a search key. The center server D4 obtains the information such as the name, the address, age, gender, height, the number of group members, pregnancy or non-pregnancy, a past disease, and other information on the DM repeater U2 from the customer database DB21, and sends the information to the DM repeater registration unit 2d. The DM repeater registration unit 2d receives the information, and prompts confirmation of the content of registration by outputting the information on the monitor 23 and audio guidance from the speaker 24 (Step S69). In the case where the content of registration needs to be changed, the DM repeater U2 presses a Change button on the touch panel. In response, the DM repeater registration unit 2d displays a change reception screen on the monitor 23, and receives input and selection by the DM repeater U2 in the same manner as in the case of new registration at Step S62 (Step S70). The error check is also carried out in the same manner as the new registration at Step S63 (Step S71). In the case where the change of the content and the error check have been completed or in the case where no change is needed, the screen for confirmation of the registration content is displayed on the monitor 23 as in the case of new registration while the audio guidance is also output from the speaker 24 (Step S64). When the DM repeater U2 confirms the content and selects OK, the tag writing unit 21 writes a new the tag ID used in this visit in the wireless tag 50 (Step S65), and the DM repeater registration unit 2d registers the new tag ID in relation to the registration content and the date of visit in this time with the customer database DB21 in the center server D4 via the communication unit 27 and the network 9 (Step S66). The wireless tag 50 is provided to the DM repeater U2 after being ejected by the tag ejection unit 22 (Step S67). In this manner, the customer information registered by the DM repeater U2 in the previous visit is registered with the customer database DB21 in relation to the tag ID written newly in the wireless tag 50 provided in this visit. Instead of writing the new tag ID in the wireless tag 50 while relating the tag ID to the registration content, the tag ID used in the previous visit may be written in the wireless tag 50 in this visit.

Thereafter, the DM repeater U2 can receive the services by the automatic photography system in the same manner as in the previous visit.

As has been described above, in this embodiment, the customer database DB21 stores the tag ID transmitted from the wireless tag 50 in relation to the customer information for identifying the customer U having the wireless tag 50. The DM output unit 4d in the center server D4 prints the direct mail 70 for the customer U by recording the bar code 73 representing the tag ID for identifying the customer U on the direct mail 70. Upon the subsequent use of the automatic photography system by the customer U who received the direct mail 70, the DM repeater registration unit 2d of the customer registration apparatus D2 reads the bar code 73 of the direct mail 70, and relates the customer information, which has been stored in the customer database DB21 in relation to the tag ID in the previous visit represented by the bar code, to the tag ID written in the wireless tag 50 in the subsequent visit. Therefore, upon the subsequent use of the automatic photography system, the customer U can appropriately and efficiently receive the detailed services using the customer information, such as photography in a photography mode by calling the customer U, without registering the customer information again.

The DM output unit 4a outputs not only the bar code of the tag ID but also the image represented by the image data set S1 stored in the image database DB11 in relation to the tag ID. Therefore, authentication of the customer U can be carried out based on the direct mail, since the image is printed on the direct mail. In this manner, fraudulent use of the system is prevented.

Figure 42:
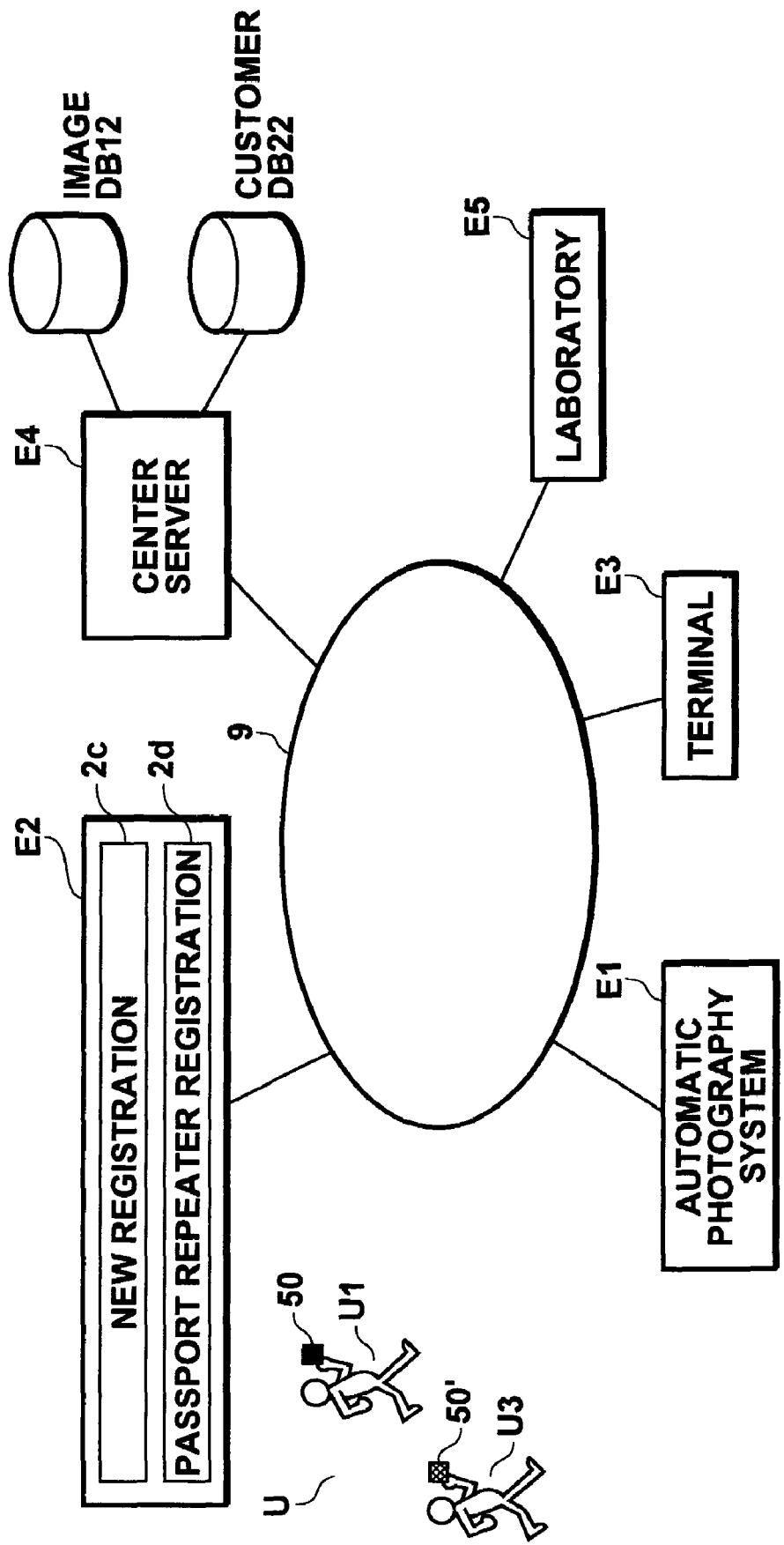
FIG. 42 is a block diagram showing the configuration of an automatic photography system in a fifth embodiment of the present invention.

An automatic photography system in a theme park system of a fifth embodiment of the present invention will be described below. Differences from the fourth embodiment will be described mainly. In the fifth embodiment, the automatic photography system can be used freely for a predetermined period (such as 1 year), and a wireless tag acts as an annual passport. FIG. 42 is a block diagram showing the configuration of the automatic photography system in the fifth embodiment. The fifth embodiment is different from the fourth embodiment in that a repeater U3 having a wireless tag 50' as the annual passport (hereinafter referred to as an annual passport customer U3) uses the automatic photography system. In the fifth embodiment, a customer registration apparatus E2 has a passport repeater registration unit 2e (access enabling means) instead of the customer registration apparatus D2 having the DM repeater registration unit 2d, which is another difference from the fourth embodiment. Furthermore, the center server D4 in the fourth embodiment is replaced by a center server E4 not having the DM output unit 4a in the fifth embodiment, which is also different from the fourth embodiment.

Figure 43:
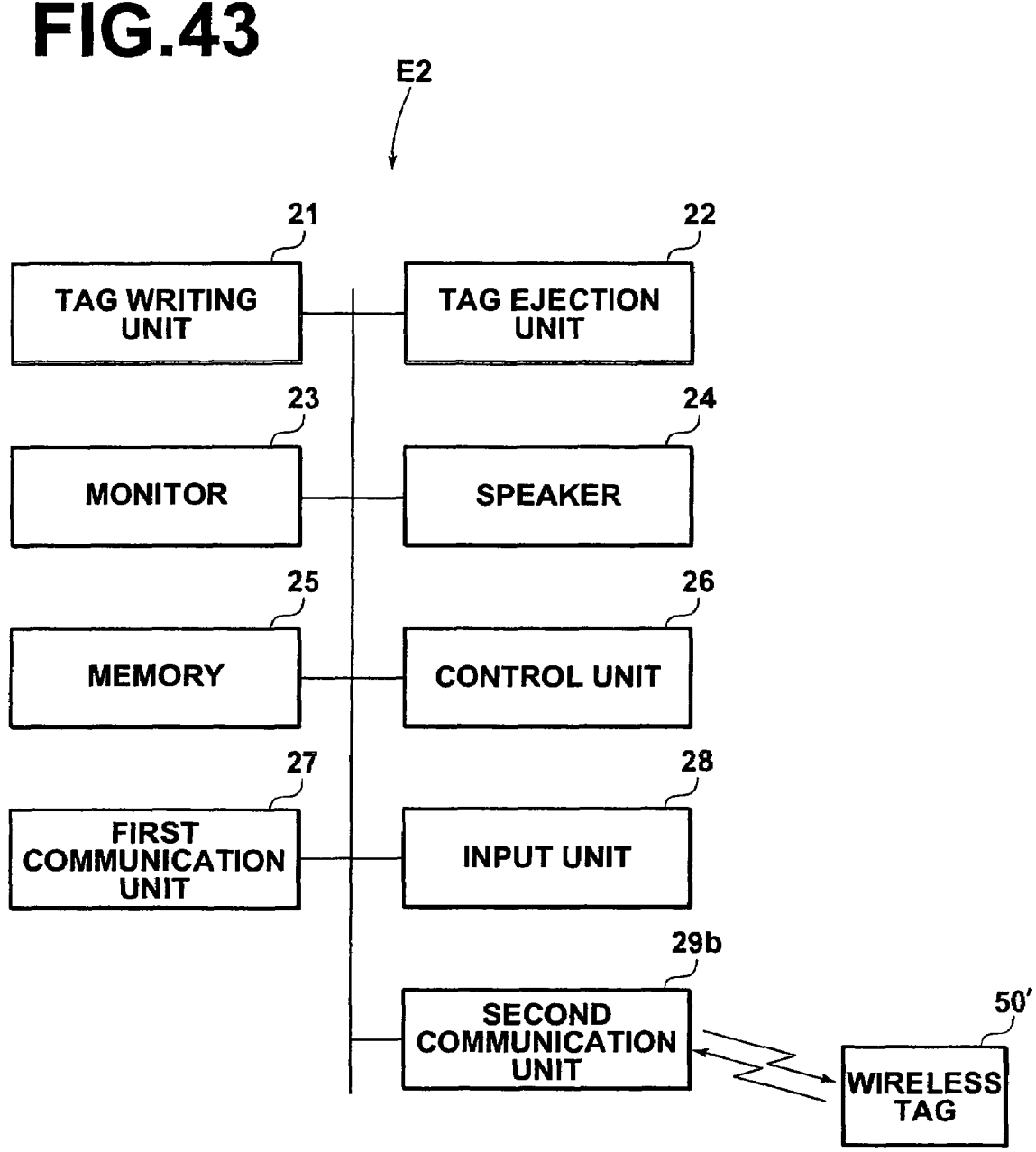
FIG. 43 is a block diagram showing the configuration of a customer registration apparatus in the fifth embodiment.

FIG. 43 is a block diagram showing the configuration of the customer registration apparatus E2. As shown in FIG. 43, the customer registration apparatus E2 has a second communication unit 29b for communicating with the wireless tag 50', instead of the bar code reader 29 in the customer registration apparatus D2. A function of the passport repeater registration unit 2e, which will be described later, is realized through execution of a program stored in a memory 25 by a control unit 26.

Figure 44:
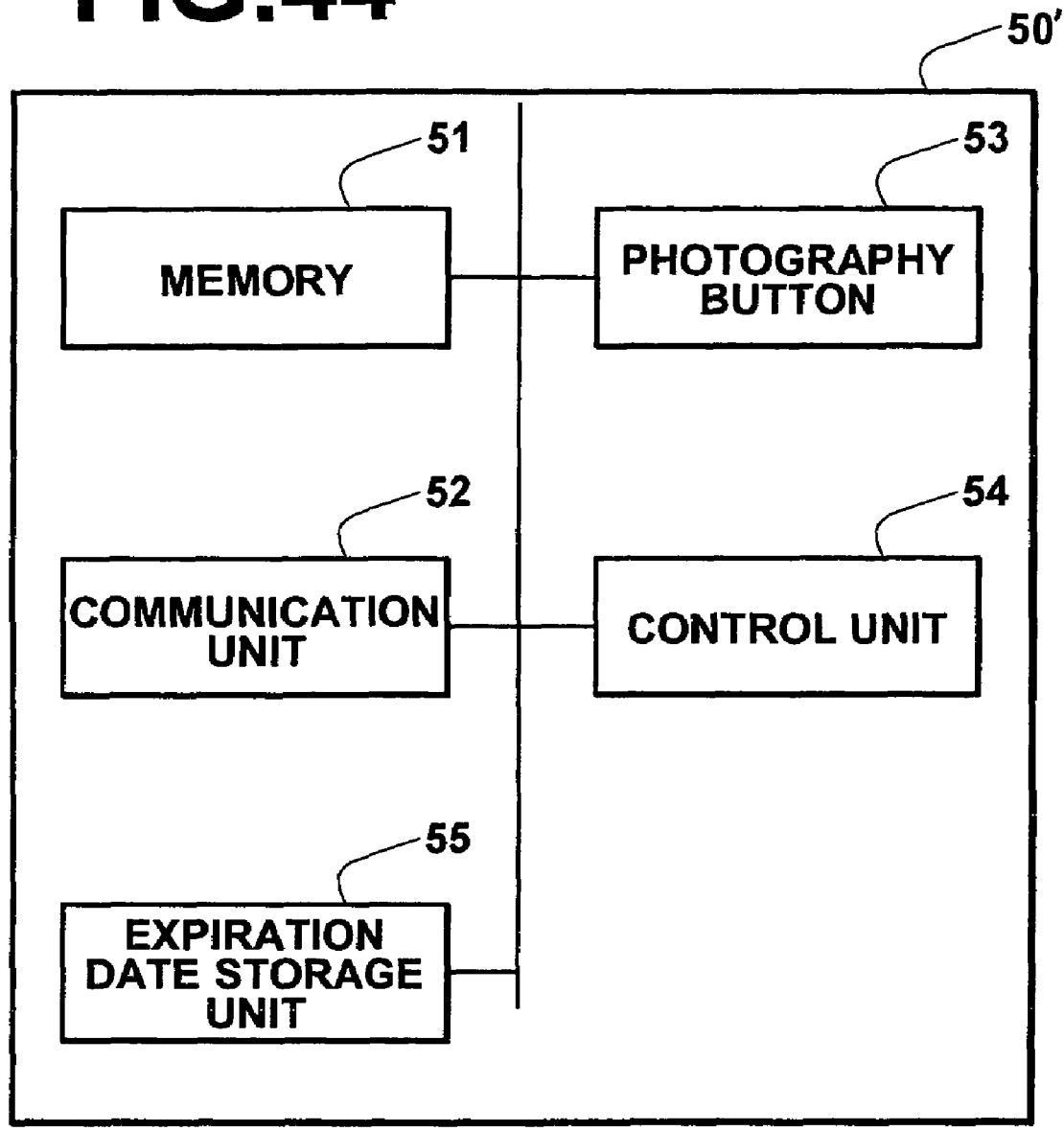
FIG. 44 is a block diagram showing the configuration of a wireless tag having an annual passport.

FIG. 44 is a block diagram showing the configuration of the wireless tag 50'. As shown in FIG. 44, the wireless tag 50' has an expiration date storage unit 55 for storing an expiration date of a tag ID transmitted from the wireless tag 50', which is different from the wireless tag 50. In this manner, the wireless tag 50' functions as the annual passport by which the automatic photography system can be used unlimitedly before the expiration date has passed.

Figure 45:
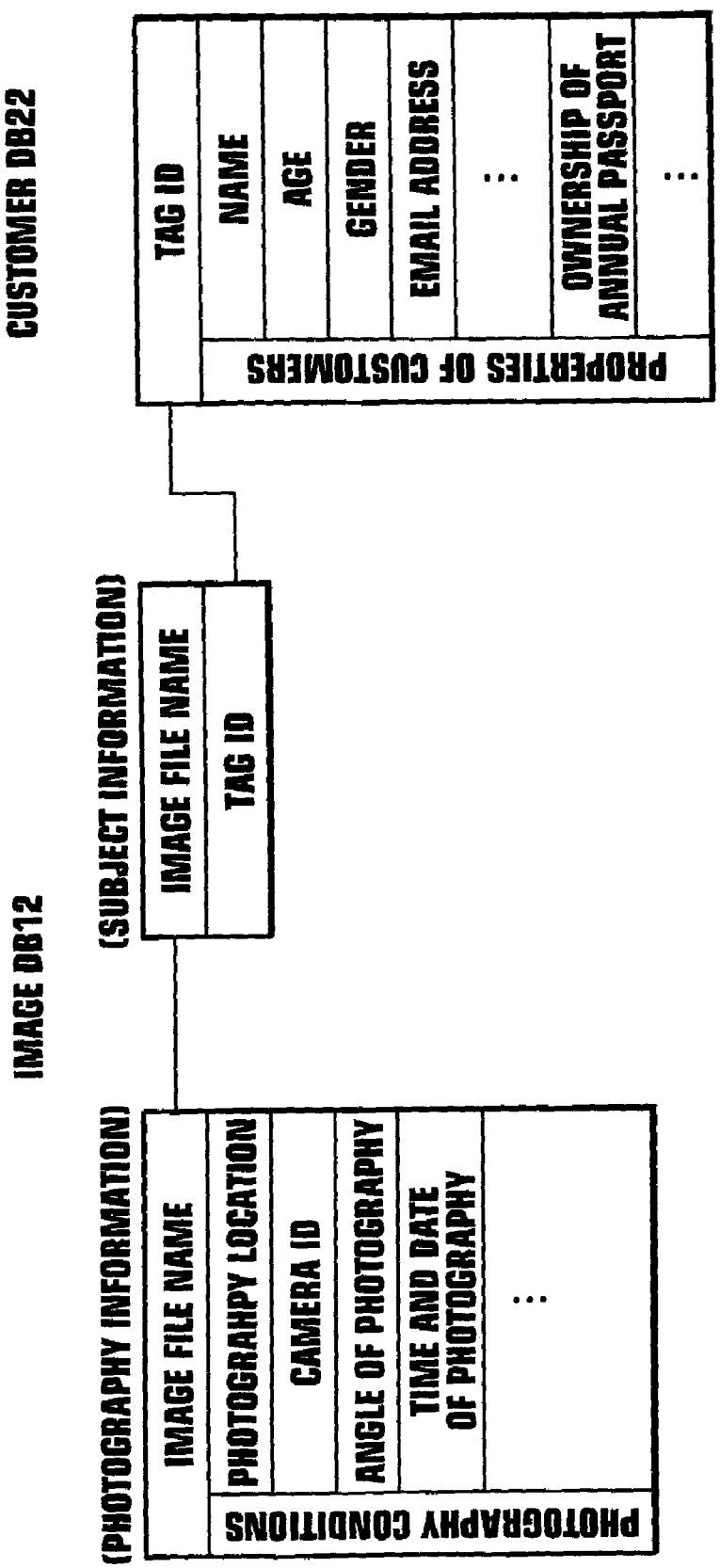
FIG. 45 shows structures of databases in the automatic photography system in the fifth embodiment.

FIG. 45 shows structures of databases in the center server E4.

In an image database DB12, photography conditions are recorded as photography information for each of image files representing images obtained by the automatic photography system E1. Information on a subject in each of the images is also recorded as subject information. The photography conditions as a whole and each of the names of the image files are in one-to-one correspondence, since the photography conditions are determined uniquely for each of the images. Each of the image file names and the tag ID or IDs for identifying the subject are in one-to-n correspondence, since the subject may comprise a plurality of people. The photography conditions include a photography location, a camera ID, a photography angle, and time and date of photography, for example.

Customer properties are registered with a customer database DB22, for the tag ID of each of customers U, as in the customer database DB21 in FIG. 36. The customer properties include the same items as in the customer database DB2 such as the name, age, and gender, as well as information on whether the corresponding customer U has the annual passport.

A procedure carried out in this embodiment will be described next, mainly on differences from the fourth embodiment.

Figure 46:
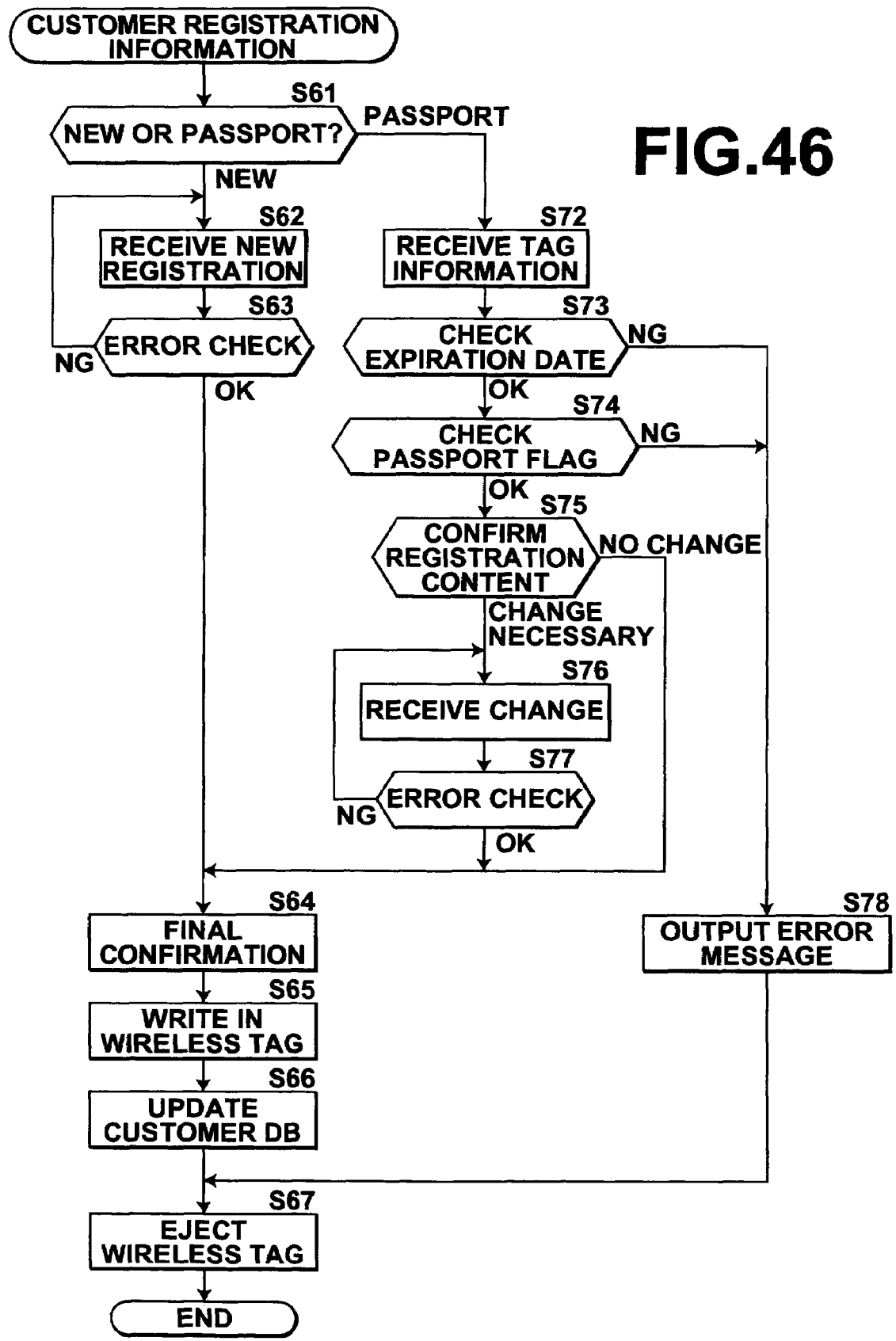
FIG. 46 is a flow chart showing a procedure carried out at the time of customer registration in the fifth embodiment.

As shown by a flow chart in FIG. 46, a procedure of registration with the customer registration apparatus E2 at the time of first visit (Steps S61 to S67 in FIG. 46) is almost the same as in the fourth embodiment (see FIG. 37). However, when the content of new registration is input (Step S62), selection can be made on whether the wireless tag to be provided is valid only for the day or acts as the annual passport. In the case of annual passport, the expiration date of the annual passport is written in the expiration date storage unit 55 of the wireless tag 50' (Step S65), and the corresponding customer U is registered as a customer having the annual passport in registration with the customer database DB22 (Step S66).

Photography is carried out by the automatic photography system E1 in the same manner as in the fourth embodiment. Image data sets S1 obtained by the photography and reply information represented by a reply signal sent by the wireless tag 50' are sent to the center server E4. In the center server E4, a management unit 43 generates the image database DB12 from header information of each of the image data sets S1 sent from the automatic photography system E1. The information on the photography conditions obtained from the header information is registered as the photography information for each of the image files. The reply information, that is, the tag ID or IDs of the subject in each of the images, is recorded in the subject information. In the case of an image of the customers U having the wireless tags 50 and 50', the tag IDs as the reply information are sent for the image data set S1 of the image. Therefore, the subject information has a plurality of records of the different tag IDs corresponding to the same image file name representing the image.

Image search and image order by a terminal E3 are carried out in the same manner as in the fourth embodiment.

A procedure of registration of the annual passport customer U3 with the customer registration apparatus E2, which is characteristic to this embodiment, will be described next with reference to FIG. 46. The annual passport customer U3 has the wireless tag 50' as the annual passport, and uses the system repeatedly.

A screen for selecting new registration or passport repeater registration is displayed on a monitor 23, and audio guidance is output from a speaker 24 for prompting the selection (Step S61). The annual passport customer U3 selects the passport repeater registration by using a touch panel or the like of an input unit 28, and the input unit 28 receives the selection of passport repeater registration. The second communication unit 29b communicates with the wireless tag 50' held by the annual passport customer U3, and obtains the tag ID of the wireless tag 50' and the expiration date of the annual passport (Step S72). The date of the day is then compared with the expiration date (Step S73). In the case where the expiration date has not passed, the customer registration apparatus E2 accesses the customer database DB22 in the center server E4 via a communication unit 27 and a network 9 by using the tag ID as a search key. The customer registration apparatus E2 then obtains the information on annual passport ownership in the customer properties related to the tag ID, and judges whether or not the customer U represented by the tag ID is an annual passport customer (Step S74). If a result at Step S74 is affirmative, procedures of confirmation and change of registration content registered in the previous use (Steps S75~S77 and Steps S64~S66 in FIG. 46) are carried out in the same manner as in the fourth embodiment (Steps S69~S71 and Steps S64~S66 in FIG. 37). In the case where the expiration date has passed or in the case where the customer U represented by the tag ID is not registered as an annual passport customer, a message representing the fact is displayed on the monitor 23 or output from the speaker 24 (Step S78). A tag ejection unit 22 ejects the wireless tag 50', and the wireless tag 50' is returned to the annual passport customer U3 (Step S67).

Thereafter, the annual passport customer U3 can receive services provided by the automatic photography system in the same manner as in the first visit.

As has been described above, according to the fifth embodiment, the passport repeater registration unit 2e of the customer registration apparatus E2 enables use of the customer information registered with the customer database DB22 and the images and information thereon registered with the image database DB12 for the annual passport customer U3 in the subsequent use if the wireless tag 50' held by the annual passport customer U3 is effective (Step S73 in FIG. 46) and authenticated (Step S74 in FIG. 46). In other words, the annual passport customer U3 can exclusively own the tag ID thereof, and can use a disc space in the center server E4 for storing the customer information and the images and information thereon related to the tag ID as long as the annual passport thereof is effective. Therefore, as in the fourth embodiment, when the annual passport customer U3 uses the automatic photography system repeatedly, the annual passport customer U3 can appropriately and efficiently receive the detailed services using the customer information thereof, such as photography carried out after calling the customer U3, without registering again the customer information registered in the first visit. In addition, access to the images photographed in the previous use is allowed in the subsequent use. Therefore, the services that can be provided by the system can be extended.

In the fifth embodiment, the expiration date of the annual passport is stored in the expiration date storage unit 55 in the wireless tag 50'. However, the expiration date may be stored in the customer database DB22. In this case, the passport repeater registration unit 2e of the customer registration apparatus E2 receives only the tag ID from the wireless tag 50', and accesses the customer database DB22 by using the tag ID as the search key. Based on the expiration date of the annual passport included in the customer information obtained in this manner, whether the expiration date of the annual passport has passed (Step S73 in FIG. 46) can be judged.

A sixth embodiment of the present invention will be described next, mainly on differences from the fourth embodiment. In the sixth embodiment, functions are added for services to be provided to a DM repeater U2 and an annual passport customer U3 (hereinafter collectively called a repeater U' if no distinction is necessary). FIG. 47 is a block diagram showing the configuration of an automatic photography system in the sixth embodiment. The sixth embodiment is different from the fourth embodiment in that the repeater U' has a mobile terminal 80. The center server D4 in the fourth embodiment is replaced by a center server F4 further comprising a service guide database DB6 (system update information storage means) for storing information on update of the system to be provided to the repeater U' and a notification unit 4b (notification means) for notifying the repeater U' of the update information in the form of an email, which is another difference from the fourth embodiment. The laboratory D5 is replaced by a laboratory F5 having an image processing unit 5a (image processing means) for carrying out image processing in response to an order sent by any one of customers U, which is also different from the fourth embodiment. A customer registration apparatus F2 has a DM repeater registration unit 2d as in the fourth embodiment and a passport repeater registration unit 2e as in the fifth embodiment.

FIG. 48 is a block diagram showing the configuration of the customer registration apparatus F2. As shown in FIG. 48, the customer registration apparatus F2 has a bar code reader 29a as in the fourth embodiment and a communication unit 29b as in the fifth embodiment.

The mobile terminal 80 can be any mobile terminal that can receive the email. More specifically, the mobile terminal 80 refers to a mobile phone or a PDA. Alternatively, the mobile terminal 80 may be a terminal dedicated to this system and unified with a wireless tag 50 or 50'.

The function of the notification unit 4b is realized through execution of a program stored in a memory 42 by a control unit 44 (see FIG. 10).

The function of the image processing unit 5a is realized through execution of an image processing program by a computer installed in the laboratory F5.

FIG. 49 shows structures of databases in the center server F4.

In an image database DB13, photography conditions are recorded as photography information for each of image files representing images obtained by an automatic photography system F1, and information on a subject in each of the images is also stored as subject information. Image processing conditions for each order regarding the images of any one of the customers U is recorded as image processing information in the image database DB13 (image processing condition storage means). The photography conditions as a whole and each of the names of the image files are in one-to-one correspondence, since the photography conditions are determined uniquely for each of the images. Each of the image file names and the tag ID or IDs for identifying the subject are in one-to-n (n is a variable) correspondence, since the subject may comprise a plurality of people. The image processing conditions are determined uniquely for each order. Therefore, each of the image file names and the image processing conditions as a whole are in one-to-n correspondence. The photography conditions are registered in such a manner that the image processing conditions as a whole correspond to a combination of the image file name, the tag ID, and date of order. The photography conditions include a photography location, a camera ID, a photography angle, and time and date of photography, for example. The image processing conditions include the type of template and color tone, for example.

In a customer database DB23, customer properties are registered for each of the tag IDs of the customers U, as in the customer database DB21 in FIG. 36 and the customer database DB22 in FIG. 45. The customer properties include the same items as in the customer databases DB21 and DB22, such as the name, age, gender, and information on ownership of an annual passport. In addition, an email address to which the email is sent by the notification unit 4b, date of previous use, and date of most recent use by the corresponding customer are also stored in the customer database DB23. The customer database DB23 may also include information on all dates of use in the past or dates of recent use for a predetermined number of times.

The service guide database DB6 stores the system update information for especially notifying the repeater U' of a service introduced newly to the system, for example. An administrator of the automatic photography system registers this information with the service guide database DB6. A service ID is issued to each update of the system, and a starting date of the updated service and guide data for notifying the content of the update are registered with the service guide database DB6. Examples of the guide data are: information on a new photography location, information on a template to be used for generation of a composite image with an image photographed in an existing photography location, and information on a campaign of a photograph rally in which a present is given to a customer who collected images photographed in predetermined photography locations, for example. The guide data may be provided in the form of characters, voice, a still image, or a moving image, for example. A URL for linking to a Web site in which the information is shown may be stored as the guide data.

Figure 39:
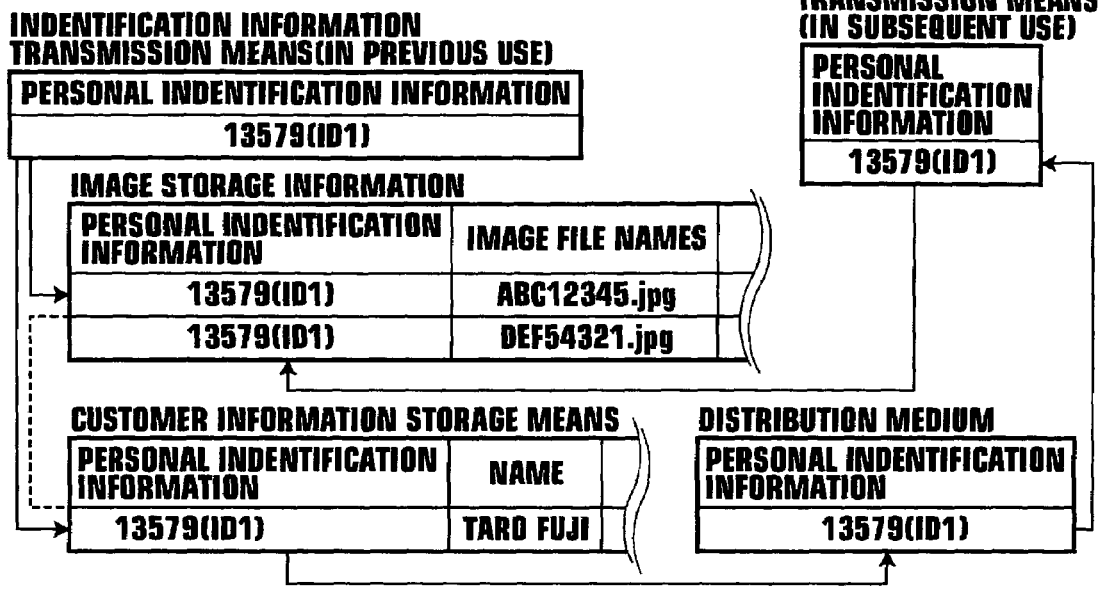
FIG. 39 shows an example of personal identification information.
Figure 40:
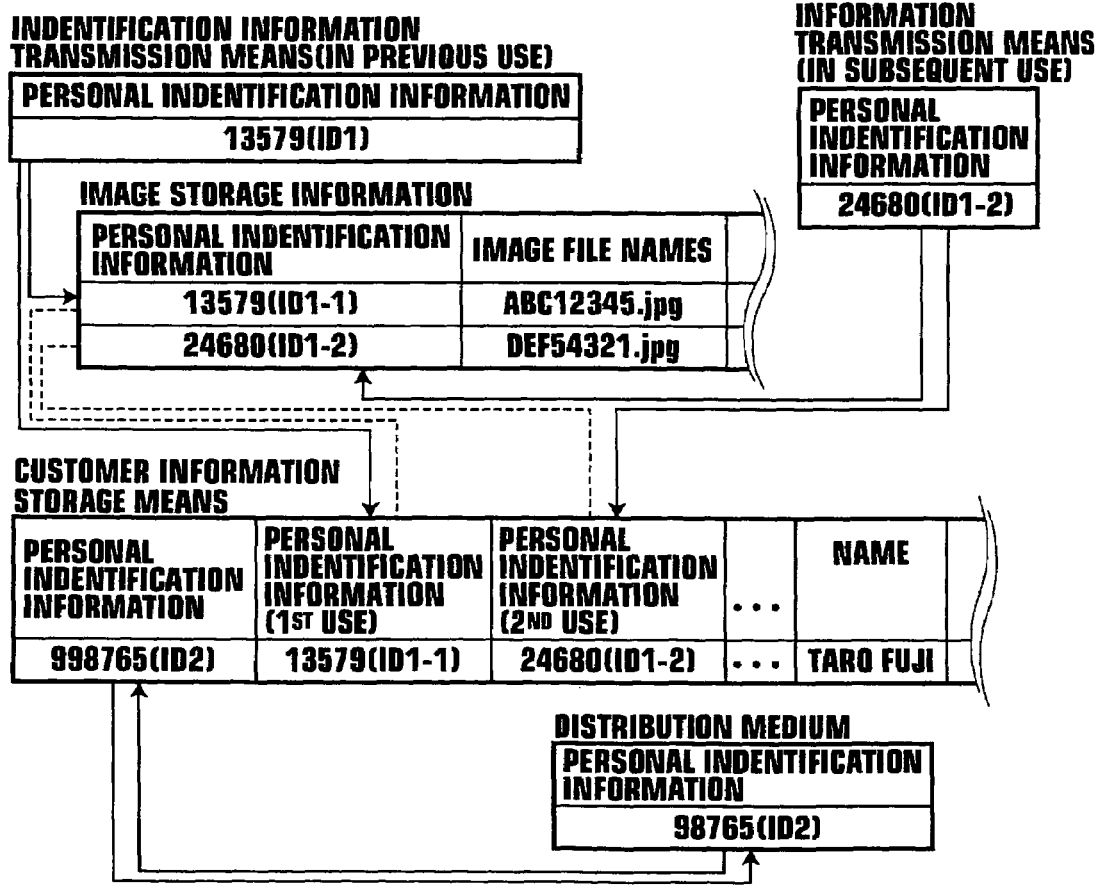
FIG. 40 shows another example of the personal identification information.
Figure 41:
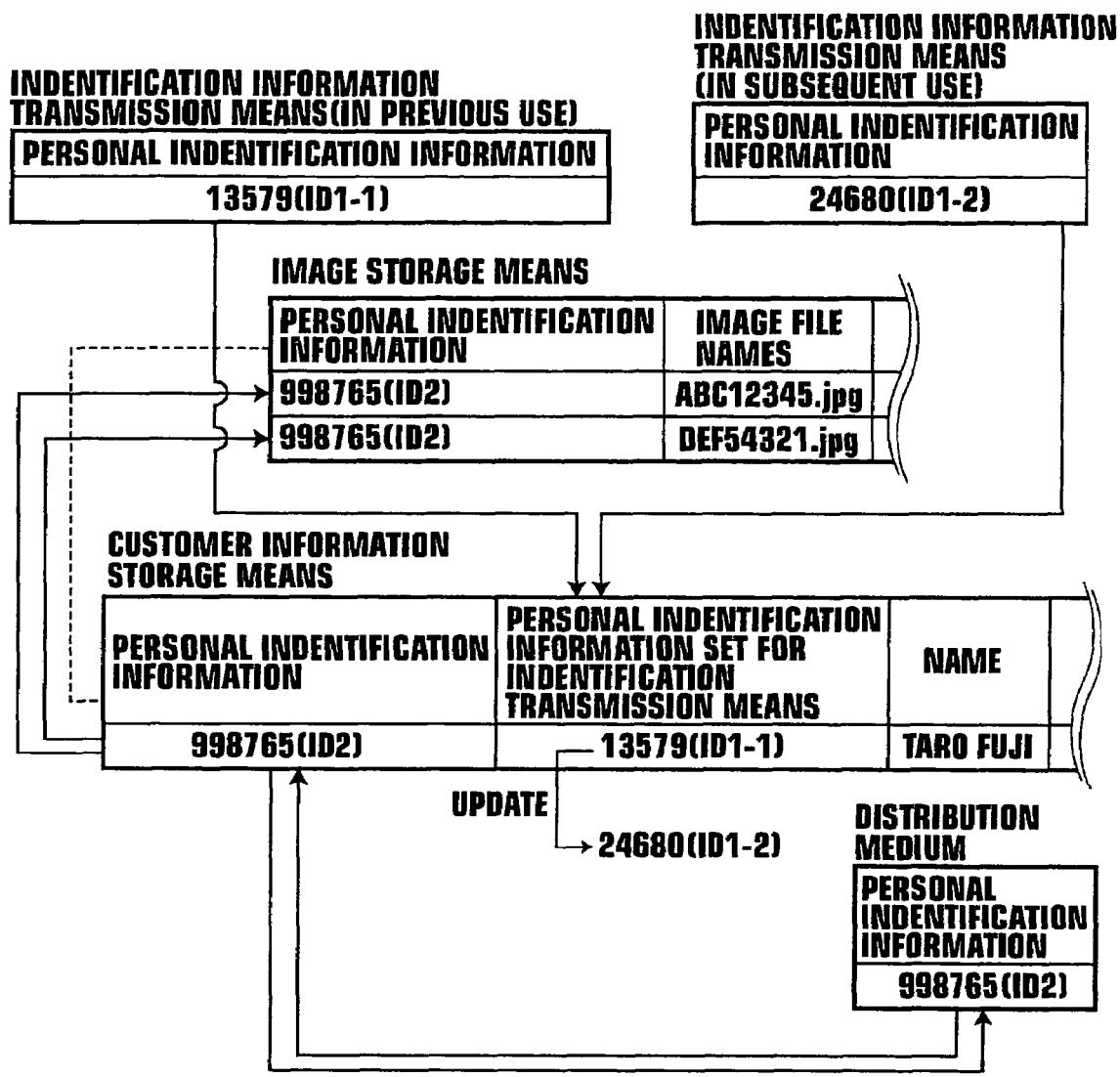
FIG. 41 shows still another example of the personal identification information.

In this embodiment, by using the same tag ID written in the wireless tag 50 at the time of first visit, the customer U can be identified by the same tag ID when the customer revisits the park as a repeater. Therefore, the same tag ID as in the previous use is written in the wireless tag 50 provided in revisit (see FIG. 39)

Configurations of the automatic photography apparatus F1, a terminal F3, the center server F4, the laboratory F5, and the wireless tag 50 are the same as in the fourth embodiment. The configuration of the wireless tag 50' having the annual passport is the same as in the fifth embodiment.

A procedure carried out in the sixth embodiment will be described next, mainly on differences from the fourth and fifth embodiments.

A procedure for new registration with the customer registration apparatus F2 at the time of first visit is almost the same as in the fifth embodiment. However, unlike the Step S61 in FIGS. 37 and 46, a screen is displayed on a monitor 23 for selecting new registration or DM repeater registration or passport repeater registration, and audio guidance is output for prompting the selection. At Step S66, the date of the revisit is recorded in the date of most recent use, which is another difference. In the case where a new customer U1 visits the park for the first time, the date of previous use is blank or filled with a predetermined initial value.

Photography is carried out by the automatic photography apparatus F1 in the same manner as in the fourth embodiment. Image data sets S1 obtained by photography and reply information represented by a reply signal from the wireless tag 50 are sent to the center server F4. In the center server F4, a management unit 43 generates the image database DB13 from header information of each of the image data sets S1 sent from the automatic photography system F1. The information on the photography conditions obtained from the header information is registered as the photography information for each of the image files. The reply information, that is, the tag ID or IDs of the customer or customers U in each of the images, is recorded in the subject information. In the case of an image of the customers U respectively having the wireless tags 50, the reply information (the tag ID) for each of the customers U is sent for the image data set S1 representing the image. Therefore, the subject information has a plurality of records wherein the tag IDs are different but the image file name is the same.

In the case of image search by the terminal F3, the center server F4 accesses the subject information in the image database DB13 by using the tag ID sent thereto, and identifies the image file names of the image data sets S1 related to the tag ID for sending the image data sets S1 stored in the files to the terminal F3, which is the only difference form the fourth embodiment in the image search.

In the case where any one of the customers U places a printing order or the like by using the terminal F3 in the same manner as in the fourth embodiment, the image processing unit 5a in the laboratory F5 obtains the image file or files selected for printing (hereinafter referred to as the image files) and the photography information thereof from the image database DB13 via the network 9. According to the photography conditions such as the photography location, the image processing conditions such as the template to be used for composite image generation and the color tone are determined. Based on the image processing conditions determined in this manner, the image processing is carried out on the images. When the image processing conditions are determined, the properties of the customer U who placed the order may be obtained from the customer database DB23 so that the image processing conditions can be determined according to the customer information and the photography conditions. The name of each of the image files that have been processed, the tag ID of the customer U who placed the order, and the time and date of order are recorded in the image processing information in the image database DB13 together with the image processing conditions. The image data sets having been subjected to the image processing by the image processing unit 5a are used for photo album generation or recording in a CD-R according to the content of the order placed by the customer U.

When a direct mail is output, the same procedure as in the fourth embodiment is carried out for any one of the customers U whose date of most recent use was predetermined days ago in the customer database DB23. In this embodiment, a DM output unit 4a accesses the service guide database DB6 and extracts a record or records (hereinafter referred to as the records) wherein the service starting date is after the date of most recent visit by the corresponding customer U in the customer database DB23. Based on the guide data in the extracted records, the DM output unit 4a prints a message 72 including notification of the services introduced after the most recent visit by the customer. More specifically, the message can be "Tommy, you had good time on September 22. From October 13, you can take new photos in Location X. A new attraction YY starts from October 17. Please come back again. From XX theme park", for example. In this example, the information on introduction of a new template in Location X from October 13 and the information on introduction of the new attraction YY starting from October 17 is extracted from the service guide database DB6.

At the time of revisit, the customer registration apparatus F2 displays on the monitor 23 the screen for selecting new registration, DM repeater registration, or passport repeater registration, and the audio guidance is also output for prompting the selection (Step S61 in FIGS. 37 and 46). A procedure for DM repeater registration is almost the same as in the fourth embodiment (Steps S68~S71 and S64~S67 in FIG. 37). However, at Step S66 in FIGS. 37 and 46, the date of previous use is changed to the date of most recent use, and the date of the revisit is recorded as the date of most recent use, which is a difference from the fourth and fifth embodiments. Upon completion of repeater registration, the email address of the customer and the information on the date of previous visit after the change are sent to a notification unit 4b in the center server F4.

The notification unit 4b receives the email address and the information from the DM repeater registration unit 2d or the passport repeater registration unit 2e, and accesses the service guide database DB6. The notification unit 4b extracts the records wherein the service starting date is after the date of previous use received from the DM repeater registration unit 2d or the passport repeater registration unit 2e. The notification unit 4b generates a message notifying the services introduced after the date of previous use by the repeater U' and before the date of revisit in this time, based on the guide data of the extracted records. The notification unit 4b sends the message to the email address received from the DM repeater registration unit 2d or the passport repeater registration unit 2e. An example of the message to be sent is "You can take new photos in Location X from October 13. Here is a sample (a link is set so that a sample photograph can be displayed by clicking "Here"). A photograph rally campaign is going on until October 17 at Zones XY and XZ."

The message sent from the notification unit 4b in the form of email is received by the mobile terminal 80 of the repeater U' In order to receive the message, the repeater U' has to register the email address by which the mobile terminal 80 can receive the message, at the time of registration of the customer information.

Upon automatic photography by the automatic photography system F1, when a communication device 13 receives the reply signal from the wireless tag 50 of any one of the customers U in a photography range 1A as at Step S28 in FIG. 22, a control unit 14D in a photography device 14 accesses the subject information in the image database DB13 by using the tag ID included in the reply signal. The control unit 14D then extracts the image files related to the tag ID, and accesses the photography information by using the image file names as search keys. In this manner, the control unit 14D understands the photography location and the camera ID, and extracts the image file or files (hereinafter referred to as the image files) obtained by the same photography device 14 in the photography range 1A. At Step S30, the control unit 14D pans and tilts an imaging unit 14A for capture of the customer U in the photography angle different from the past, based on the information on the photography angle in the past in the extracted image files.

In the case where the repeater U' places an order for printing or the like by using the terminal F3, the image processing unit 5a in the laboratory F5 obtains the image file or files (hereinafter referred to as the image files) selected for the order and the photography information thereof from the image database DB13 via the network 9. The image processing unit 5a also accesses the image processing information in the image database DB13 by using the tag ID of the repeater U' as a search key, and extracts the image files of the repeater U' regarding which an order was placed before the order placed this time. The image processing unit 5a extracts the image files having the same photography conditions as the image files to be processed in the order placed this time (the same photography location and the same camera ID, for example) from the extracted image files based on the photography information in the image database DB13, and obtains the image processing conditions of the extracted image files from the image database DB13. In this manner, the image processing conditions can be obtained regarding the image processing carried out in the past order of the repeater U' on the images photographed in the same photography conditions. The image processing unit 5a then determines the image processing conditions such as the template used for composite image generation and the color tone, according to the photography conditions such as the photography location on the images to be processed this time. If the image processing conditions for the image processing for the order placed this time can be different from the image processing conditions for the image processing carried out in the past order on the images photographed in the same photography conditions regarding the repeater U', the different image processing conditions are used for the image processing this time.

As has been described above, in the sixth embodiment, the DM output unit 4a obtains from the service guide database DB6 the information on the services introduced after the date of most recent use by the repeater U' according to the information on the date of most recent use by the repeater U' in the customer database DB23, and the information on the new services is provided to the repeater U'. Therefore, the repeater U' can efficiently obtain the information on the new services provided by the automatic photography system F1, which encourages his/her revisit.

The notification unit 4b obtains from the service guide database DB6 the information on the services introduced after the date of most recent use by the repeater U' according to the information on the date of most recent use in the customer database DB23, and the information on the new services is then provided to the repeater U'. Therefore, the repeater U' can efficiently obtain the information on the new services he/she has not experienced, which helps him/her make his/her plans on the day.

The photography device 14 obtains from the image database DB13 the information on the photography angle on the images of the repeater U' photographed by the photography device 14 in the past. Therefore, the photography device 14 can carry out photography in the photography angle different from the past. Furthermore, the image processing unit 5a obtains from the image database DB13 the image processing conditions used in the image processing carried out in the past order on the images of the repeater U' photographed in the same photography conditions so that the image processing condition unit 5a can carry out the image processing by using the image processing conditions different from those in the past. Therefore, the repeater U' can obtain the images different from the images in the past, which stimulates willingness to purchase the image.

In the case where the repeater U' is notified of the new services he/she has not experienced by the direct mail and the email on the day of revisit, the date of outputting the direct mail may be stored in the customer database DB23. In this case, the information on the services introduced after output of the direct mail is only extracted from the service guide database DB6 for notification of the services by the email on the day of revisit. In this manner, the same information can be prevented from being sent to the repeater U'.

In this embodiment, the DM output unit 4a generates the direct mails 70 for all the customers U whose most recent use in the customer database DB23 was the predetermined days ago or earlier. However, since the customer database DB 23 has the customer property on ownership of annual passport, the direct mails may be generated for the customers U not having the annual passports. In the case of the annual passport customer, the customer simply needs to bring the wireless tag 50' at the time of revisit, and a bar code 73 in the direct mail 70 is not necessary. Therefore, the direct mail 70 may be generated without the bar code 73 for the annual passport customer.

In this embodiment, the services new to the repeater U' is notified by sending the email to the mobile terminal 80 of the repeater U'. However, the same services may be notified by a fixed terminal installed in the automatic photography system F1. For example, the terminal F3 may have the same communication unit as in the embodiment described above so that the repeater U' can select a menu of new service guide by operating the terminal F3. In this case, a first communication unit 31 of the terminal F3 receives the tag ID from the wireless tag 50 or 50' of the repeater U', and the notification unit 4b accesses the customer database DB23 by using the tag ID as the search key. The date of previous use by the repeater U' can be obtained in this manner, and the date is compared with the service starting date in the service guide database DB6. Consequently, the information on the new services introduced after the previous use by the repeater U' can be extracted from the service guide database DB6. In this manner, the repeater U' not having the mobile terminal 80 can receive the notification of the new services he/she has not experienced, which improves satisfaction of the repeater.

In this embodiment, the photography device 14 is used solely in the photography range R. However, in the case where the number of the photography devices 14 for a photography range R is more than 1, when the communication device 13 of one of the photography devices 14 receives the reply signal from the wireless tag 50 of the customer U in the photography range R as at Step S28 in FIG. 22, the control unit 14D may access the subject information in the image database DB13 by using the tag ID in the reply signal as the search key, and can extract the image files related to the tag ID. In this case, the control unit 14D then accesses the photography information by using the extracted image file names as the search keys, and understands the photography location. Based on the location, the image files obtained in the photography range R in the past are obtained. In this manner, any one of the photography devices 14 different from the photography device 14 that carried out photography of the customer U in the photography range R in the past may be caused to photograph the customer U.

In the sixth embodiment, acquisition of the images of the repeater U' different from the images in the past is intended. However, when the photography conditions and the image processing conditions are determined, the conditions may be the same as in the past or partially the same as in the past. The conditions may be determined automatically or determined by the repeater U' at each visit.

Furthermore, the content of the services can be changed based on whether or not each of the customers U is a new customer or a repeater. More specifically, a program for calculating an admission fee is installed in the customer registration apparatus D2, E2, or F2 so that the admission fee for the repeater U' can be less expensive than for the new customer U1.

In this embodiment, the images photographed in the past can be accessed in the revisit, based on the tag ID. Therefore, when a printing order is placed in the revisit, an image photographed in the revisit can be used together with the images photographed in the previous visit for generating a composite image.

As has been described above, the system understands the fact that the repeater U' uses the automatic photography system more than once, and the information regarding the use in the previous visit can also be accessed in this invention. Therefore, the repeater U' can receive the detailed services appropriately and efficiently.

In the fourth and sixth embodiments, the direct mail 70 is sent with the bar code 73 representing the tag ID of the previous visit after the predetermined days have passed from the previous visit. However, a magnetic card or the like that magnetically stores the tag ID may be distributed to each of the customers U when he/she leaves the park. In this case, the customer registration apparatus E2 comprises a magnetic card reader for reading the card.

If the images photographed by the automatic photography systems according to any of the embodiments described above are transferred to a known network photograph service system for enabling the network photograph service system to receive a printing order or the like, and if the network photograph service system prints link information such as URL for placing a printing order on the direct mail 70, placing an order is encouraged for printing the images photographed by the automatic photography system, which is more effective.

What is claimed is:

1. A service provision system comprising:
    group registration means for registering respective members of a group comprising customers, by relating group identification information for identifying the group to personal identification information for identifying each of the customers, and
    service provision means for providing a service of high convenience for the group to each of the members of the group, wherein
    the group registration means further registers a property of the group by relating the property of the group to the group identification information of the group, and
    the service provision means provides the service according to the property of the group,
    wherein the service provision means provides an information provision service and comprises:
    information storage means for storing information on various goods and/or services to be provided to the customers, by relating the information to the property, which is suitable for provision of the information, of the group; and
    information output means for outputting the information appropriate for the customers of the group, based on the property of the group identified by the group identification information related to the personal identification information of the customers.

2. The service provision system according to claim 1, the service provision means providing an automatic photography service and comprising:
    identification information transmission means for transmitting the personal identification information while being held by each of the customers;
    photography means for carrying out automatic photography of the customers having the identification information transmission means upon reception of the personal identification information from the identification information transmission means;
    image storage means for storing an image output through the automatic photography by relating the image to the personal identification information received by the photography means; and
    image output means for obtaining the image from the image storage means and for outputting the image as a print or prints on a predetermined printing medium, wherein
    the image output means determines a number of said prints to be output based on the property of the group identified by the group identification information related to the personal identification information related to the image.

3. The service provision system according to claim 2, wherein the group registration means registers the respective members of the group by performing a zone group registration, wherein the members of the group enter a predetermined zone, and the group registration means receives the personal identification information of the members of the group from the respective identification information transmission means of each of the members of the group entered in the predetermined zone.

4. The service provision system according to claim 1,
the service provision means further comprising customer registration means for registering a property of each of the customers by relating the property to the personal identification information thereof,
the information storage means storing the information by further relating the information to the property, which is suitable for provision of the information, of each of the customers, and
the information output means outputting the information appropriate for each of the customers, based on the property of each of the customers related to the personal identification information thereof.

5. The service provision system according to claim 1, wherein the personal identification information is recorded in an RFID (Radio Frequency IDentification).

6. The service provision system according to claim 1, wherein the property of the group describes a relationship between each member of the group, and the relationship is associated with the group identification information of the group.

7. The service provision system according to claim 6, wherein the service provision means provides the service to each member of the group based on the relationship between the each member and the other members of the group.

8. The service provision system according to claim 1, wherein the property of the group describes a relationship between a set number of members within the group, wherein the set number of members is less than a total number of members of the group.

9. The service provision system according to claim 8, wherein the service provision means provides the service to each member among the set number of members of the group based on the relationship between the each member and the other set number of members within the group.

10. The service provision system according to claim 1, wherein the group identification information comprises a group identifier, wherein the group identifier is associated with the personal identification information of each of the members of the group, and the service provision means provides the service to each member of the group based on the group identifier.

11. The service provision system according to claim 1, wherein the information provision service further comprises:
update information means for notifying the customers of the group of a newly introduced service of the provision service.

12. A service provision system comprising:
group registration means for registering respective members of a group comprising customers by relating group identification information for identifying the group to personal identification information for identifying each of the customers, and
service provision means for providing a service of high convenience for the group to each of the members of the group, wherein
the group registration means enables registration of the personal identification information by relating the personal identification information to the group identification information of two or more groups in which at most a subset of the group members among the two or more groups are common.

13. The service provision system according to claim 12, wherein the personal identification information is recorded in an RFID (Radio Frequency IDentification).

14. The service provision system according to claim 12, wherein the service provision means further comprises:
identification information transmission means for transmitting the personal identification information while being held by each of the customers, wherein the group registration means receives the personal identification information from the identification information transmission means and displays a list of groups to which the customer holding the identification information transmission means belongs based on the received personal identification information of the customer.

15. The service provision system according to claim12, wherein the subset of the group members is less than a total number of group members of a smallest group among the two or more groups, wherein the smallest group has the least number of group members among the two or more groups.

16. A service provision system comprising:
group registration means for registering respective members of a group comprising customers by relating group identification information for identifying the group to personal identification information for identifying each of the customers;
group changing means for registering one or more of the members of the group identified by the personal identification information related to the group identification information, as a member or members of another group by relating the personal identification information to the group identification information for identifying the group to which the member or members newly belong; and
service provision means for providing a service of high convenience for the groups, to each of the members of the groups,
wherein the group changing means registers an effective period of membership of each of the customers in each of the groups by relating the effective period to the group identification information of each of the groups.

17. The service provision system according to claim 16, wherein the personal identification information is recorded in an RFID (Radio Frequency IDentification).

18. The service provision system according to claim 16, wherein the effective period of membership can be defined by at least two of three items comprising starting time and date of the corresponding group, ending time and date thereof, and a period in which the group exists.

19. The service provision system according to claim 16, wherein the effective period of membership of each of the customers in each of the groups is independent of the other customers in the corresponding group.

20. A service provision system comprising:
group registration means for registering respective members of a group comprising customers by relating group identification information for identifying the group to personal identification information for identifying each of the customers, and
service provision means for providing a service of high convenience for the group to each of the members of the group, wherein
the service provision means provides the service according to the number of the members in the group, wherein the service provision means provides an information provision service and comprises:

information storage means for storing information on various goods and/or services to be provided to the customers, by relating the information to the number of the members, which is suitable for provision of the information, in the group; and information output means for outputting the information appropriate for the customers in the group, based on the number of the members in the group identified by the group identification information related to the personal identification information of the customers.

21. The service provision system according to claim 20, the service provision means further comprising customer registration means for registering a property of each of the customers by relating the property to the personal identification information thereof, the information storage means storing the information by further relating the information to the property, which is suitable for provision of the information, of each of the customers, and the information output means outputting the information appropriate for each of the customers, based on the property of each of the customers related to the personal identification information thereof.

22. The service provision system according to claim 20, wherein the personal identification information is recorded in an RFID (Radio Frequency IDentification).

\* \* \* \* \*